(12) United States Patent
Al-Babili et al.

(10) Patent No.: US 11,523,610 B2
(45) Date of Patent: Dec. 13, 2022

(54) REGULATING PLANT GROWTH USING A DIAPOCAROTENOID

(71) Applicants: King Abdullah University of Science and Technology, Thuwal (SA); DUKE UNIVERSITY, Durham, NC (US)

(72) Inventors: Salim Al-Babili, Thuwal (SA); Kunpeng Jia, Thuwal (SA); Alexandra Jazz Dickinson, Durham, NC (US)

(73) Assignees: King Abdullah University of Science and Technology, Thuwal (SA); Duke University, Durham, NC (US)

(*) Notice: Subject to any disclaimer, the term of this patent is extended or adjusted under 35 U.S.C. 154(b) by 27 days.

(21) Appl. No.: 16/982,547

(22) PCT Filed: Mar. 20, 2019

(86) PCT No.: PCT/IB2019/052264
§ 371 (c)(1),
(2) Date: Sep. 19, 2020

(87) PCT Pub. No.: WO2019/180638
PCT Pub. Date: Sep. 26, 2019

(65) Prior Publication Data
US 2021/0000108 A1    Jan. 7, 2021

Related U.S. Application Data

(60) Provisional application No. 62/732,314, filed on Sep. 17, 2018, provisional application No. 62/645,864, filed on Mar. 21, 2018.

(51) Int. Cl.
*A01N 35/02* (2006.01)
*A01N 37/06* (2006.01)
(Continued)

(52) U.S. Cl.
CPC ............. *A01N 35/02* (2013.01); *A01N 37/06* (2013.01)

(58) Field of Classification Search
CPC ........ A01N 35/02; A01N 37/06; A01N 37/42; A01N 49/00
See application file for complete search history.

(56) References Cited

U.S. PATENT DOCUMENTS 5,107,030 A    4/1992 Babler

FOREIGN PATENT DOCUMENTS

| WO | 2017001927 A1 | 1/2017 |
| WO | 2017201410 A1 | 11/2017 |
| WO | 2018060865 A1 | 4/2018 |

OTHER PUBLICATIONS

Notification of Transmittal of the International Search Report and the Written Opinion of the International Searching Authority, or the Declaration for PCT/IB2019/052264 dated Jul. 23, 2019.
(Continued)

*Primary Examiner* — Trevor Love
(74) *Attorney, Agent, or Firm* — Billion & Armitage

(57) ABSTRACT

Embodiments of the present disclosure describe diapocarotenoid plant growth regulators represented by formula (I): R-A-R (I) or a precursor, salt, solvate, stereoisomer or polymorph thereof; wherein R is a monovalent carbonyl moiety selected from the group consisting of aldehydes, ethers, diethers, carboxylic acids, alcohols, and ester carboxylates and A is a bivalent polyene represented by the bivalent moiety —$(CR_a$=$CR_b)_x$—, wherein x is the number of double bonds in polyene moiety A, and $R_a$ and $R_b$ are, independently, hydrogen, a hydrocarbon, or an alkoxy group, and composition of the diapocarotenoid plant growth regulators in an agronomically acceptable carrier. Methods of regulating plant growth including promoting root development, increasing nutrient uptake, enhancing resistance to
(Continued)

abiotic stress factors, invigorating plant growth, increasing plant yield, and increasing plant biomass by applying at least one diapocarotenoid plant growth regulator to a seed, plant propagation material, plant or plant growth medium are also described.

10 Claims, 34 Drawing Sheets

(51) Int. Cl.
    *A01N 37/42*      (2006.01)
    *A01N 49/00*      (2006.01)

(56) References Cited

OTHER PUBLICATIONS

Fishetti, et al., "Palladium-Catalyzed Syntheses of Conjugated Polyenes", J. Org. Chem, 48, Jan. 1, 1983, 948-955.

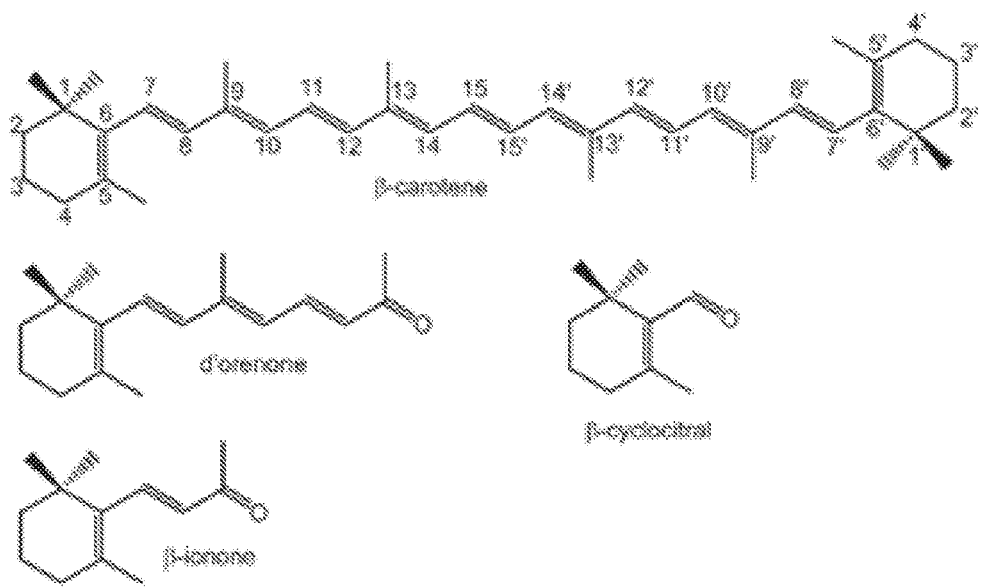
FIG. 1A
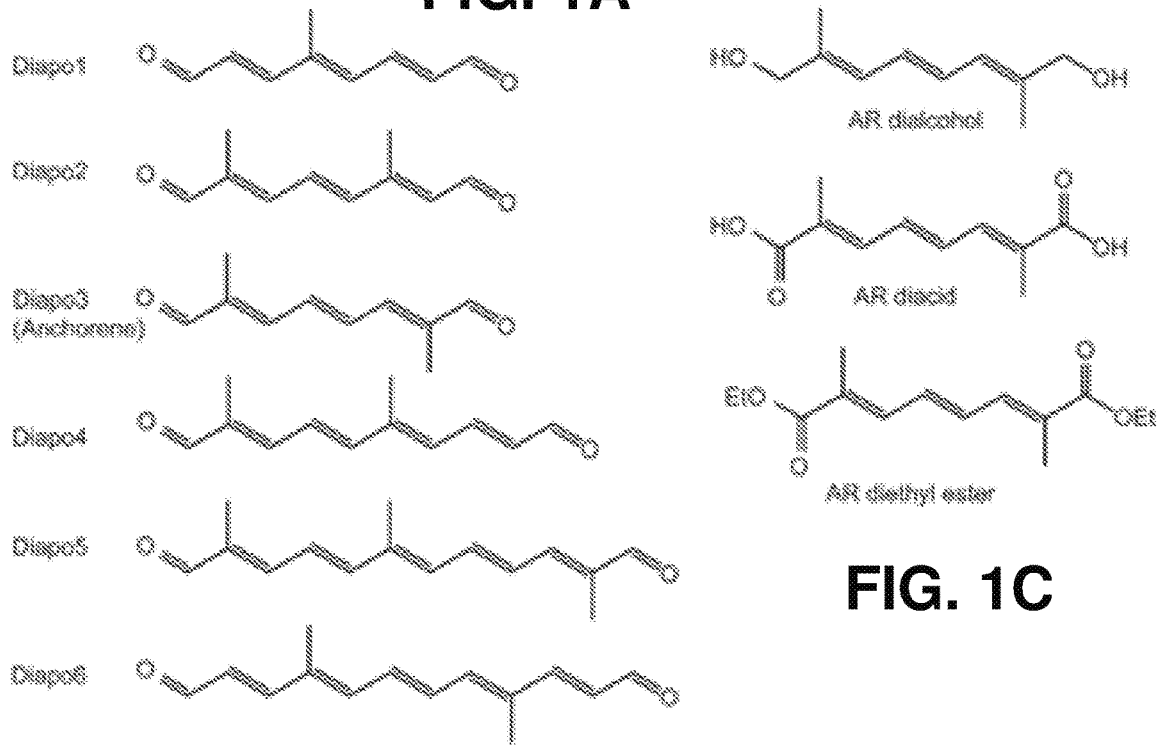
FIG. 1B
FIG. 1C
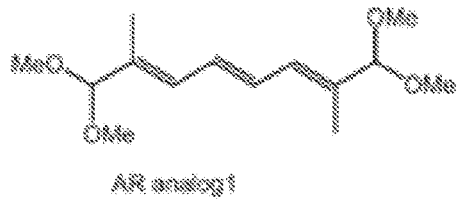
FIG. 1D

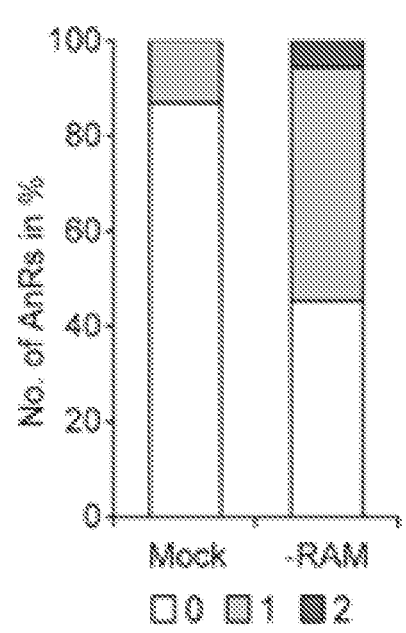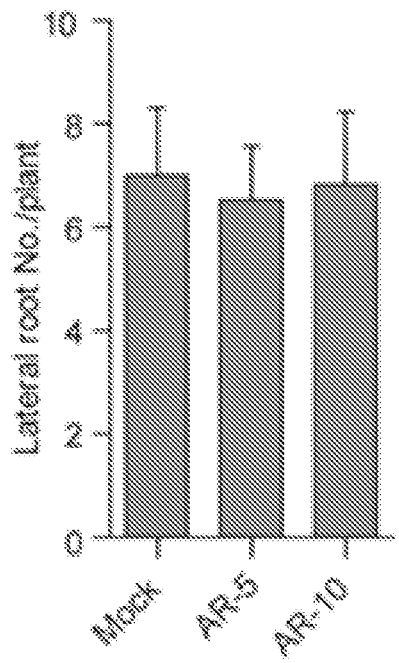
FIG. 3D   FIG. 3E

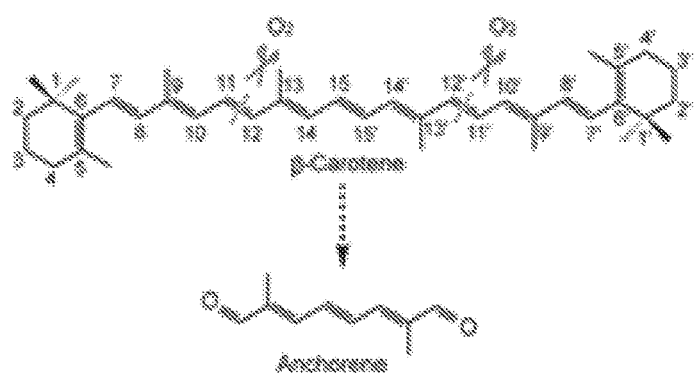
FIG. 4A
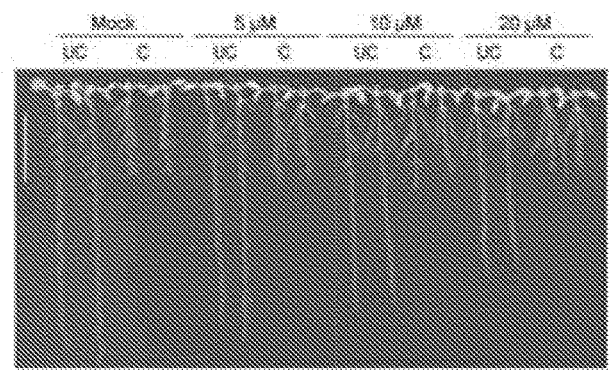
FIG. 4B
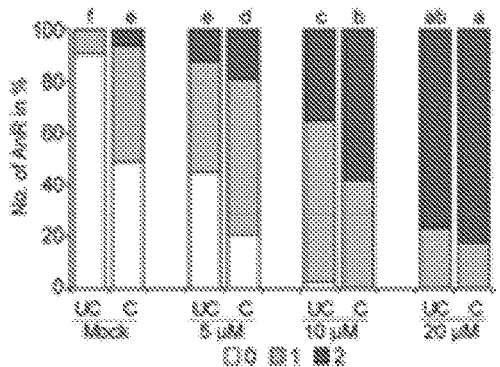
FIG. 4C
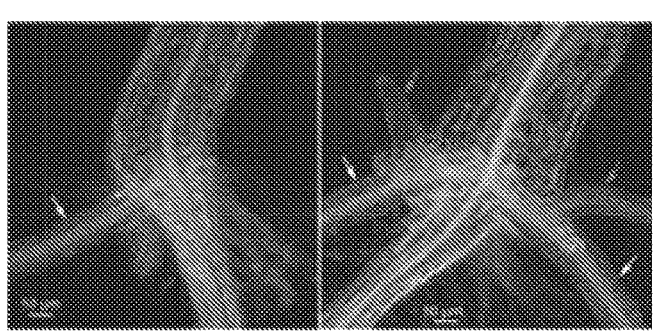
FIG. 4D
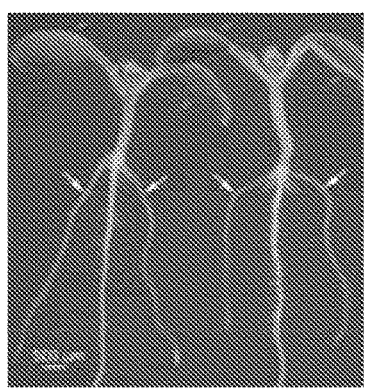
FIG. 4E
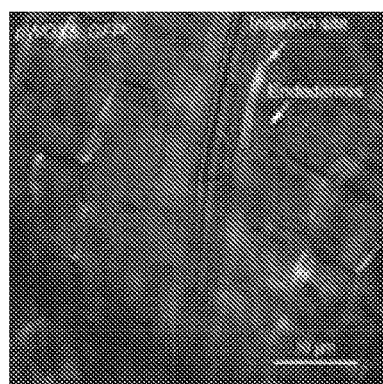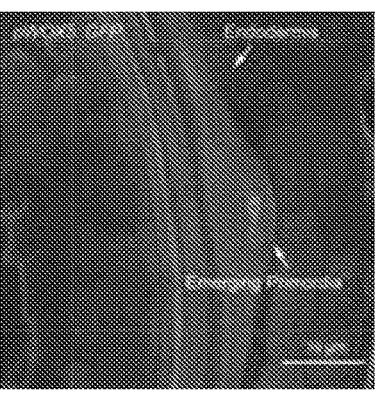
FIG. 4F

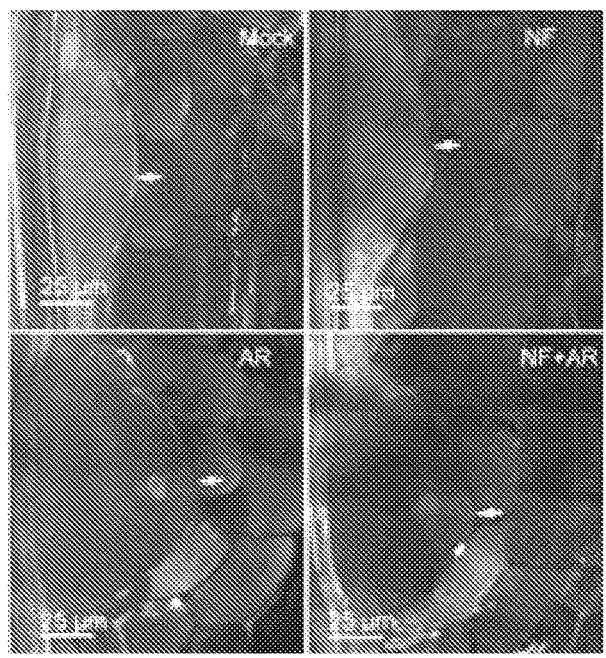
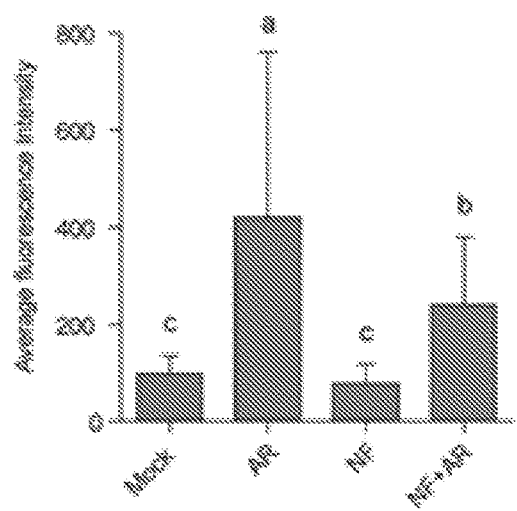
FIG. 5D
FIG. 5E

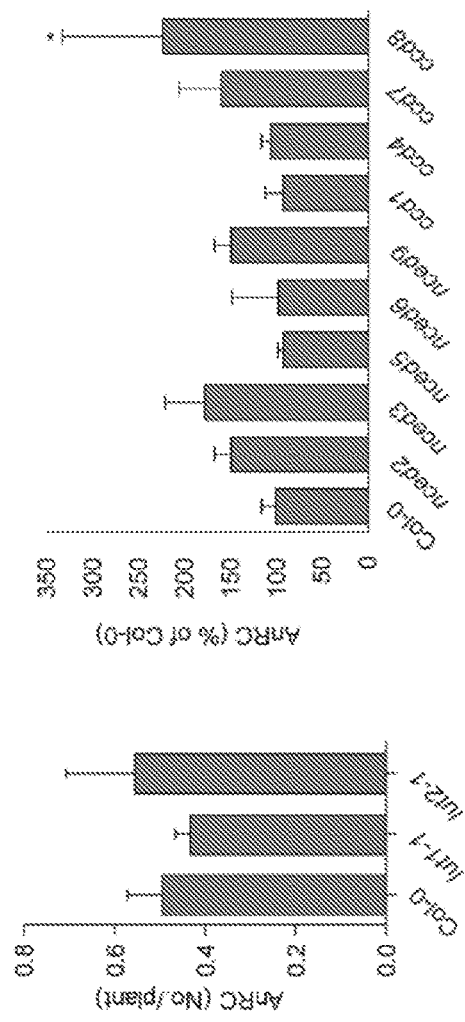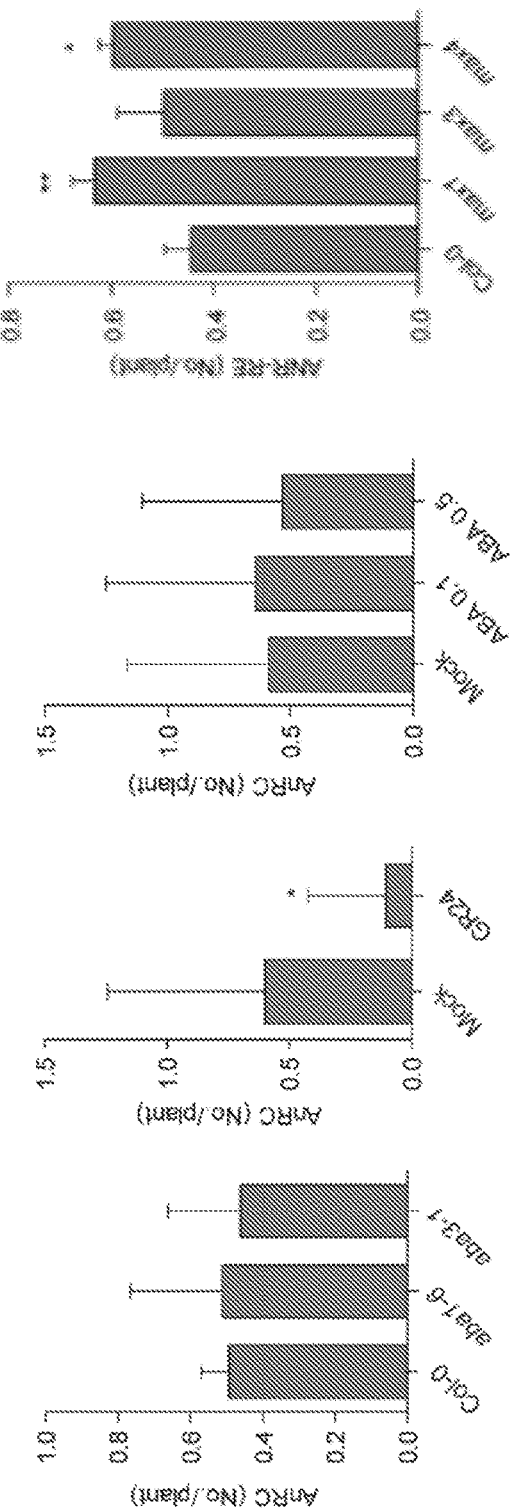
FIG. 7A  FIG. 7B  FIG. 7C  FIG. 7D  FIG. 7E  FIG. 7F

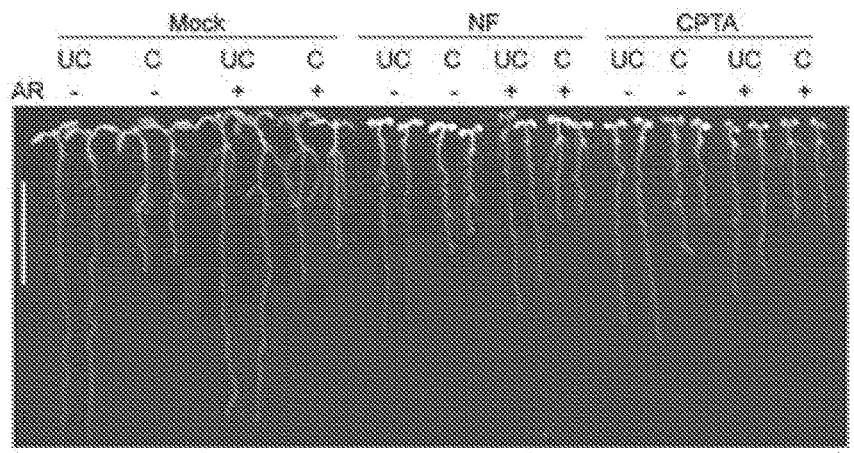
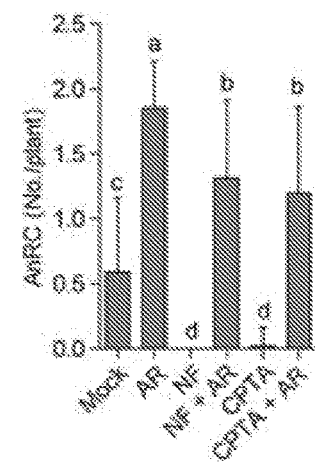
FIG. 9A  FIG. 9B
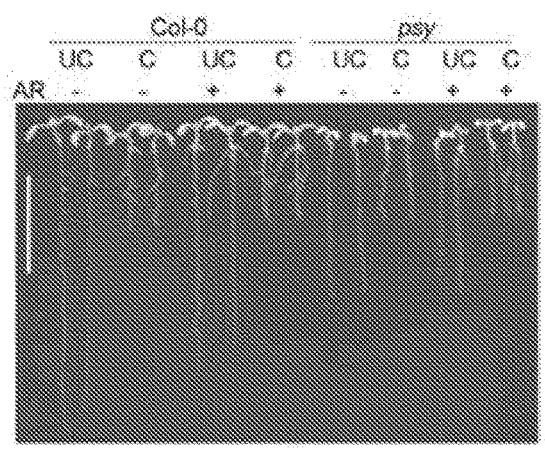
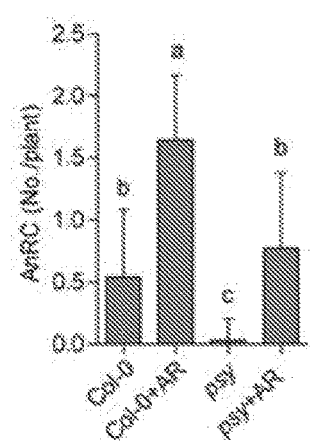
FIG. 9C  FIG. 9D

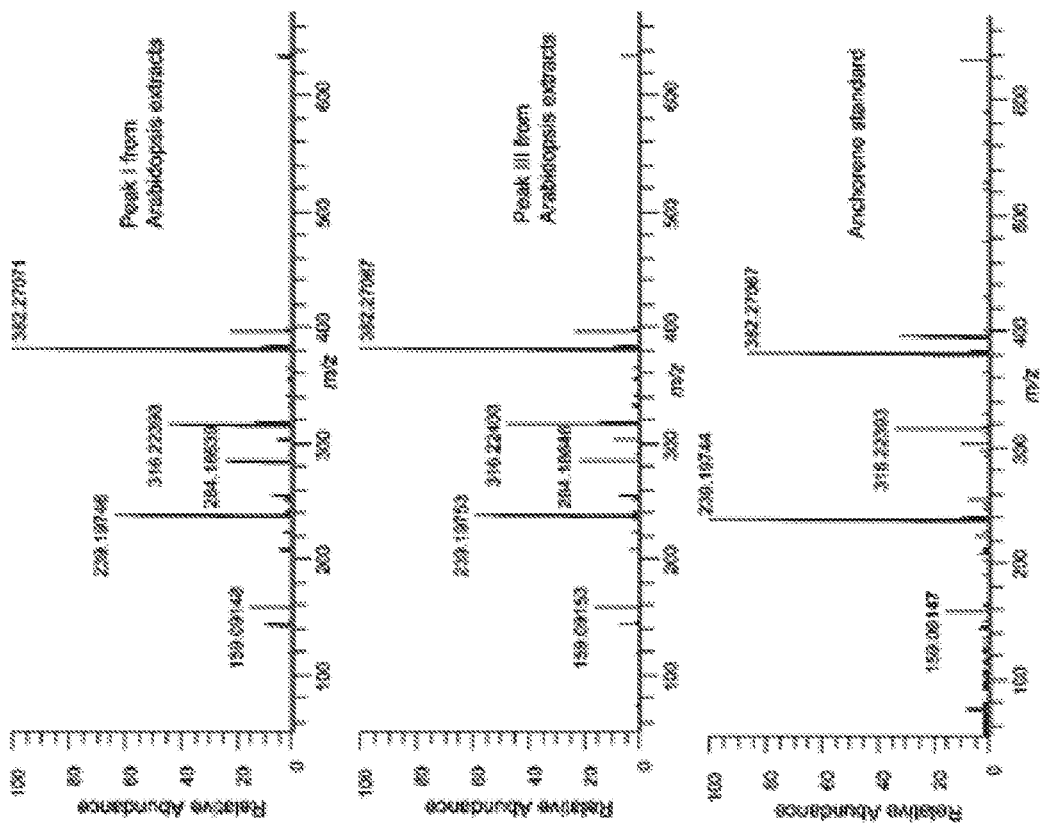
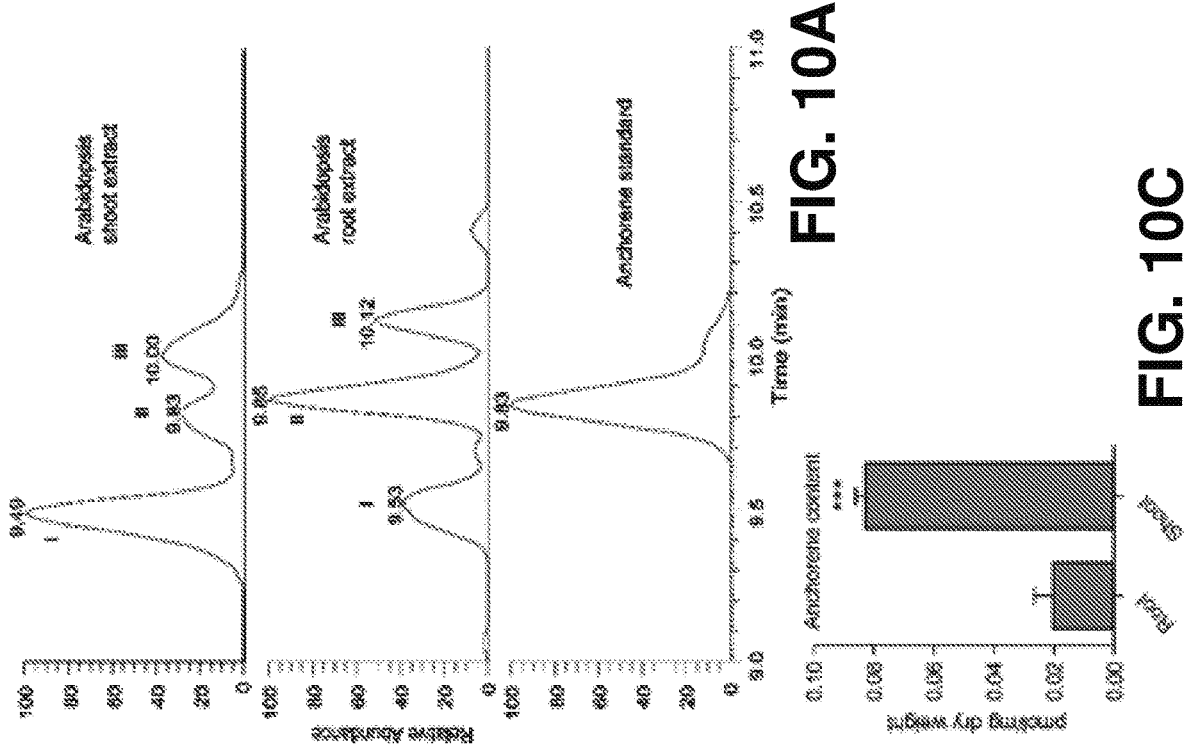
FIG. 10A
FIG. 10B
FIG. 10C

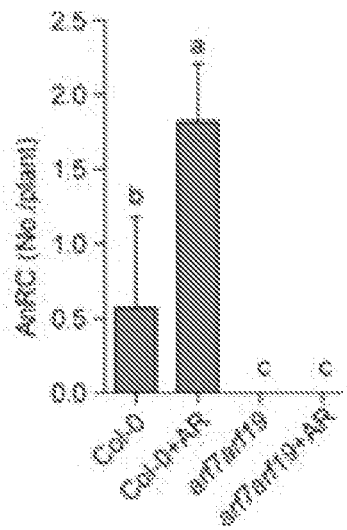
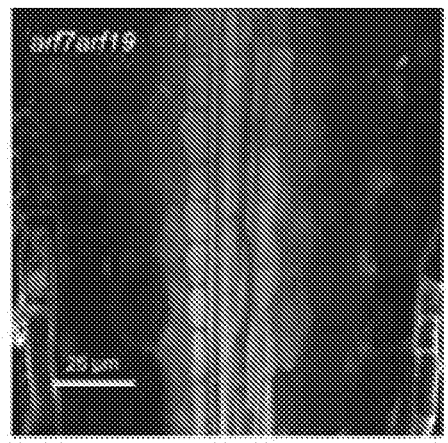
FIG. 11A        FIG. 11B
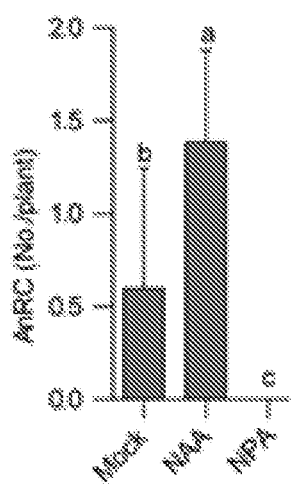
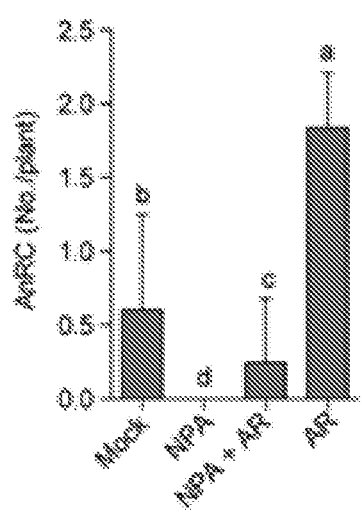
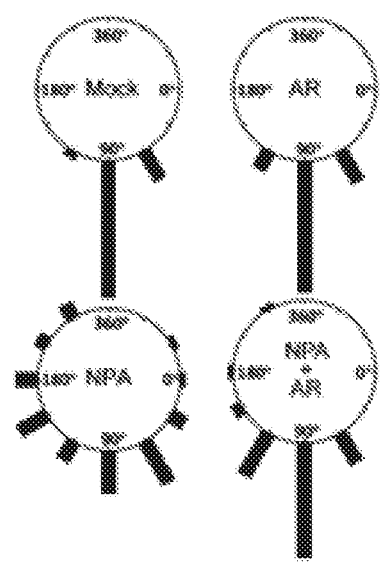
FIG. 11C        FIG. 11D        FIG. 11E

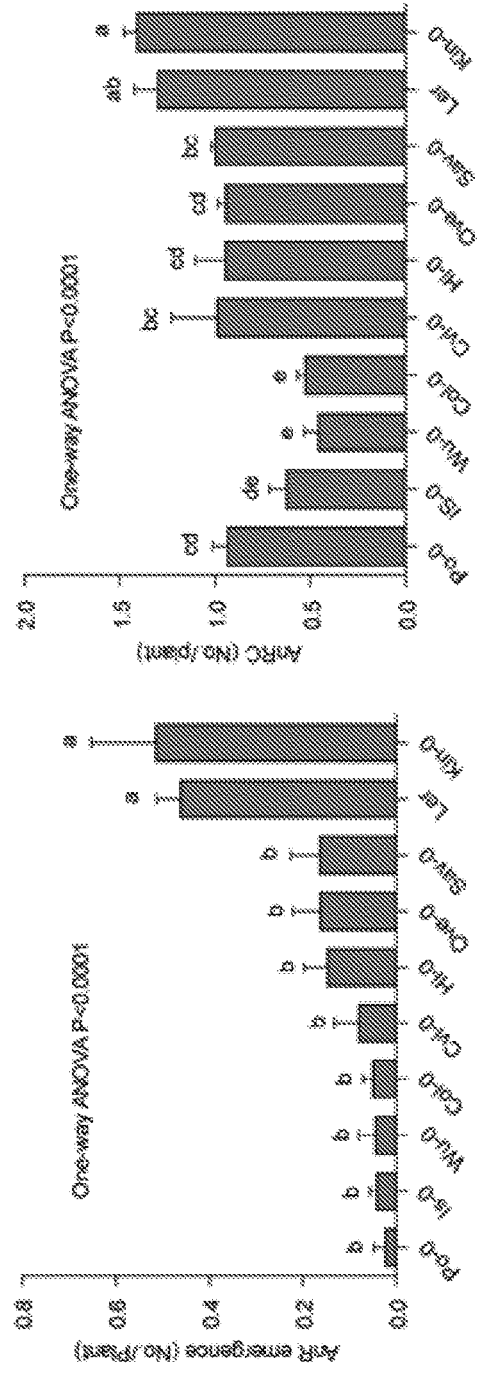
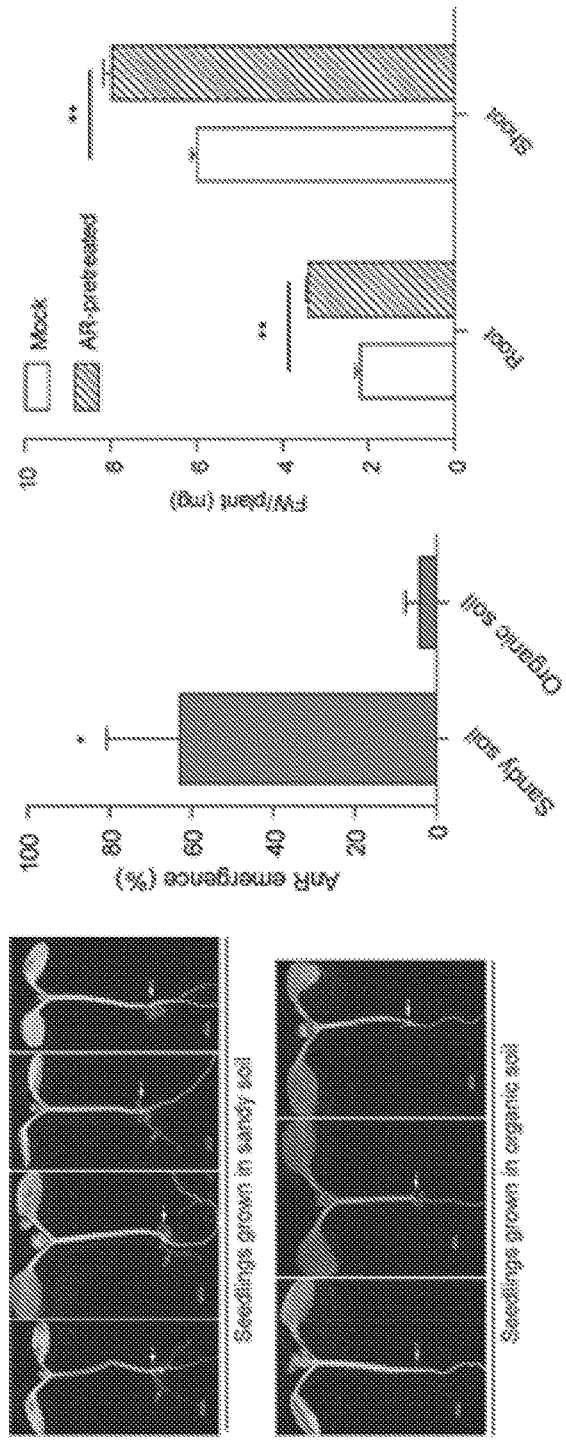
FIG. 14A
FIG. 14B
FIG. 14C
FIG. 14D
FIG. 14E

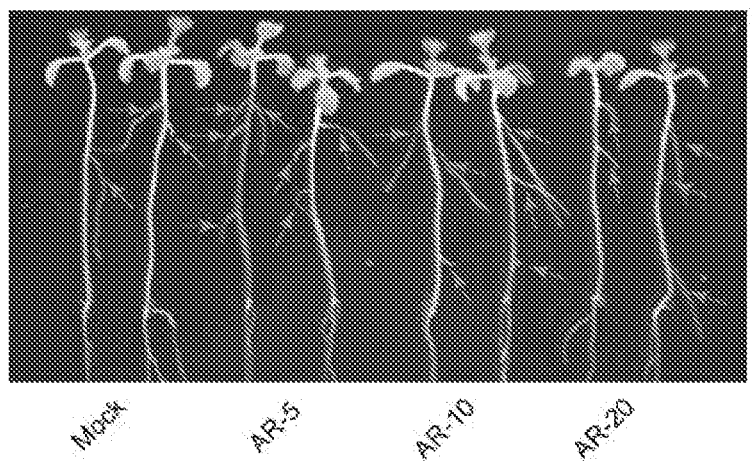 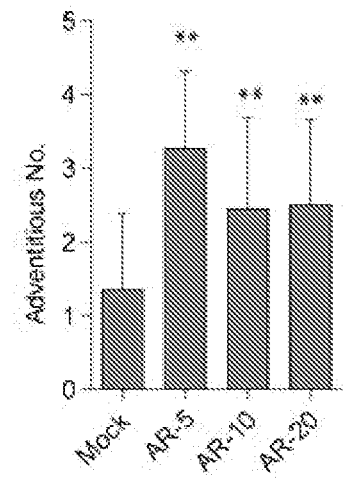
FIG. 18A  FIG. 18B

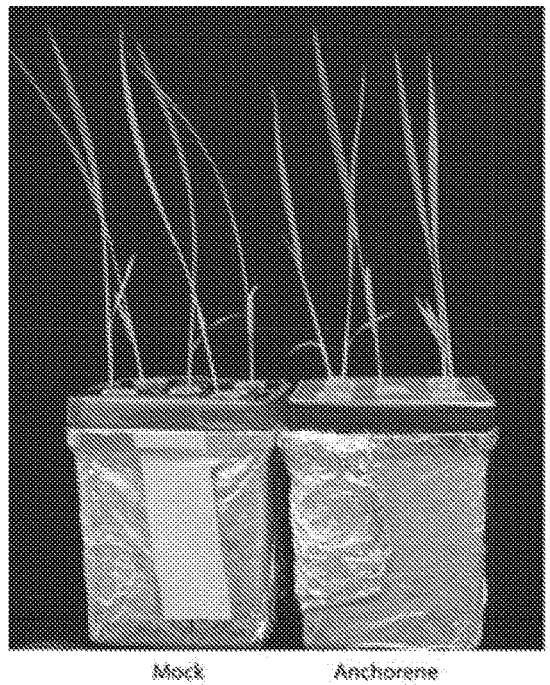
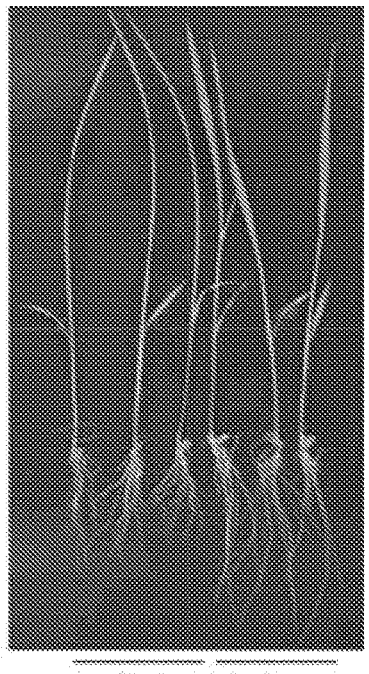
FIG. 19A  FIG. 19B
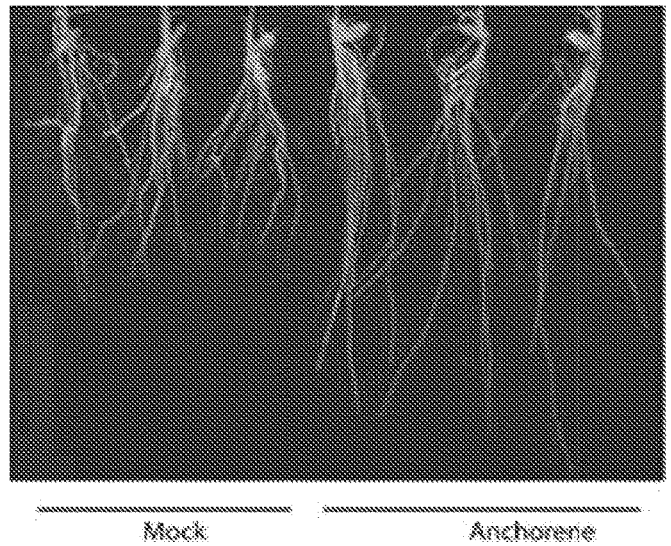
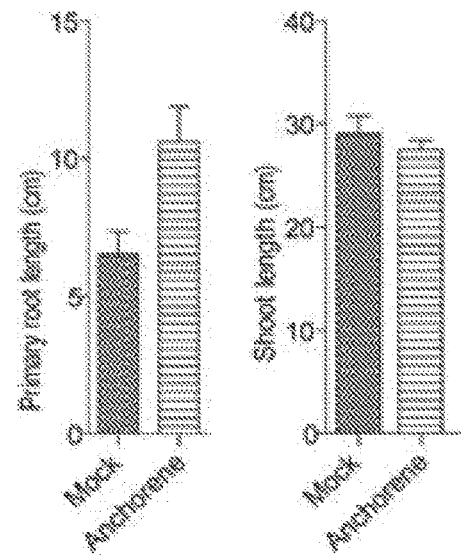
FIG. 19C  FIG. 19D  FIG. 19E

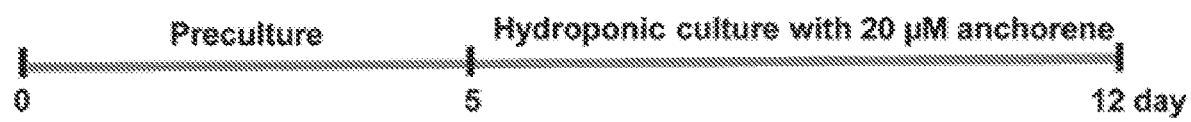
FIG. 20A
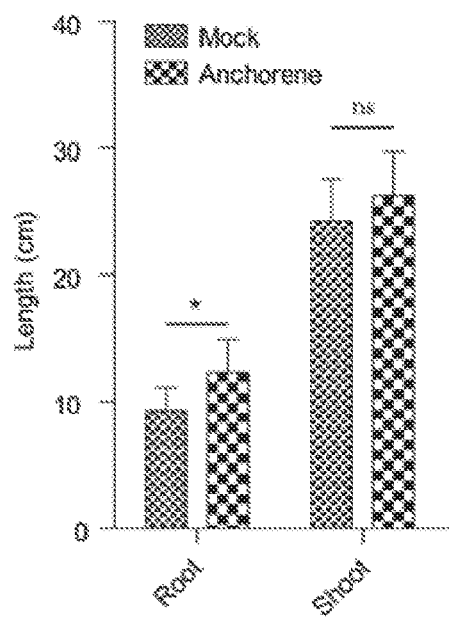
FIG. 20B
FIG. 20C

REGULATING PLANT GROWTH USING A DIAPOCAROTENOID

BACKGROUND

Carotenoids are common isoprenoid pigments synthesized by all photosynthetic organisms and many heterotrophic bacteria and fungi. Carotenoids are essential constituents of the photosynthetic apparatus due to their vital function in photo-protection and contribution to harnessing light energy, as well as sources for biologically important compounds such as the retinoids. Moreover, these pigments play an ecological role by conferring their colors to many fruits and flowers. Besides these "classical" functions, carotenoids are a ubiquitous source for biologically important compounds, such as the opsin chromophore retinal, and for hormones and signaling molecules including the vertebrate morphogen retinoic acid, the phytohormones abscisic acid (ABA) and strigolactone (SL), the plant plastid retrograde signaling molecule cyclocitral, and the fungal morphogen trisporic acid. All of these derivatives arise by virtue of the extended, conjugated double bond system that makes carotenoids prone to oxidative cleavage. This reaction yields carbonyl products that are generally called apocarotenoids and can be catalyzed by enzymes from the carotenoid cleavage dioxygenase (CCD) family, which break defined C—C double bonds by inserting molecular oxygen. Arabidopsis CCDs are divided into nine-cis-epoxycarotenoid cleavage dioxygenases (NCED2, 3, 5, 6, and 9) that form the ABA precursor xanthoxin from 9-cis-epoxycarotenoids and CCDs with different substrate and regio-specificity. The latter group includes CCD1, which forms a plenitude of $C_{13}$, $C_{10}$ and $C_8$ volatiles from different apocarotenoids and $C_{40}$-carotenoids, CCD4, which cleaves all-trans-β-carotene into β-ionone ($C_{13}$) and β-apo-10'-carotenal ($C_{27}$), the SL biosynthesis enzyme CCD7 (MAX3), which breaks 9-cis-β-carotene into β-ionone ($C_{13}$) and 9-cis-β-apo-10'-carotenal ($C_{27}$) that is converted by CCD8 (MAX4) into the SL biosynthesis intermediate carlactone. CCD8 can also cleave all-trans-β-apo-10'-carotenal into the ketone carotenone (d'orenone), but with low activity. Non-enzymatic cleavage, which occurs at each double bond in the carotenoid backbone, is another important route for apocarotenoid formation. This process is triggered by reactive oxygen species (ROS) and can also yield signaling molecules, such as the plant stress signal β-cyclocitral., Which is formed by singlet oxygen ($^1O_2$) and mediates gene responses to this ROS. In addition to monocarbonyls, carotenoid cleavage can yield dialdehyde products (diapocarotenoids), as shown for several plants and cyanobacterial CCDs that cleave multiple double bonds within carotenoids or target apocarotenoids. The question of whether diapocarotenoids are also regulatory metabolites has not yet been answered.

Plants need complex and dynamic root systems for anchorage as well as for water and nutrient uptake under variable availabilities. Arabidopsis is an ideal model plant to study root development because of its genetic tractability and the fast-growing and relatively simple root system. Arabidopsis has three highly characterized types of roots: i) a primary root initiated in embryogenesis, ii) lateral roots (LRs) that form from the primary root and other LRs, and iii) adventitious roots, which emerge from non-root tissues:, such as stem, leaves and hypocotyl. Anchor roots (ANRs) constitute a fourth type of roots. ANRs emerge from the collet, a region located just below the root-hypocotyl region, and have remained largely uncharacterized. ANRs are largely uncharacterized and are often classified as either adventitious roots or LRs.

The development of LRs occurs in a series of well-documented stages. LRs are positioned through a process that involves gene expression oscillation mediated by an unidentified carotenoid-derived signal. In Arabidopsis, LRs initiate from xylem pole pericycle cells, which form the cell layer between the vascular bundle and the endodermis. These cells divide to produce LR primordium, which continue to grow until the new roots emerge by pushing through the outer layers of the originating root. The plant hormone auxin plays a central role in root development. For instance, the auxin signaling component MP/ARF5 regulates embryonic root development and the auxin-related transcription factors ARF7 and ARF19 are pivotal for LR initiation In addition to auxin, the carotenoid-derived phytohormones, SL and ABA, have been shown to regulate different aspects of root development. There is a need to identify carotenoid-derived compounds involved in regulation of plant growth and root development.

SUMMARY

In general, the present disclosure features a plant growth regulator composition comprising, in an agronomically acceptable carrier, at least one diapocarotenoid represented by formula (I):

$$R-A-R \qquad (I)$$

or a precursor, salt, solvate, stereoisomer or polymorph thereof, wherein R is a monovalent carbonyl moiety selected from the group consisting of aldehydes, ethers, diethers, carboxylic acids, alcohols, and ester carboxylates and A is a bivalent polyene represented by the bivalent moiety —$(CR_a$=$CR_b)_x$— wherein x is the number of double bonds in the polyene moiety A, and $R_a$ and $R_b$ are, independently, hydrogen, a hydrocarbon, or an alkoxy group. In one or more embodiments, R is an aldehyde, x is an integer between 2-6 and the double bonds of the bivalent polyene moiety A are all trans. In one or more embodiments, the bivalent polyene moiety A is a $C_8$ moiety with two methyl substituents and no heteroatoms. In one or more embodiments, the at least one diapocarotenoid plant growth regulator is 12,12'-diapocarotene-12,12'-dial. In one or more embodiments, the at least one diapocarotenoid plant growth regulator is 8,15-diapocarotene-8,15-dial. In one or more embodiments, the bivalent polyene moiety A is a $C_{13}$ moiety with three methyl substituents and no heteroatoms. In one or more embodiments, the at least one diapocarotenoid plant growth regulator is 8,12'-diapocarotene-8,12'-dial. In one or more of the embodiments above, the at least one diapocarotenoid plant growth regulator is 1,1,8,8-tetramethyoxy-2,7-dimethyl-2,4,6-octatriene. In one or more of the embodiments above, the precursor of the at least one diapocarotenoid plant growth regulator is all-trans-3-OH-β-12'-carotenal. In one or more of the embodiments above, the composition comprises about 1-125 ppm, about 100-750 ppm, about 500-1,500 ppm, about 1,000-3,000, or about 2,000 to 10,000 ppm of the at least one diapocarotenoid plant growth regulator or a precursor thereof. In one or more of the embodiments above, the agronomically acceptable carrier comprises a water-miscible organic solvent selected from the group consisting of alcohols, ethers, esters, ketones and acetals. In one or more of the embodiments above, the composition further comprises a plant growth medium.

The present disclosure further features a method of regulating plant growth comprising applying to a seed, plant propagation material, or plant, in need of growth regulation, an effective amount at least one diapocarotenoid plant growth regulator represented by formula (I):

R-A-R    (I)

or a precursor, salt, solvate, stereoisomer, or polymorph thereof; wherein R is a monovalent carbonyl moiety selected from the group consisting of aldehydes, ethers, diethers, carboxylic acids, alcohols, and ester carboxylates and A is a bivalent polyene represented by the bivalent moiety —(CR$_a$=CR$_b$)$_x$— wherein x is the number of double bonds in polyene moiety A, and R$_a$ and R$_b$ are, independently, hydrogen, a hydrocarbon, or an alkoxy group. In one or more embodiments, applying to the seed, plant propagation material or plant comprises treating a plant growth medium in contact with the seed, plant propagation material or plant with the at least one diapocarotenoid plant growth regulator or precursor thereof. In one or more embodiments, the plant growth medium is selected from the group consisting of water, peat moss-based growing mix, a greenhouse growing mix, inert support loaded with nutrient solutions, and agar medium formulated for promoting root development. In one or more of the embodiments above, the seed, plant propagation material or plant is in need of increased root development. In one or more of the embodiments above, the seed, plant propagation material, or plant is a difficult-to-propagate plant or from a difficult-to-propagated plant. In one or more embodiments above, the at least one diapocarotenoid plant growth regulator is applied to the plant within 3-8 days after germination. In one or more of the embodiments above, the seed, plant propagation material or plant is in need of increased resistance to abiotic stress. In one or more of embodiments above, the at least one diapocarotenoid plant growth regulator is selected from the group consisting of 12,12'-diapocarotene-12,12'-dial, 1,1,8,8-tetramethoxy-2,7-dimethyl-2,4,6-octatriene, and the combination thereof, and regulating plant growth comprises one or more of promoting root development, increasing nutrient uptake, enhancing resistance to abiotic stress factors, invigorating plant growth, increasing plant yield, and increasing plant biomass. In one or more of the embodiments above, the at least one diapocarotenoid plant growth regulator is selected from the group consisting of 8,15-diapocarotene-8,15-dial, 8,12'-diapocarotene-8,12'-dial, and the combination thereof, and regulating plant growth comprises inhibiting root growth. In one or more of the embodiments above, the precursor of the at least one diapocarotenoid plant growth regulator is all-trans-3-OH-β-12'-carotenal and regulating plant growth comprises promoting root development. In one embodiment, applying further comprises treating land at risk for being colonized by an unwanted plant with the at least one diapocarotenoid plant growth regulator.

The present disclosure further features a kit for regulating plant growth comprising a composition for promoting plant growth comprising, in one or more containers at least one diapocarotenoid plant growth regulator represented by formula (I)

R-A-R    (I)

or a precursor, salt, solvate, stereoisomer, or polymorph thereof; wherein R is a monovalent carbonyl moiety selected from the group consisting of aldehydes, ethers, diethers, carboxylic acids, alcohols, and ester carboxylates and A is a bivalent polyene represented by the bivalent moiety —(CR$_a$=CRb)$_x$— wherein x is the number of double bonds in polyene moiety A, and R$_a$ and Rb are, independently, hydrogen, a hydrocarbon, or an alkoxy group and an agronomically acceptable carrier.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIGS. 1A-D provide the structures of β-carotene and representative apocarotenoids and diapocarotenoid dialdehydes according to one or more embodiments of the present disclosure: (A) β-carotene and apocarotenoids D'orenone β-apo-13-carotenone), β-ionone, and β-cyclocitral. (B) dialdehydes 1-6 ("Diapo1" [10,14'-diapocarotene-10,14'-dial; (2E,4E,6E)-4-methylocta-2,4,6-trienedial]; "Diapo2" [8,15-diapocarotene-8,15-dial; (2E,4E,6E)-2,6-dimethylocta-2,4, 6-trienedial]; "Diapo3" [12,12'-diapocarotene-12,12'-dial; (2E,4E,6E)-2,7-dimethylocta-2,4,6-trienedial], referred to herein as "anchorene"; "Diapo4" [8,14'-diapocarotene-8, 14'-dial; (2E,4E,6E,8E)-2,6-dimethyldeca-2,4,6,8-tetraenedial]; "Diapo5" [8,12'-diapocarotene-8,12'-dial; (2E,4E,6E, 8E,10E)-2,6,11-trimethyldodeca-2,4,6,8,10-pentaenedial]; "Diapo6" [10,10'-diapocarotene-10,10'-dial; (2E,4E,6E,8E, 10E)-4,9-dimethyldodeca-2,4,6,8,10-pentaenedial], respectively), (C) anchorene (AR) analogues (AR di-alcohol [(2E, 4E,6E)-2,7-dimethylocta-2,4, 6-triene-1, 8-diol]; AR di-acid [(2E,4E,6E)-2,7-dimethylocta-2,4,6-trienedioic acid]; and AR di-ethyl ester [diethyl (2E,4E,6E)-2,7-dimethylocta-2,4, 6-trienedioate]), and (D) anchorene (AR) analog 1 [(2E,4E, 6E)-1,1,8, 8-tetramethoxy-2,7-dimethyl-2,4,6-octatriene].

FIGS. 3A-J show the effects of putative carotenoid derivatives on root development in Arabidopsis according to one or more embodiments of the present disclosure. (A) is a color photograph of representative Col-0 seedlings treated by different carotenoids derivatives with the arrows (red) indicating emerged ANRs. (B) is a histogram representing primary root length quantification of Col-0 seedlings treated by various carotenoid derivatives (n=26, 26, 27, 25, 12, 26, 24, 28, 21, 28, 15, 28, 22, 24, 27, 23, 13, 28, 21, 27, 26, and 25 respectively). In (A) and (B), 7 days after germination (DAG) seedlings were vertically grown in half Murashige and Skoog medium (MS) agar plates supplied with 5 μM or 25 μM of the indicated chemicals. Mock was supplied with acetone. (C) is a color photograph of representative Col-0 seedlings showing that root apical meristem (RAM) excision promotes ANR emergence. (D) is a graph quantifying the percentage of seedlings with 0, 1 and 2 ANRs emergence in (C) (n=61, 53 respectively). (E) is a histogram showing 5 and 10 μM anchorene has no effect on lateral root emergence (n=45 for each treatment). (F) is a histogram showing minor inhibition by anchorene on primary root length (8 DAG Col-0 seedlings grown in different concentrations of anchorene were analyzed). (G) is a color photograph of representative seedlings treated by different anchorene analogs. (H) is a histogram showing quantification of different anchorene analog effects on ANR emergence. Concentrations for each chemical used in (G) and (H) are as indicated. In (F) and (H), one-way ANOVA with Tukey multiple-comparison test was used for statistical analysis; data are represented as mean±SD, P<0.05; Different letters denote significant differences; in (F), n=19, 20, 22, and 23, respectively, and in (H), n=48, 60, 52, 49, 51, 52, 48, 48, 54, 53, and 55, respectively. (I) is a histogram showing AR analog 1 exhibits similar activity with anchorene in promoting ANR formation. 5 and 10 μM AR and AR analog 1 were used, respectively. AR: anchorene. (J) is a concentration-response curve with (filled squares) and without (filled circles) RAM excision.

Figure 2A:
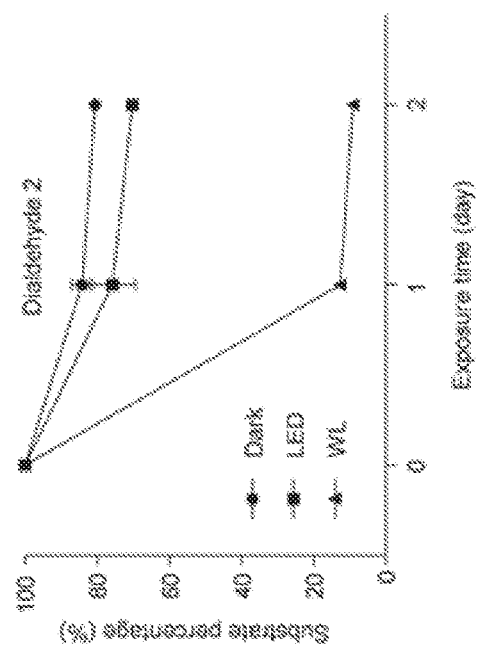
FIG. 2A-D show light condition dependent stability of diapocarotenoid plant regulators anchorene (A) dialdehyde 2 (B) and dialdehyde 5 (C), under darkness, white light (LED) and fluorescent white light (WL) conditions according to one or more embodiments of the present disclosure. Each compound (200 μL) was incubated in three different light conditions: darkness, LED and WL for 1 day (24 h) and 2 days (48 h) at 22° C. The degradation was monitored by LC-MS/MS analysis. (D) quantifies anchor root (ANR) emergence under WL condition and LED conditions and shows no significant difference within groups.

FIGS. 4A-F show the ANR emergence promoting effects of anchorene according to one or more embodiments of the present disclosure. (A) illustrates a proposed pathway for production of anchorene from β-carotene by oxidative cleavage. (B) is a color photograph of representative seedlings which shows that anchorene specifically promotes ANR emergence in a concentration dependent manner. Eight DAG seedlings with or without cutting RAM are shown. Scale bars=1 cm. (C) is a graph quantifying anchorene effects on ANRs emergence. One-way ANOVA with fisher's LSD multiple-comparison test was used. Data are represented as percentage of seedlings with 0, 1 or 2 ANRs, P <0.05, n=53, 49, 49, 58, 40, 57, 43, and 51, individually. Values above the column sharing a letter do not differ significantly. In (B) and (C), "UC" indicates uncut, while "C" indicates that RAM were cut at 5 DAG and the seedling was grown for another 3 days. (D) are representative digital images obtained using confocal microscopy and showing formation of one or two opposing ANRs at collet. White arrows indicate primary ANRs, and red arrows indicate secondary ANRs (or lateral roots). (E) are color photographs showing ANRs are always in the same geometric plane with cotyledons. White arrows indicate ANRs, and red arrows indicate cotyledons. (F) provides representative digital images showing that ANRs are initiated from the pericycle cells of primary root. The left image shows the initiation site of ANR and the right image shows the primordia of ANR.

FIGS. 5A-E provide characterization of ANR development by different DR5 (auxin responsive) marker lines according to one or more embodiments of the present disclosure. (A) is a color image of 3 DAG pDR5::LUC seedlings indicating ANR initiation. (B) are color images of 5 DAG pDR5::LUC seedlings treated by NF and anchorene. Arrow heads in (A) and (B) indicate root-hypocotyl junction. (C) are color confocal microscopy images showing the effects of anchorene on 3 DAG to 6 DAG pDR5rev:: GFP seedlings. White arrows indicate ANR initiation site, and the red arrow indicates emerged ANR. (D) are color confocal microscopy images showing anchorene activates the DR5 signal in ANR primordia and its abutting endodermis region of Mock and NF treated seedlings. White arrows indicate ANR primordia, and the red arrows indicate endodermis cells. (E) show GFP fluorescence intensity quantification of different treated seedlings from (D). One-way ANOVA with fisher's LSD multiple-comparison test was used for statistical analysis. Data are represented as mean±SD, P <0.05, n=11, 12, 7, and 8, respectively from two independent experiments. Different letters denote significant differences. 1 μM NF and 20 μM anchorene were used.

FIGS. 6A-H show carotenoid-deficient seedlings have reduced anchor root capacity (ANRC), according to one or more embodiments of the present disclosure. (A) is a color photograph of representative seedlings showing the effect of different carotenoids biosynthesis inhibitors NF, CPTA and D15 on ANRs and lateral root formation capacity. (B) provides quantification of ANR and lateral root capacity after cutting RAM in Mock, NF-, CPTA- and D15-treated Col-0 seedlings. Student's t-test were performed compared to corresponding Mock treatment for statistical analysis. ("**" <0.0001). Data are represented as mean±SD, n=196 (Mock), 90 (NF), 79 (CPTA), and 113 (D15) individually from 4 independent replicates. 1 μM NF, 100 μM CPTA and 150 μM D15 were used. (C) is a color photograph of representative seedlings showing the ANR emergence of col-0, psy and ispH1 with or without cutting RAM. (D) provides ANRC quantification of col-0, psy and ispH1. Student's t-test ("*" <0.001), n=25, 52, and 46 individually. Data are represented as mean±SD. (E) is a color confocal microscopy image showing ANR primordia of NF treated pWOX5::GFP seedling (F) is a color confocal image showing ANR primordia of psy seedlings. Five DAG seedlings were used for confocal examination in (E) and (F). In (B) and (D), 8 DAG seedlings with or without cutting RAM are shown. "UC" indicates uncut, while "C" indicates that RAM were cut at 5 DAG and then the seedlings were grown for another 3 days. Scale bars=1 cm in (B) and (D). (G) is a histogram showing the effect of anchorene and D15 on LR capacity (LR No. after RAM excision). Data are presented as mean±SD (one-way ANOVA with Tukey multiple-comparison test, P<0.05; different letters denote significant differences. 20 μl anchorene and 100 μl D15 were used. (H) is an illustration of the carotenoid biosynthesis pathway. Carotenoid- and apocarotenoid-specific biosynthesis steps are depicted in black arrow, and upstream steps are shown in dashed dark arrow. Carotenoid biosynthesis mutants used in this study are indicated (gray italics). The steps inhibited by NF and CPTA are depicted in red color.

FIGS. 7A-F show ANRC of different mutants, according to one or more embodiments of the present disclosure: (A) carotenoid biosynthesis mutants, (B) carotenoids cleavage dioxygenase ccdlnced mutants, (C) ABA biosynthesis-deficient mutants and (F) strigolacton biosynthesis deficient mutants; and the effects on ANRC on (D) SL analog GR24 and (E) ABA. Student's t-test was used for all statistical analysis, *P<0.05, **P<0.01. In (A)-(C) and (F), data are presented as mean±SD from 3 or more independent replicates. In (D), n=25 and 28, respectively; 1 μM GR24 was used. In (E), n=46, 45, and 30, respectively, and 0.1 and 0.5 μM ABA were used.

FIGS. 8A-E show auxin signaling and auxin transport are important for ANR development according to one or more embodiments of the present disclosure. (A) provides color photographs of representative seedlings showing the effects of anchorene on ANR emergence and ANRC in Col-0 and arf7arf19. (B) are color photographs of representative seedlings showing the effects of auxin analog NAA and auxin transport inhibitor NPA on ANR mergence and ANRC. (C) are color photographs of representative seedlings showing that anchorene partially rescues the inhibitory effects of NPA on ANRC. (D) are color photographs of representative seedlings showing that anchorene partially rescues the gravitropism of NPA treated seedlings. (E) is a histogram showing the ANRCs of auxin transporter mutants pin3-4 and wild-type seedlings are not significantly different. Student's t-test was used for statistical analysis, n=26 and 22, respectively.

FIGS. 9A-F characterize the ability of anchorene (AR) to rescue the ANRC in carotenoids deficient seedlings according to one or more embodiments of the present disclosure. (A) is a color photograph of representative seedlings showing anchorene rescued the ANRC in NF- or CPTA-treated seedlings. (B) is a histogram quantifying ANRC in (A). (C) is a color photograph of representative seedlings showing anchorene rescued ANRC in the psy mutant. (D) shows quantification of ANRC in (C). In (A) and (C), 8 DAG seedlings with or without cut RAM are shown; "−" and "+" indicates without or with anchorene application respectively; "UC" indicates uncut, while "C" indicates RAM was cut at 5 DAG and then the seedlings were grown for another 3 days; scale bars=1 cm; 1 µM NF, 100 µM CPTA and 20 µM anchorene were used. In (B) and (D), one-way ANOVA with Tukey multiple-comparison test was used for statistical analysis; data are represented as mean±SD, P<0.05, different letters denote significant differences; in (B), n=51, 48, 42, 42, 49, and 36 individually, and in d, n=50, 47, 33, and 44 individually. (E) provides LC-MS spectra identifying endogenous anchorene from Arabidopsis root extracts. Extracted ion chromatography (EIC) of anchorene from AS, Arabidopsis root extract and Arabidopsis root extract spiked with AS. In (E), peak II indicates endogenous anchorene as determined based on the same accuracy mass and chromatography retention time as that observed with authentic AS (from Arabidopsis root extract) or spiked AS (from Arabidopsis root extract spiked with AS). Peaks I and III indicate putative anchorene isomers according to the accuracy mass and ion spectra (shown in FIGS. 10A-C). (F) confirms identification of endogenous anchorene from Arabidopsis root extract as evidenced by the same pattern of product ion spectra with AS. AS: anchorene standard; AR: anchorene.

FIGS. 10A-C show the identification of potential anchorene isomers and the distribution of anchorene in Arabidopsis. (A) shows EICs of anchorene (peak II) and its isomers (peak I and peak III) from Arabidopsis shoot tissue (upper) and root tissue (middle), and EIC of authentic anchorene standard (bottom). (B) shows product ion spectra of endogenous anchorene isomers including peak I (upper) and peak III (middle) in A, and authentic anchorene standard (bottom). (C) shows quantification of tissue-specified endogenous anchorene content in Arabidopsis. Two-tailed Student's t-test was used for statistical analysis, n=4; ***P<0.001. 12-day-old seedlings were used for anchorene identification and quantification.

FIGS. 11A-I show auxin signaling and auxin distribution are important for ANR development according to one or more embodiments of the present disclosure. (A) quantifies the effects of anchorene (AR) on ANRC in Col-0 and arf7arf19 mutant. (B) is a confocal microscope image showing arf7arf19 has no ANR primordia. (C) is a histogram showing the effect of auxin analog NAA, and auxin transport inhibitor NPA on ANRC. (D) is a histogram showing anchorene partially rescues the ANRC in NPA treated seedlings. In (A), (C) and (D), one-way ANOVA with Tukey multiple-comparison test was used for statistical analysis; data are represented as mean±SD, P<0.05; in (A), n=49, 51, 39, 43, 44, and 50 individually, in (C), n=25, 26, 28, and 25 individually, and in (D), n=48, 45, 45, and 49 individually; different letters denote significant differences. (E) shows schematics of the partial rescue of root gravitropism in NPA treated seedlings by anchorene. n=27 (Mock), 43 (AR), 41 (NPA), and 45 (NPA+AR); The length of each bar represents the percentage of seedlings showing direction of root growth within that sector. (F) is a histogram quantifying anchorene effects on PIN3-GFP fluorescent intensity in ANR primordia. Student's t-test was used for statistical analysis ("***" <0.001), n=15 (Mock) and 13 (AR) from two independent experiments. (G) and (H) are digital confocal microscopy images showing PIN3-GFP expression in ANR primordia under mock (F) and anchorene treated (H) conditions. 0.1 µM NAA, 1 µM NPA and 20 µM anchorene were used. (I) is an illustration of a seedling showing the collet site from which the 2 mm of tissue at was collected at 5 DAG.

Figure 12A:
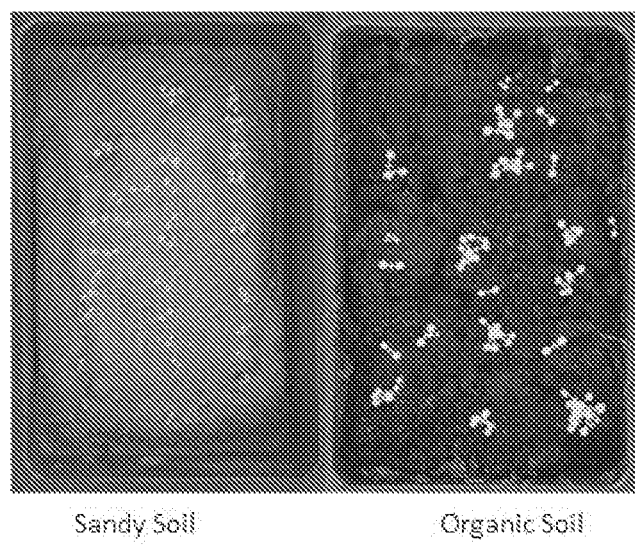
Figure 12B:
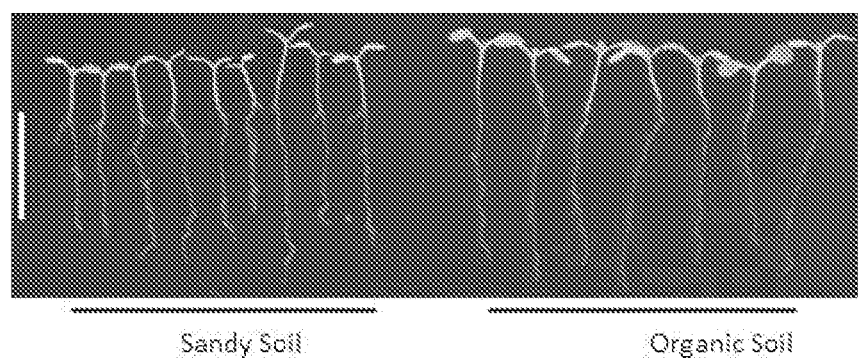

FIGS. 12A-B are color photographs showing Col-0 seedlings grow more ANRs in sandy soil than in organic soil according to one or more embodiments of the present disclosure. (A) shows a top view of 8-day-old Col-0 seedlings grown in sandy soil or organic soil and (B) shows a side view of representative seedlings grown in sandy soil or organic soil.

FIGS. 13A-E provide results of RNA sequencing data showing that anchorene works antagonistically with NPA but mimics RAM excision in transcriptional level in collet according to one or more embodiments of the present disclosure. Venn diagrams (A) and (B) show numbers of the down-regulated (Dn) and up-regulated (Up) genes overlapped by anchorene treatment with NPA treatment (A), and with RAM excision (B). Heatmap clustering (C) and (D) shows that the majority of anchorene and NPA overlapping genes are regulated in an opposite expression pattern (C), while the majority of anchorene and RAM excision overlapping genes are regulated with a similar pattern (D). (E) shows Biological Processes (BP) analysis of overlapping genes of anchorene treatment with NPA treatment, and with RAM excision (-RAM). In E, "Dn" indicates down regulated genes, and "Up" indicates up regulated genes.

FIGS. 14A-E characterize biological functions of ANRs in Arabidopsis according to one or more embodiments of the present disclosure. (A) is a histogram quantifying normal ANR emergence of different Arabidopsis ecotypes. (B) is a histogram quantifying ANRC of different Arabidopsis ecotypes. One-way ANOVA with Tukey multiple-comparison test was used for statistical analysis, data are represented as mean ±SD from three independent replicates, P<0.05. (C) shows color photographs of representative seedlings grown in sandy soil and organic soil for 8 days. White arrows indicate the root-hypocotyl junction, and the red arrows indicate the emerged ANRs. (D) is a histogram quantifying ANR emergence rate of seedlings grown in sandy soil and organic soil. (E) is a histogram quantifying increase in root and shoot biomass of Arabidopsis seedlings. In (D) and (E), data are represented as mean ±SD, Student's t-test ("*" <0.05, "**" <0.01) from three independent experiments was used for statistical analysis.

Figure 15A:
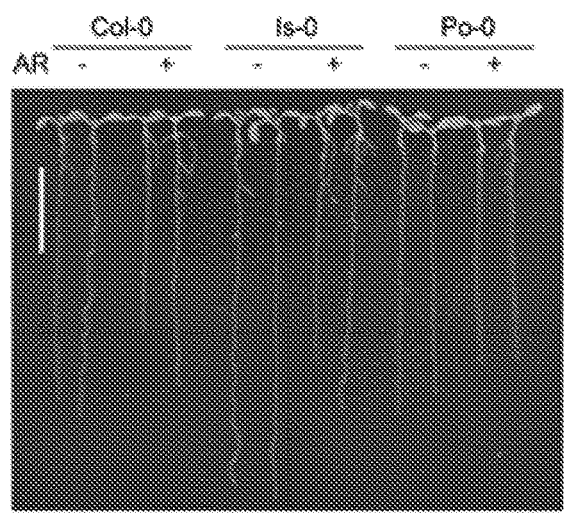
Figure 15B:
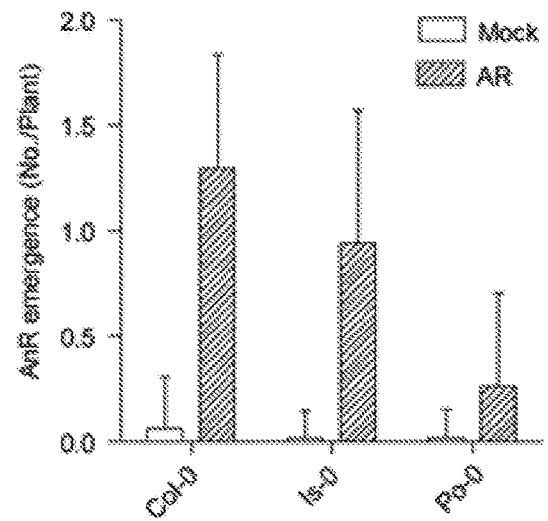

FIGS. 15A-B show anchorene promotes ANR emergence in different Arabidopsis ecotypes according to one or more embodiments of the present disclosure. (A) is a color photograph of representative seedlings showing the effects of anchorene on the ANR emergence of Col-0, Is-0 and Po-0. (B) is a histogram quantifying the effects of anchorene on the ANR emergence of Col-0, Is-0 and Po-0. n=48, 54, 57, 57, 54, and 54, respectively.

Figure 16A:
Figure 16B:
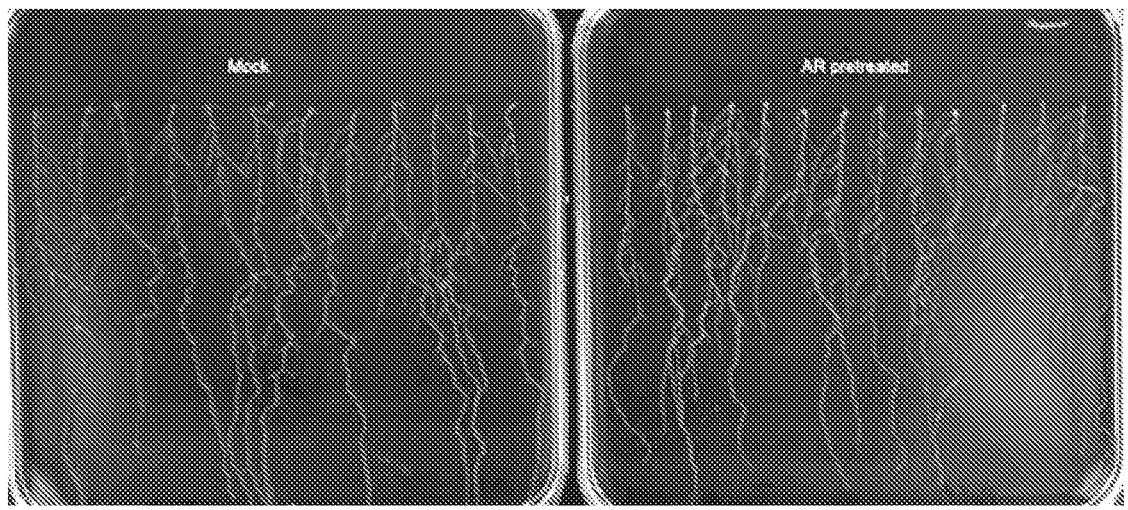

FIGS. 16A-B show ANRs increase seedling biomass in Arabidopsis according to one or more embodiments of the present disclosure. (A) shows color photographs of 14-day-old seedlings grown in half MSO agar plates with or without anchorene pretreatment. (B) shows color photographs showing root architecture of 14-day-old seedlings vertically grown in half MSO agar plates with or without anchorene pretreatment.

Figure 17:
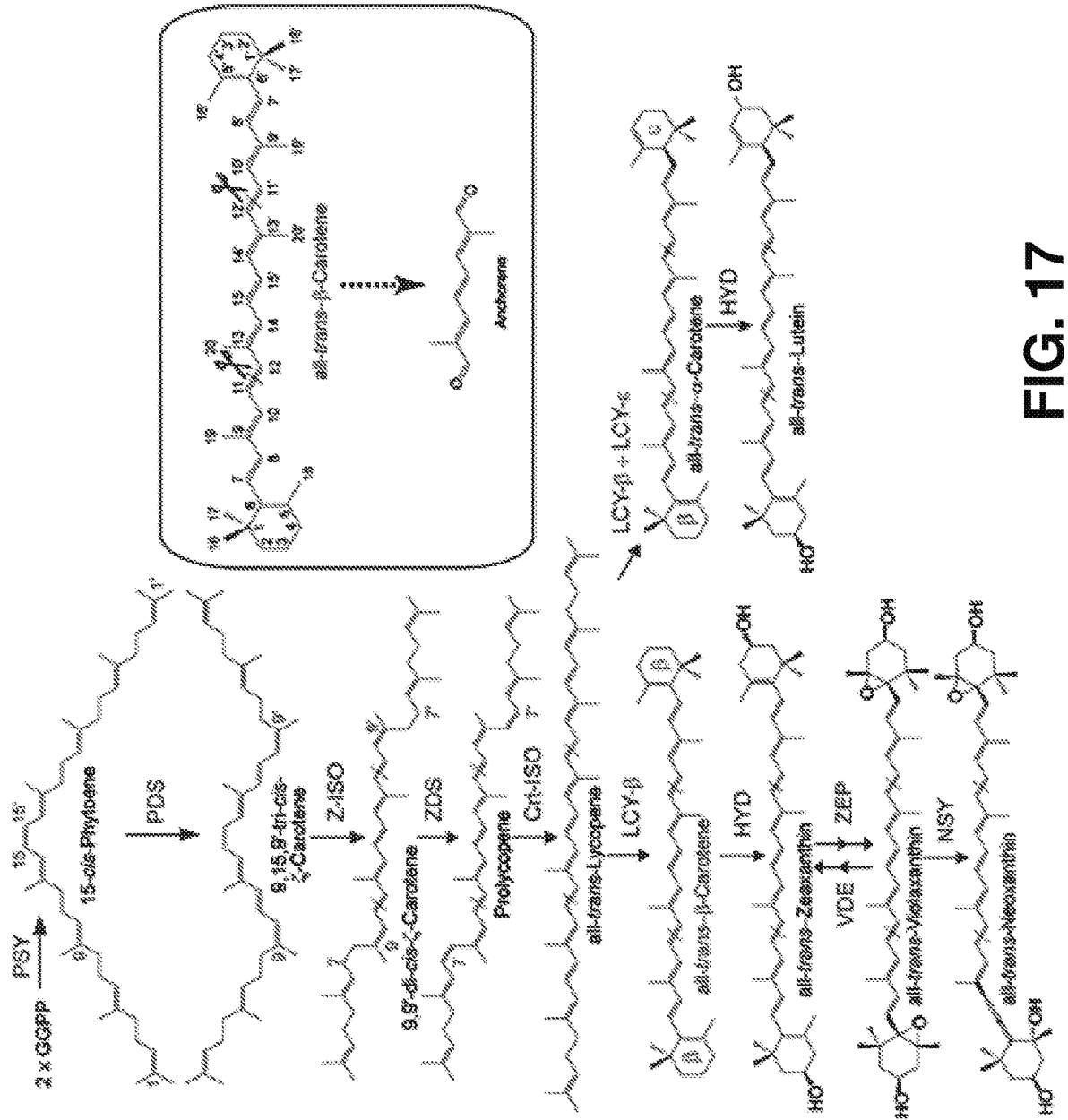

FIG. 17 is a schematic of the biosynthesis pathway of carotenoids and supposed precursors for anchorene in plants according to one or more embodiments of the present disclosure. (Inset) all-trans-β-carotene is taken as an example for the C-atom numbering of carotenoids and the producing the anchorene. Enzyme names are shown in blue; red dashed lines in carotenoids indicate the position that could be oxidatively cleaved to produce anchorene.

FIGS. 18A-B show anchorene promotes adventitious root formation according to one or more embodiments of the present disclosure. (A) shows color photographs of representative seedlings. (B) is a histogram showing quantification of anchorene effect on adventitious root formation. 4-day-old dark grown Arabidopsis seedlings were transferred to plates with indicated anchorene concentrations (µM) and grew for another 5 days. The red arrows indicate adventitious roots. AR: anchorene. Student's t-test was used for data analysis (**P<0.01).

FIGS. 19A-E show anchorene promotes root growth in rice according to one or more embodiments of the present disclosure. (A) shows a color photograph the hydroponic system for rice growing. Color photographs (B) and (C) show the comparison of the whole rice plant (B) and the root structure (C) under Mock and Anchorene treated conditions. (D) and (E) show quantification (cm) of the primary root length (D) and shoot length (E) under Mock and Anchorene treated conditions. 20 µM anchorene was used. The Nipponbare ecotype rice seeds were germinated for 4 days, and then transferred to Hoagland media hydroponic system with or without anchorene treatment for another 6 days. Anchorene was changed every 2 days for three times.

FIGS. 20A-C show anchorene promotes root growth in maize according to one or more embodiments of the present disclosure. (A) represents the timeline for the hydroponic system for maize growing and anchorene treatment. (B) shows color photographs of maize seedlings grown with or without anchorene treatment. (C) is a histogram quantifying the root and shoot length (cm) of maize seedlings with or without anchorene treatment FIGS. 21A-D show a diapocarotenoid precursor (OH-Apo12') is converted into anchorene in plants, according to one or more embodiments of the present disclosure. (A) shows the structure of compounds OH-Apo10' and OH-Apo12'. (B) is a histogram showing quantification of achorene in mock, OH-Apo10', and OH-Apo12' fed Arabidopsis seedlings. (C) is a histogram showing ANR emergence in mock, OH-Apo10', and OH-Apo12' fed seedlings. (D) shows the proposed formation of anchorene from 9-cis-Zeaxanthin. One of maize NCED, VP14, has been shown to cleave 9-cis-Zeaxanthin. For B and C, two-tailed Student's t-test, P<0.01, * P<0.001; in B, n=4; in C data are presented as mean ±SD from 3 independent replicates; in B, 12-day-old seedlings were incubated with indicated chemicals for 6 hours and 20 µM OH-Apol10' and OH-Apo12' were used; and C, 10 µM OH-Apol ' and OH-Apo12' were used and the ANR No./plant was counted at 10 DAG.

Figure 22A:
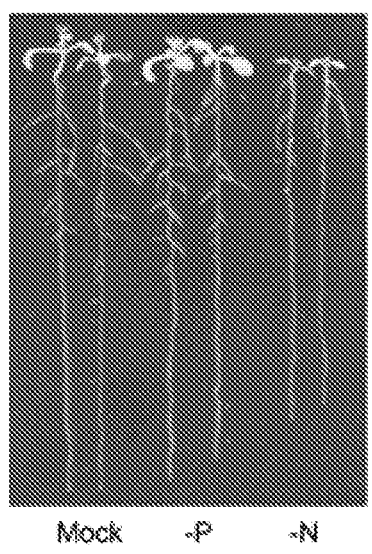
Figure 22B:
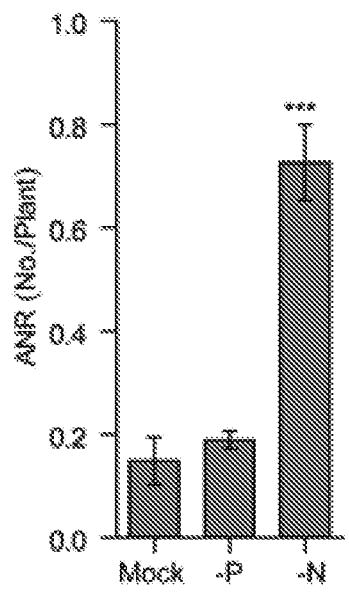
Figure 22C:
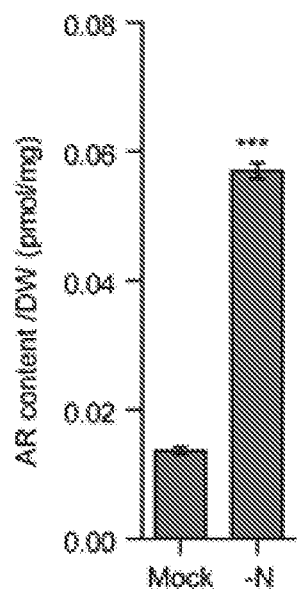

FIGS. 22A-C show endogenous anchorene production and ANR formation can be triggered by nitrogen deficiency, according to one or more embodiments of the present disclosure. (A) shows a color photograph of representative seedlings; (B) is a histogram showing ANR No./plant of 10 dps Col-0 seedlings grown in agar plates with Hoagland (Mock), phosphorous deficiency (-P) or nitrogen deficiency (-N) media; (C) is a histogram showing anchorene contents of root tissues of seedlings growth in Hoagland and -N media plates. In B and C, data are presented as mean ±SD from 3 independent experiments respectively and pared two-tailed Student's t-test was used; ***P<0.001.

Figure 23A:
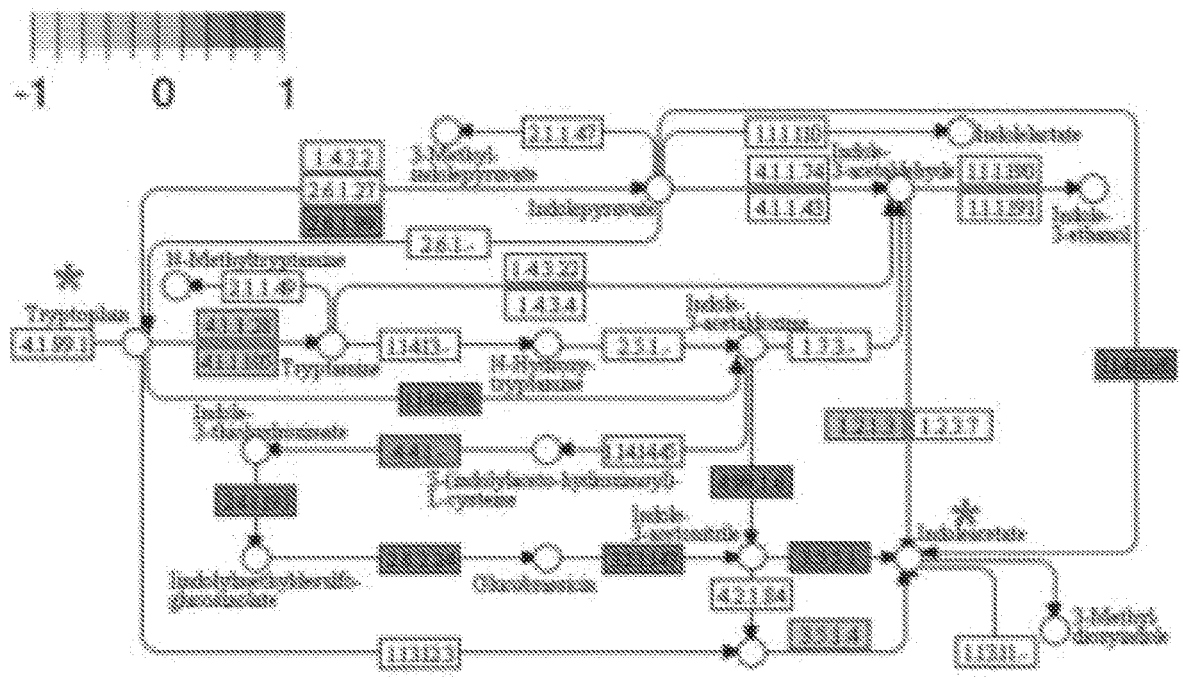
Figure 23B:
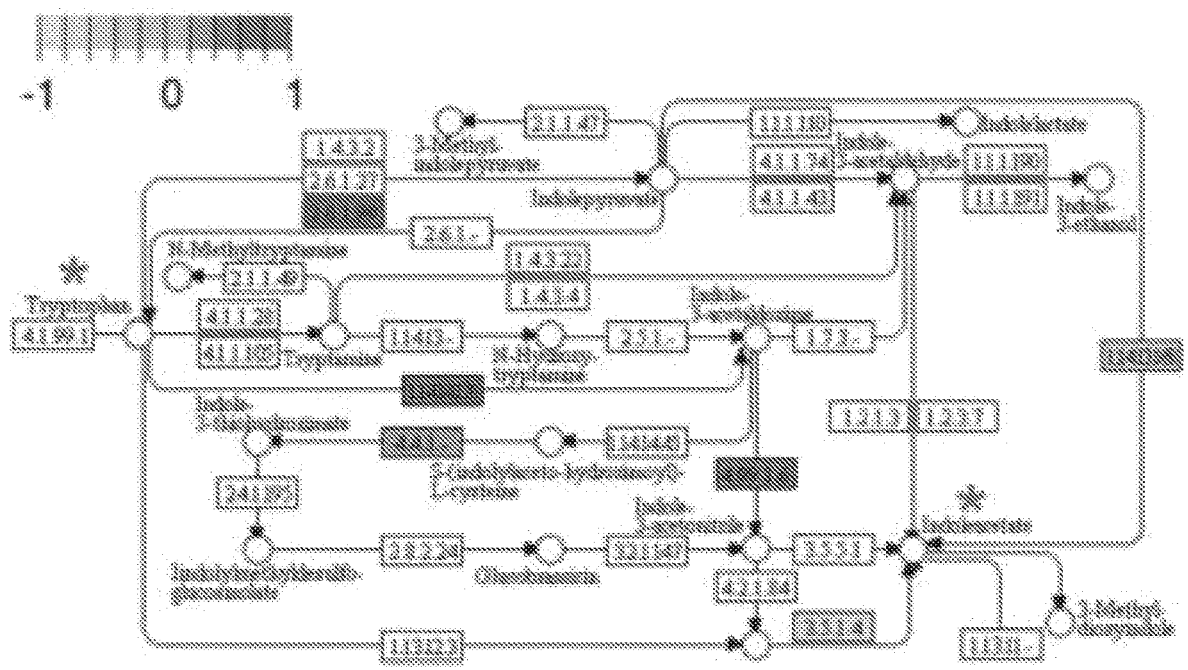

FIGS. 23A-B show tryptophan-auxin biosynthesis pathway regulated by anchorene (A) or RAM excision (B) in the partial KEGG Arabidopsis tryptophan metabolism pathway (KEGG id: ath00380), according to one or more embodiments of the present disclosure. The up-regulated genes and down-regulated genes are marked as red and blue colors, respectively; tryptophan and indole acetate are marked by red stars.

Figure 24A:
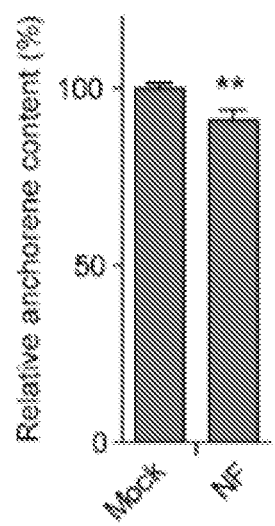
Figure 24B:
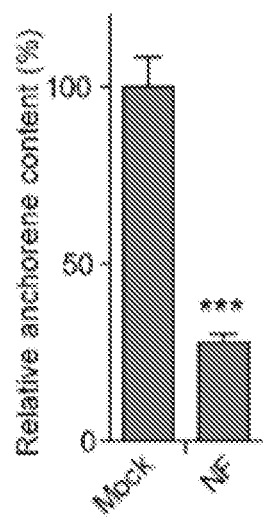

FIGS. 24A-B show relative anchorene content in mock and short term (A) or continuous (B) NF treated Arabidopsis seedlings, according to one or more embodiments of the present disclosure. Two-tailed Student's t-test, n=3 in A and n=4 in B; P<0.01; *P<0.001. In A, 11 day-old seedlings were treated by NF for another 24 hours. 2 µM NF was used. 12 day-old seedlings were used for anchorene quantification.

Figure 25:
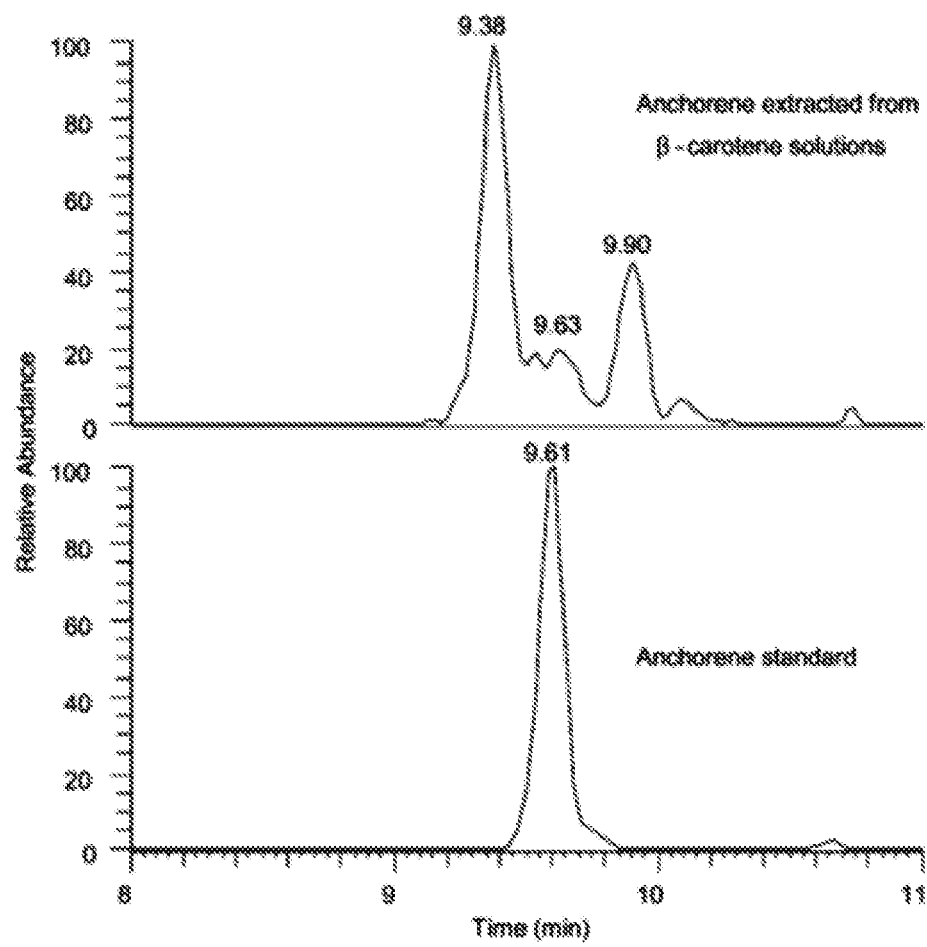

FIG. 25 shows anchorene detection from a β-carotene organic solution, according to one or more embodiments of the present disclosure. Extracted-ion chromatography (EIC) of anchorene extracted from β-carotene organic solution (upper) and EIC of authentic anchorene standard (bottom). The solution was prepared by dissolving 10 µg β-carotene in 1 mL acetonitrile, followed by sonication for 20 mins Extraction, derivation and LC-MS analysis were performed following the protocol used for plant material, as described below.

The application file contains at least one drawing executed in color. Copies of this patent or patent application publication with color drawing(s) will be provided by the Office upon request and payment of the necessary fee.

DETAILED DESCRIPTION

Embodiments of the present disclosure describe diapocarotenoid plant growth regulators, compositions comprising at least one diapocarotenoid plant growth regulator, and methods of regulating plant growth comprising applying an effective amount of at least one plant growth regulator, or composition comprising at least one diapocarotenoid plant growth regulator, to a seed, plant, plant propagation material, or plant growth medium.

Definitions

The terms recited below have been defined as described below. All other terms and phrases in this disclosure shall be construed according to their ordinary meaning as understood by one of skill in the art.

The term "about" when used before a numerical designation, e.g., temperature, time, amount, and concentration, including range, indicates approximations which may vary by (+) or (−) 10%, 5% or 1%.

As used herein, the term "agronomically acceptable carrier" refers to any material which can be used to deliver a plant growth regulator (e.g., a diapocarotenoid plant growth regulator) to a seed, plant, plant propagation material, or plant growth medium. without having an undesired effect on plant growth, medium growth properties (e.g., negatively altering soil structure or soil drainage) upon application.

As used herein, the term "anchorene" refers to (2E,4E, 6E)-2,7-dimethylocta-2,4,6-trienedial (formula (IV) below).

As used herein, "anchor root" or "ANR" refers to post-embryonic roots that originate from the collet.

As used herein, the term "applying" in reference to a composition or formulation of the present invention refers to any means for treating seeds, soil, and plants with a composition or formulation of the present inventions including, for example, seed dipping or soaking, soil drench, mixing with plant growth medium, pouring onto/into plant growth medium, pipetting onto/into plant growth medium, pipetting onto plants, irrigating plants with liquid compositions of the present inventions, spraying compositions of the present inventions, e.g., foliar spraying. The term is intended to encompass methods for applying liquid, solid, or other form (e.g., gel) or mixture thereof to a seed, plant, plant propagation material, or plant growth medium. The term "applying", or variations thereof (such as "application" and "applied"), is used to mean that the seed, plant, plant propagation material, or plant growth medium has direct contact or will have direct contact (e.g., by diffusion through a loaded support) with the diapocarotenoid plant growth regulator compound or compositions by methods known in the art for treating plants to regulate plant growth. Applying does not encompass endogenous production of one or more of the plant growth regulators described in the present disclosure.

As used herein, "collet" refers to the root tissue located at the root-hypocotyl junction.

As used herein, "diapocarotenoid" refers to a carotenoid derivative with a carbon skeleton shortened by removal of fragments from both ends.

As used herein, the term "plant growth medium" refers to any soil (of any composition) or soil-free (e.g., hydroponic) medium that is suitable for growing and cultivating a plant, including naturally occurring and/or synthetic substances suitable for growing and cultivating a plant.

As used herein, the term "weed" refers to any plant a plant grower, such as a farmer, landscaper, and gardener, would like to eliminate that is growing in a container, such as a pot, or in a field. For example, a grass plant growing in a beet field is a weed if the beet grower seeks to eliminate the grass plant.

As used herein, "plant propagation material" refers to plant tissue for asexual production of a plant, i.e., tissue for producing progeny by regenerating an entire plant including leaf cuttings, stem cuttings, root cuttings, single plant cells (protoplasts) and callus.

As used herein, the term "precursor" refers to exogenous carotenoid or apocarotenoid compounds that are converted directly or indirectly to a diapocarotenoid plant growth regulator in planta via enzymatic or non-enzymatic pathways.

Embodiments of the present disclosure describe diapocarotenoid plant growth regulators, compositions comprising one or more diapocarotenoid plant growth regulators and methods of regulating plant growth by applying to plant propagation material, a plant or plant growing medium a composition comprising an effective amount of one or more diapocarotenoid plant growth regulators.

Diapocarotenoid Plant Growth Regulators

Plant growth regulators affect the physiology of plant growth. Plant growth regulators are organic compounds, either synthesized in the plant or as an applied substance, that can either increase or decrease plant growth. More specifically, a plant growth regulator of the present disclosure may, for example, regulate auxin distribution, modify root architecture, promote plant growth (e.g., increase biomass of roots and/or stems (dry or fresh weight)), increase abiotic stress factors resistance, or inhibit root growth, and this change can be observed relative to untreated seeds, plant propagation material, plants, or plant growth medium.

The present disclosure describes diapocarotenoids capable of regulating plant growth. Diapocarotenoids compounds described herein are putative carotenoid-derived metabolites which regulate developmental processes in plants (e.g., regulate at least the formation/emergence of anchor roots). A diapocarotenoid plant growth regulator according to one or more embodiments described in the present disclosure can exert its plant growth regulating activity upon application to a seed, plant propagation material, plant, or to plant growth medium where a plant may grow.

The present disclosure describes diapocarotenoid plant growth regulators, or salts thereof, represented by formula I:

$$R\text{-}A\text{-}R \qquad (I)$$

wherein R is a monovalent carbonyl moiety, and A is a bivalent linear polyene.

The monovalent carbonyl moiety is selected from the group consisting of aldehydes, ethers, diethers, carboxylic acids, alcohols, and ester carboxylates. In one embodiment, R can be an aldehyde moiety, and therefore, the diapocarotenoid plant growth regulator can be referred to as a dialdehyde. In another embodiment, R can be a diether, i.e., a group that contains two alkoxy groups, which may be referred to as a tetraalkoxy derivative of the bivalent linear polyene (e.g., a tetramethoxy derivative).

Polyene moieties are generally known in the art as polyunsaturated organic compounds that contain at least three alternating double and single carbon-carbon bonds (e.g., a polyacetylene moiety). The polyene can be extensively or fully conjugated. The polyene chain can be unsubstituted or substituted. For example, an alkyl group selected form a group consisting of $C_1$-$C_6$ alkyl groups such as a methyl or ethyl group, can replace a hydrogen of the polyene backbone. For example, the polyene can be a series of isoprene units (e.g., a polyisoprenoid). In another example, an alkoxy group (e.g., methoxy or ethoxy group) can replace hydrogen. The polyene moiety can be an all hydrocarbon chain whether substituted or unsubstituted.

In one embodiment, bivalent polyene moiety A is a hydrocarbon moiety with no heteroatoms. For example, bivalent polyene moiety A can be a $C_4$-$C_{20}$ or $C_5$-$C_{10}$ moiety with no heteroatoms. Alternatively, bivalent moiety A is a bivalent $C_8$ or $C_{13}$ moiety with no heteroatoms.

In one embodiment, bivalent polyene moiety A is represented by the bivalent moiety —$(CR_a\!\!=\!\!CR_b)_x$—, wherein x is the number of double bonds in polyene moiety A (e.g., x is 2-10, 2-6, 3-5, or x is 3 or 5), and $R_a$ and $R_b$ can be, independently, hydrogen or a substituent such as a hydrocarbon (e.g., an alkyl group such as methyl), or an alkoxy group such as methoxy. The substituent can be a hydrocarbon having only carbon and hydrogen atoms and being free of a heteroatom such as oxygen or nitrogen. The double bonds of moieties ($CR_a\!\!=\!\!CR_b$) can be a mixture of cis and trans double bonds or all trans double bonds. For example, the bivalent polyene moiety A can have three conjugated double bonds which are all trans double bonds.

In one embodiment, a diapocarotenoid plant growth regulator of formula (I) is selected from the group consisting of:
a. 10,14'-diapocarotene-10,14'-dial (also known as (2E,4E,6E)-4-methylocta-2,4,6-trienedial), having the structure of formula (II) below:

(II)

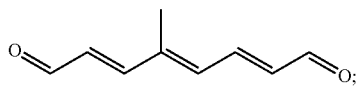

b. 8,15-diapocarotene-8,15-dial (also known as (2E,4E,6E)-2,6-dimethylocta-2,4,6-trienedial), having the structure of formula (III) below:

(III)

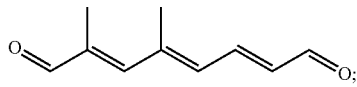

c. 12,12'-diapocarotene-12,12'-dial (also known as (2E,4E,6E)-2,7-dimethylocta-2,4,6-trienedial), "anchorene" having the structure of formula (IV) below:

(IV)

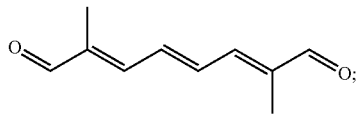

d. 8,14'-diapocarotene-8,14'-dial (also known as (2E,4E,6E,8E)-2,6-dimethyldeca-2,4,6,8-tetraenedial), having the structure of formula (V) below:

(V)

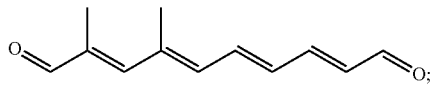

e. 8,12'-diapocarotene-8,12'-dial (also known as (2E,4E,6E,8E,10E)-2,6, 11-trimethyldodeca-2,4,6,8,10-pentaenedial), having the structure of formula (VI) below:

(VI)

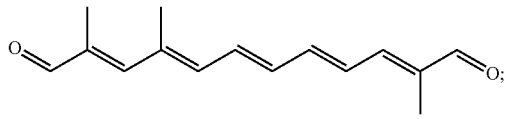

f. 10,10'-diapocarotene-10,10'-dial (also known as (2E,4E,6E,8E,10E)-4,9-dimethyldodeca-2,4,6,8,10-pentaenedial), having the structure of formula (VII) below:

(VII)

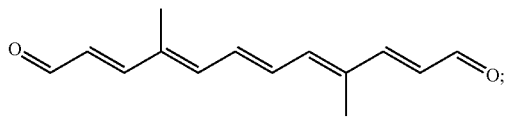

g. (2E,4E,6E)-2,7-dimethylocta-2,4,6-triene-1,8-diol, having the structure of formula (VIII) below;

(VIII)

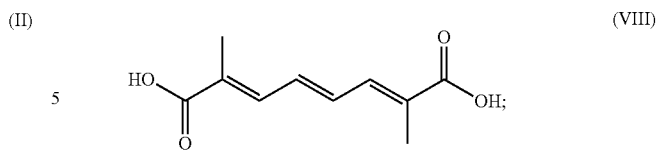

AR di-acid h. (2E,4E,6E)-2,7-dimethylocta-2,4,6-trienedioic acid, having the structure of formula (IX):

(IX)

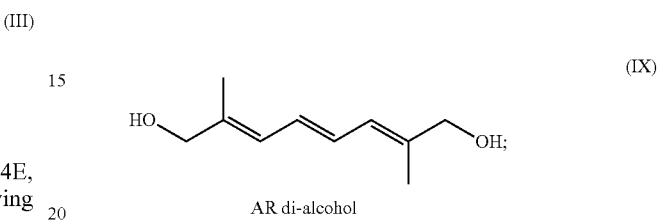

AR di-alcohol i. diethyl (2E,4E,6E)-2,7-dimethylocta-2,4,6-trienedioate, having the structure of formula (X).

(X)

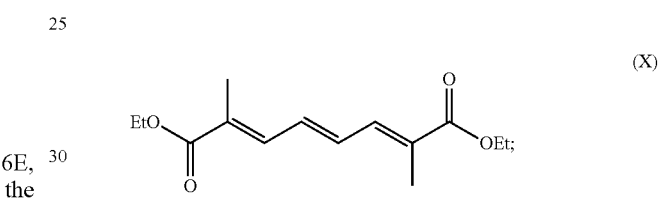

and
j. 2E,4E,6E-1,1,8,8-tetramethoxy-2,7-dimethyl-2,4,6-octatriene, having the structure of formula (XI).

(XI)

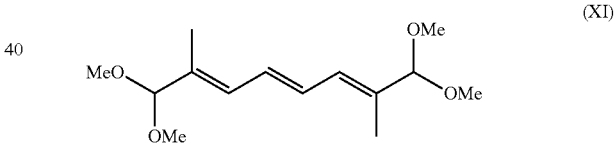

The stereochemistry of the compounds represented by the formula provided herein (e.g., Formulae II-XI) is not particularly limited. Unless otherwise specified, structures shown include all stereoisomers, enantiomers, diastereomers, isomers, and the like, as understood by one skilled in the art. The compounds of Formulae II-XI also include, for example, salts, solvates, polymorphs, and the like. The compounds of formula I encompassed by formulae II-XI can be called "active ingredients" or "active compounds" for regulating plant growth when used directly, or as active ingredients or active compounds of a composition.

Compounds encompassed by formula (I) can be obtained commercially or made by the methods described in the examples described in the present disclosure. For example, 10,14'-diapocarotene-10,14'-dial, having the structure of formula (II) and 8,15-diapocarotene-8,15-dial, having the structure of formula (III) (referred to as "Diapo1" and "Diapo2", respectively, in FIG. 1B) can be formed by CCD8 and cyanobacterial apocarotenoid-cleavage oxygenases. Diapocarotenoids 8,14'-diapocarotene-8,14'-dial, having the structure of formula (V), 8,12'-diapocarotene-8,12'-dial, having the structure of formula (VI), and 10,10'-diapocarotene-10,10'-dial having the structure of formula (VII) (referred to as "Diapo4", "Diapo5" and "Diapo6" in FIG. 1B) have been identified as products of CCD1 enzymes from different plants. Diapocarotenoid 1,1,8,8-tetramethoxy-2,7-dimethyl-2,4,6-octatriene (referred to as "AR analog 1" in FIG. 1B) has been identified as an intermediate in trans carotenoid salt synthesis from tetraethyl trans-2-butenyl-1, 4-bisphosphonate and pyruvic aldehyde dimethyl acetal.

Compounds encompassed by formula (I) can be formed in planta from carotenoids or apocarotenoids capable of being converted to a diapocarotenoid plant growth regulator. Embodiments of the present disclosure include carotenoids and apocarotenoids which are plant growth regulating diapocarotenoid precursors. A suitable diapocarotenoid precursor can be a direct precursor or an indirect precursor. For example, a direct precursor can be converted to a diapocarotenoid plant growth regulator in planta by the activity of a single enzyme or through non-enzymatic cleavage. An indirect precursor can be converted to a diapocarotenoid plant growth regulator in multiple steps involving one or more of enzymatic activity and non-enzymatic cleavage. An exemplary diapocarotenoid precursor can be a carotenoid such as 9-cis-zeaxanthin or an apocarotenoid such as all-trans-3-OH-β12'-carotenal (2E,4E, 6E, 8E,10E,12E)-13 -(4-Hydroxy-2,6,6-trimethyl-1-cyclohexen-1-yl)-2,7,11-trimethyl-2,4,6,8,10,12-tridecahexaenal ("OH-Apo-12'"). For example, OH-Apo-12' can be applied to a plant (e.g., fed) and be converted to the diapocarotenoid plant growth regulator of formula (VI) known as anchorene, resulting in the a change in the growth of the plant relative to an untreated plant, such as an increase in the number of anchor roots/plant.

In one embodiment of the present disclosure the plant growth regulator is the diapocarotenoid compound anchorene, or a precursor, salt, solvate, stereoisomer, or polymorph thereof. Thus, in one embodiment, anchorene is the "active ingredient" or "active compound" for use in compositions and methods for regulating plant growth (e.g., trigger ANRs outgrowth, regulate auxin distribution, facilitate plant growth, increase root and/or shoot biomass, promote formation of adventitious and/or lateral roots).

Figure 21A:
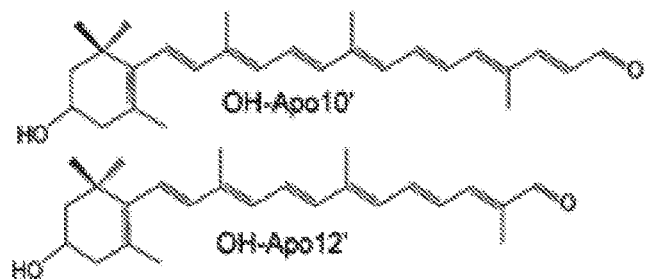
Figures 21B, 21C:
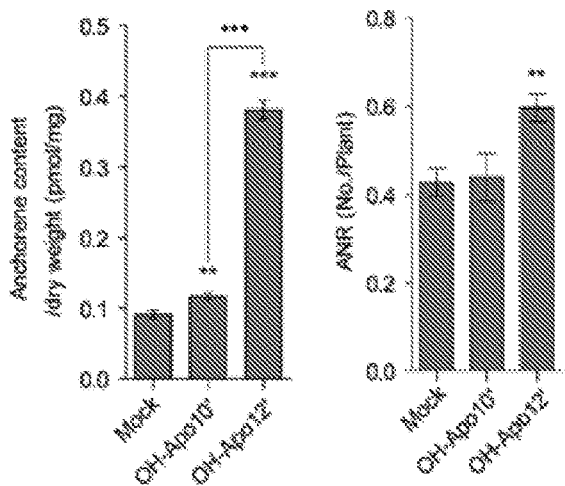
Figure 21D:
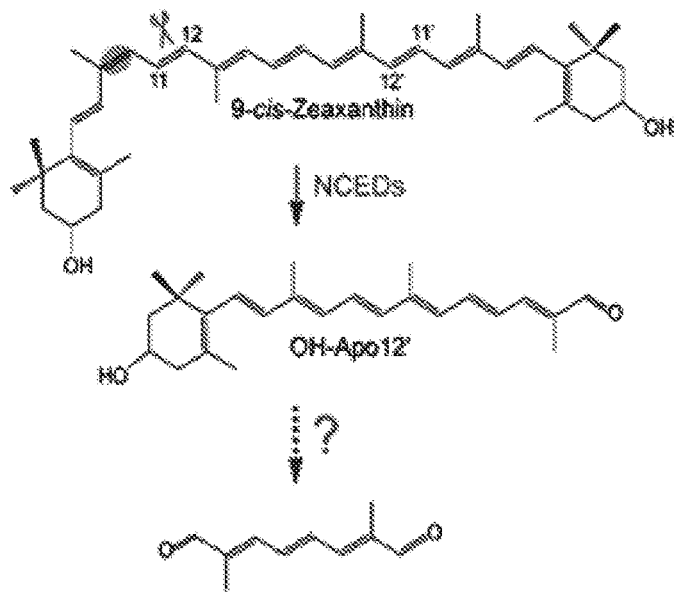

Anchorene is a commercially available compound used as a building block for the manufacturing of different carotenoids on an industrial scale. Evidence presented below show anchorene can be structurally deduced from the central moiety of almost all plant carotenoids and is a natural Arabidopsis metabolite (FIG. 9E-F), likely occurring in different cis/trans isomeric states (see FIGS. 9E-F and 10A-C). Without being bound to particular theory, anchorene may arise from carotenoids starting from ζ-carotene in the carotenoid biosynthesis pathway, by cleaving C11-C12 and C11'-C12' double bonds (FIG. 17). Anchorene could arise in planta from carotenoid cleavage (e.g., as shown in FIGS. 4A and 21D). However, anchorene may be redundantly produced by more than one member of the Arabidopsis CCD family, or formed by a different mechanism, including non-enzymatic cleavage.

In one embodiment of the present disclosure the plant growth regulator is the diapocarotenoid compound of formula XI, or a precursor, salt, solvate, stereoisomer, or polymorph thereof. Thus, in one embodiment, a compound of formula XI is the "active ingredient" or "active compound" for use in compositions and methods for regulating plant growth (e.g., trigger ANRs outgrowth, regulate auxin distribution, facilitate plant growth, increase root and/or shoot biomass, promote formation of adventitious and/or lateral roots).

In one embodiment of the present disclosure the plant growth regulator is the diapocarotenoid compound of formula II or VI, or a precursor, salt, solvate, stereoisomer, or polymorph thereof. Thus, in one embodiment, a compound of formula II or VI can be called an "active ingredient" or "active compound" as known in the art, to regulate plant growth (e.g., regulate auxin distribution, promote anchor root emergence, reduce primary root development). For example, in one embodiment of the present disclosure, a compound of formula II or VI can be applied to a plant as an active ingredient in an amount sufficient to reduce primary root development.

A diapocarotenoid plant growth regulator of the present disclosure (or precursor, salt, solvate, stereoisomer, or polymorph thereof) can be applied, unformulated, directly to the seeds, propagation material, roots or aerial parts of the plant. A compound of the present disclosure may be applied at a point into the growth medium (e.g., the ground) next to a seed, plant propagation material, or plant and allowed to diffuse through the soil and be taken up by the seed, plant propagation material or roots of the plant. A compound of the present disclosure may be applied into the air surrounding a plant, when the compound or composition is be applied in the form of a spray or vapor. A diapocarotenoid plant growth regulator described in the present disclosure can be used alone (i.e., as the only active ingredient or active compound) or combined with one or more other biologically active ingredients to form compositions with multiple active ingredients or active compounds.

Compositions for Regulating Plant Growth

The present disclosure features compositions for regulating plant growth including, in an agronomically acceptable carrier, an effective amount of at least one diapocarotenoid plant growth regulator of formula (I) (or a precursor, salt, solvate, stereoisomer, or polymorph thereof). A diapocarotenoid plant growth regulator compound (or precursor, salt, solvate, or polymorph thereof) of the present invention can be applied, formulated with an agronomically acceptable carrier, directly to a seed, propagation material, plant (including one or more of the roots or aerial parts of the plant) or plant growth medium.

Agronomically acceptable carriers include horticulturally, agrochemically and agriculturally acceptable ingredients as known by those skilled in the art. The carrier itself does not have any significant effect on the plant but enables the diapocarotenoid plant growth regulator to be taken up by a seed or plant. For example, diapocarotenoid plant growth regulators described in the present disclosure can be water-insoluble compounds (e.g., when not in a soluble salt form). An agronomically acceptable carrier for a water-insoluble form of an apocarotenoid plant growth regulator of formula I or precursor thereof can include an organic solvent in which the active ingredient is soluble. Suitable organic solvent carriers can be selected from water-miscible solvents containing only carbon, hydrogen and oxygen such as alcohols, ethers, esters, ketones and acetals. For example, the agronomically acceptable carrier can include ethanol, n-propanol, isopropanol, 1,2-butanediol 1-methyl ether, 1,2-propanediol 1-n-propyl ether or acetone. Co-solvents can be used. The agronomically acceptable carrier can facilitate formulation of the composition for application to a seed, plant, plant propagation materials, or plant growth medium (e.g., by facilitating dispersion in water or plant growth medium). In one embodiment, the carrier comprises water. In one embodiment, acetone is the only agronomically acceptable carrier in the composition. A plant or plant tissue comprising an endogenously produced diapocarotenoid plant growth regulator is not within the scope of an agronomically acceptable carrier.

A composition according to the present disclosure may contain from about 1 ppm (i.e., 0.0001%) to about 99% by weight of at least one diapocarotenoid plant growth regulator of formula (I) (or a precursor, salt, solvate, stereoisomer, or polymorph thereof). Concentrations can be varied. One skilled in the art can adapt the amount of the composition used for a particular application. In addition, one skilled in the art can adapt the amount of the at least one diapocarotenoid plant growth regulator in the composition for a particular application, and at a desired rate of application. Thus, various amounts can be called "effective amounts", as the efficacy for a particular aspect of plant growth such as root inhibition, root promotion, auxin regulation, growth promotion, biomass enhancement, or abiotic stress resistance, can vary for a specific diapocarotenoid plant growth regulator or precursor thereof. The amount of diapocarotenoid plant growth regulator or precursor thereof can be effective for single application or multiple treatments intended to be can be carried out over a pre-determined period. The frequency for applying the composition can be adapted for effective treatment, and an effective concentration can be adapted based on the activity tests known to the skilled person in the art. In addition, an effective amount can be determined based on a comparison of the biological activity observed and the biological activity described in the present disclosure. A composition comprising an effective amount of at least one diapocarotenoid plant growth regulator or precursor thereof can be referred to as a plant growth regulating composition.

In one or more embodiments according to the present disclosure, a plant growth regulating composition can include about 1-125 ppm, about 100-750 ppm, about 500-1,500 ppm, about 1,000-3,000, or about 2,000 to 10,000 ppm of a diapocarotenoid plant growth regulator of formula (I) (or a precursor, salt, solvate, stereoisomer, or polymorph thereof) by weight. Alternatively, the concentration of the diapocarotenoid plant growth regulator or precursor thereof can be expressed in molarity. For example, an effective concentration of the diapocarotenoid plant growth regulator or precursor thereof in the composition can be in the nanomolar or micromolar range. In one embodiment, the effective concentration of the diapocarotenoid plant growth regulator in the composition is in the range of about 0.01 µM to 50 µM, or about 0.01 µM to 25 µM, or about 0.05 µM to 20 µM, or about 0.1 µM to 10 µM, or about 0.5 µM to 2.5 µM. In one embodiment, a plant growth regulating composition includes 10 mM diapocarotenoid plant growth regulator of the present disclosure and can be diluted to provide an effective amount of the active ingredient prior to use (e.g., a stock solution). In one embodiment of the disclosure, a composition for regulating plant growth includes about 5, 10, 20, 30 or 50 pM diapocarotenoid precursor (e.g., 20 µM OH-Apo12') In one embodiment of the disclosure, a composition for regulating plant growth includes about 1, 5, 10, 20, or 25 µM anchorene, a compound of formula III or a compound of formula VI. In one embodiment of the disclosure, a composition for regulating plant growth includes about 5, 10, 20, 30 or 50 µM diapocarotenoid precursor (e.g., 20 µM OH-Apo12') and about 1, 5, 10, 20, or 25 µM anchorene.

A composition according to the present disclosure can be formulated as appropriate for its mode of use. For example, a plant growth regulating composition intended to be applied directly to a seed, roots of a seedling, or plant propagation material can be formulated to adhere to the target area before and during planting. In one or more embodiments of the present disclosure, a diapocarotenoid plant growth regulator is applied as a composition formulated to be sprayed on, broadcast over, dusted on or dipped in. In one embodiment, the composition is formulated to be mixed at the site a plant is growing or where it is desired to grow (e.g., to be released slowly over a specific duration).

A plant growth regulating composition of the present disclosure can be combined with any solid or liquid additive known to be useful for formulating plant growth regulators or precursors thereof. The compositions of the present disclosure can be formulated as a ready-to-use composition (i.e., a formulation ready to be applied to a seed, plant propagation material, plant, or plant growth medium without any adjustment to the formulation or concentration of active ingredients or active compounds, or precursors thereof) and also concentrated compositions intended to be diluted, or otherwise manipulated into another form (e.g., hydrated) before being applied to the seed, plant propagation material, plant, or plant growth medium.

In one embodiment, a plant growth regulating composition can further include a natural or synthetic, organic or inorganic support material with which the active ingredient is combined to make it easier to apply to parts of a plant or plant propagation material. This material can be an inert solid or liquid. Examples of suitable material include clays, natural or synthetic silicates (e.g., talc), silica, resins, waxes, water, mineral and plant oils and derivatives thereof. Mixtures of support materials may also be used.

The particular form of the composition is not particularly limited and can be adapted as known in the art. In one embodiment, a plant growth regulating composition can be formulated to be mixed with plant growth medium into which roots will develop, or the plant growth regulating composition can further include a plant growth medium. Plant growth media are well-known in the art and include inorganic support material such as sand, rockwool, glasswool, expanded minerals such as perlite, vermiculite, zeolite, expanded clay, pumice, organic substrates such as agar (e.g., supplemented with Murashige and Skoog medium (MS) mineral salts and sucrose (1X or 0.5X)), peat, compost, saw dust, sphagnum moss, rice straw, leaf mold, and/or to a liquid substrate such as used with hydroponic (e.g., floating) or aeroponic systems, including Hoagland solution). Plant growth media includes any medium suitable for germination of seeds or for supporting the growth of stock plants.

In one embodiment, a plant growth regulating composition can be formulated to be mixed with a plant growth medium specialized for asexual propagation (i.e., propagation medium), or the plant growth composition can further comprise a propagation medium. Propagation media include substrates for the rooting of cuttings and for supporting the further growth of the regenerated plant.

In one embodiment, a plant growth regulating composition may also comprise formulation aids such as protective colloids, adhesives, thickeners, thixotropic agents, penetration agents, stabilizers, sequestering agents, and surfactants. Compositions of the present disclosure can be formulated for the desired application site by means of a suitable device, such as a drip irrigation system, or a spraying or dusting device. Accordingly, a suitable additional component can be one that facilitates application using a desired application device. For example, the presence of at least one surfactant can facilitate formulation of the diapocarotenoid plant growth regulator or precursor thereof for application or dilution in aqueous systems, such as irrigation systems. The surfactant can be an emulsifier, a dispersing agent or a wetting agent of ionic or non-ionic type or a mixture of such surfactants. In another embodiment, a thixotropic agent can ensure that the composition can be sprayed (e.g., will flow) but will also have the desired viscosity when applied to the target area (e.g., the sprayed composition will be sufficiently thick to adhere to a cutting to be planted).

In one embodiment, the composition further comprises a formulation aid to improve the stability of the diapocarotenoid plant growth regulator of formula (I) (or a precursor, salt, solvate, stereoisomer, or polymorph thereof) in the composition or application device. For example, a composition of the present disclosure can include an antioxidant to increase the stability of a diapocarotenoid plant growth regulator against oxidative degradation (e.g., tocopherol, butylated hydroxytoluene, butylated hydroxyanisole, ascorbic acid or ethoxyquin).

A plant growth regulating composition of the present disclosure can include a single active ingredient (i.e., a diapocarotenoid plant growth regulator of formula (I) (or a precursor, salt, solvate, stereoisomer, or polymorph thereof)) or a mixture of active ingredients. In one embodiment, a plant growth regulating composition may include another plant growth regulating compound in addition to the diapocarotenoid plant growth regulator. For example, in one embodiment, the diapocarotenoid plant growth regulator or precursor thereof is a first plant growth regulator, and the composition further comprises at least one second compound different from the first and which is also a plant growth regulator. The relative molar or weight amounts of the two components can be based in the desired effect. In one case, the first plant growth regulator may be present in a higher molar or weight amount compared to the second, whereas in another case the first plant growth regulator may be present in a lower molar or weight amount compared to the second. In some, cases, the two plant growth regulators may be present is substantially equal molar or weight amounts. More particularly the molar or weight ratio for first and second plant growth regulators can be, for example, from 9:1 to 1:9, or 8:1 to 1:8, or 7:1 to 1:7, or 6:1 to 1:6, or 5:1 to 1:5, or 4:1 to 1:4, or 3:1 to 1:3, or 2:1 to 1:2, or 1.5:1 to 1:1.5, or 1.2:1 to 1:1.2, or about 1:1.

Examples of plant growth regulators which can be formulated into the composition include, for example, auxins (e.g., indole acetic acid (IAA), indole butyric acid (IBA), or naphthalene acetic acid (NAA)), cytokinins, gibberellins, abscisic acid, ethylene, brassinosteroids, salicylic acid, jasmonates, plant peptide hormones, polyamines, nitric oxide (NO), strigolactones, and karrikins.

In one embodiment, a plant growth regulating composition may include another active ingredient, such as an insecticide, an attractant, a sterilant, a bactericide, an acaricide, a nematicide, a fungicide, an herbicide and/or a safener, a fertilizer, a trace nutrient (e.g., one or more salts selected from the group consisting of iron, manganese, boron, copper, cobalt, molybdenum and zinc) or a semiochemical. In some cases, the effect of the plant growth regulating composition can be supported by the presence of an active fertilizer, insecticidal, fungicidal or bactericidal ingredient to enhance the regulation of plant growth. For example, a diapocarotenoid plant growth regulator described in the present disclosure can regulate plant growth by reducing primary root development and this effect can be supported by the presence of one or more herbicides (e.g., root inhibitors such as dinitroaniles or pyridine) to enhance weed control. In another embodiment, a diapocarotenoid plant growth regulator as described in the present disclosure regulates plant growth by enhancing anchor root development and this effect can be supported by the presence of one or more fertilizers to further promote plant growth, for example.

A diapocarotenoid plant growth regulator of formula (I) (or a precursor, salt, solvate, stereoisomer, or polymorph thereof) and an agronomically acceptable carrier can be provided as components of a kit for regulating plant growth. For example, a quantity of diapocarotenoid plant growth regulator of formula (I) or precursor thereof can be provided in a first labeled container and the carrier can be provided in a second labeled container. The quantities provided in the kit can be sufficient for treating one or more of a seed, plant propagation material, plant or a specific area or volume of plant growth medium. Alternatively, a diapocarotenoid plant growth regulator of formula (I) or precursor thereof in an agronomically acceptable carrier can be provided in a single labeled container in a kit with a container enclosing a plant growth medium appropriate for a specific use. For example, a kit for propagation of difficult-to-root plants can include a diapocarotenoid plant growth regulator of formula (I) (e.g., anchorene) in an agronomically acceptable carrier and also a propagation medium such as peat moss-based growing mix, a commercial greenhouse growing mix, inert support wetted, or otherwise loaded, with nutrient solutions, or agar medium for promoting root development. The nutrient solution components can also be provided (e.g., Murashige and Skoog (MSO) mineral salts), as well as instructions for preparing the propagation materials. In one embodiment, the kit can further include petri dishes, plant culture vessel or tubes, celled trays or pots. The components of a kit can be enclosed in a container or box in close confinement for shipping and storage.

A kit container may be an envelope (e.g., sachet or packet), ampule, bottle, jar, bag, drum, box, bucket or secondary packaging product. The containers may be composed of any suitable material including, but not limited to glass, plastics, silicone, polymers such as high density polyethylene (HDPE), low density polyethylene (LDPE), polyethylene terephthalate (PET), glycol modified polyethylene terephthalate (PETG), polycarbonate (PC), polypropylene copolymer (PPCO), polypropylene (PP), fluorinated ethylene-propylene resin (FEP), perfluoralkoxy, (PFA), fluorinated high density polyethylene (FLPE), ethylene vinyl acetate (EVA), polyvinyl chloride (PVC), or stainless steel. Any of the containers can comprise multiple layers or coatings for a product contact layer, for example, a gas impermeable layer, a layer that inhibits light transmission, or a layer that provides resistance to an organic solvent to the container.

A kit container may be configured to have an opening (e.g., for adding and removing container contents), a removable closure over the opening (e.g., a cap, lid, or cover) or to have a resealable opening, a shape that allows for the container to be stored in a variety of positions without the contents spilling or falling out of the opening. A kit container can be configured to accommodate decanting and/or addition of other kit components or components that may not be supplied with the kit but which could be supplied by the end-user (e.g., support material or formulation aids) for mixing at the time of use. For example, a container of the kit can enclose a volume greater than necessary to contain the component permitting adding of further components. The removable closure can be configured to permit storage of mixtures for later use.

Methods of Regulating Plant Growth

The present disclosure features methods of regulating plant growth including applying an effective amount of at least one diapocarotenoid plant growth regulator of formula (I) (or a precursor, salt, solvate, stereoisomer, or polymorph thereof) to a seed, plant propagation material, plant, or plant growth medium. The plant growth regulator can be applied as a composition (e.g., in an agronomically acceptable carrier). Application to a seed, plant propagation material, or plant can include application to the entirety of the available surface of the seed, plant propagation material, or plant. Alternatively, the diapocarotenoid plant growth regulator or precursor thereof can be applied to an area that is less than the entirety of the available surface of the seed, plant propagation material, or plant. For example, applying includes contacting one or more of the aerial parts of a plant in growth medium, root, the wound of a cutting, or specific phytotomy or plant tissue (e.g., radicle or collet) directly, or indirectly via the action of their environment or growth medium. In one embodiment, a diapocarotenoid plant growth regulator or precursor thereof is directly applied at the location on the phytotomy where the effect should be obtained (e.g. at the site of root emergence). Suitable application methods include, for example, dipping, vaporization, evaporation, spraying, spread and application, and for the seeds, coating.

In one embodiment of the present disclosure a method of regulating plant growth includes applying the at least one diapocarotenoid plant growth regulator or precursor thereof to the seed, plant propagation material, plant, or plant growth medium at an effective application rate. Suitable application rates vary according to the type of plant, the stage of development, and/or medium. A suitable rate can be extrapolated from the examples described in the present disclosure or by conducting trials on a case-by-case basis (e.g., field trials for agriculturally important crops). For example, the treatment according to the present invention may be practiced once (with a higher amount or concentration of the diapocarotenoid plant growth regulator or precursor thereof) or more than once (e.g. once in a day or once in a week over a longer period (e.g. over 2 to 10 weeks or 3 to 12 months); with a lower amount of concentration of the diapocarotenoid plant growth regulator or precursor thereof). In one embodiment, administration via a solid support, can be performed on a weekly or monthly basis by exchanging a loaded support for a previously applied support that has released the loaded active ingredient.

In many cases, application of a diapocarotenoid plant growth regulator of formula (I) (or a precursor, salt, solvate, stereoisomer, or polymorph thereof) at an early stage of development of a plant is sufficient to achieve advantages during later stages of plant development (e.g., at the time of harvest). For example, in the case that the effect on the plant is enhanced growth, induction of the biosynthetic pathways that result in enhanced growth can be initiated by applying the diapocarotenoid plant growth regulator or precursor thereof to the medium in which a seed germinates or the seedling (e.g., 3-8 days after germination (DAG), 5-8 DAG or 8-17 day old seedlings).

In one embodiment, a method of regulating plant growth includes culturing a plant in the laboratory incubator or greenhouse using a diapocarotenoid plant growth regulator composition as a growth medium and then planting the cultured plant on the field without further administration of the diapocarotenoid plant growth regulator. A method of regulating plant growth includes culturing a plant in the laboratory incubator or greenhouse using a diapocarotenoid precursor composition as a growth medium and then planting the cultured plant on the field without further administration of the diapocarotenoid precursor or the diapocarotenoid plant growth regulator.

In one embodiment, a method of regulating plant growth includes applying a ready-to-use composition to a seed, plant propagation material, or plant to be treated, or in furrow in the soil, by means of a suitable device, such as spraying or dusting devices or by addition to an irrigation system. Alternatively, the method includes a step of preparing a plant growth regulating composition by diluting a concentrated composition.

In one embodiment, a method of regulating plant growth includes applying at least one diapocarotenoid plant growth regulator of formula (I) (or a precursor, salt, solvate, stereoisomer, or polymorph thereof) and an additional active ingredient. Thus, the diapocarotenoid plant growth regulator of present disclosure or precursor thereof may be applied in combination with other active ingredient compositions such as compositions for plant breeding, growth and production suitable for the specific plant. The combination can be achieved by applying each active ingredient (or precursor thereof) sequentially or simultaneously (e.g., as a mixture or by using two application devices simultaneously).

In one embodiment, a method of regulating plant growth is a method of promoting root development. Root systems anchor the plant in growth medium and/or absorbing water and nutrients. Accordingly, a method of promoting root development includes methods of increasing nutrient uptake, enhancing resistance to abiotic stress factors, such as cold or drought stress (stress caused by drought and/or lack of water), invigorating plant growth and/or increasing the yield of the plant (e.g., agricultural output as measured by weight crop harvested/unit of land cultivated or seed generation), including growth and/or yield from arable, degraded, or sandy land through increased ability of treated plants to acquire nutrients. A method of promoting root development can include applying an effective amount of a diapocarotenoid plant growth regulator of formula (I) (or a precursor, salt, solvate, stereoisomer, or polymorph thereof) to a seed, plant propagation material, plant, or plant growth medium. In a specific embodiment of a method promoting root development, the diapocarotenoid plant growth regulator of formula (I) is anchorene. Root development promotion can be observed as an increase in the number or length of anchor roots, lateral roots, and/or adventitious roots relative to root development in the absence of the diapocarotenoid plant growth regulator application.

In one embodiment of the present disclosure, a method of promoting root development includes applying an effective amount of at least one diapocarotenoid plant growth regulator of formula (I) or precursor thereof to plant propagation material selected from the group consisting of a cutting (e.g., leaf, stem, or root), plant callus or segregated plant tissues to enhance rooting. For example, the method can include applying the diapocarotenoid plant growth regulator (or a composition as described above) using methods known in the art for applying rooting hormone (e.g., by dipping a cut end into a preparation of the active ingredient or spraying the cuttings with a composition comprising the active ingredient in an agronomically acceptable carrier). In a specific embodiment, the plant propagation material is directly treated with a root promoting amount of anchorene, formulated or unformulated.

A method of promoting root development of plant propagation material can further comprise obtaining or preparing the propagation material for rooting (e.g., stem etiolation, wounding, or otherwise exposing cambium). In one embodiment, the method of promoting root development further comprises air-layering or marcotts; layering in stool beds; girdling and/or banding for a period of time (e.g., one to several weeks) before taking cuttings and stem etiolation.

The method of promoting root development of plant propagation material can further comprise contacting the propagation material with a propagation medium. The propagation medium can be selected from the group consisting of water, peat moss-based growing mix, a greenhouse growing mix, inert support treated with nutrient solutions, and agar medium, formulated for promoting root development. In one embodiment of the method, the agar medium includes 0.5X or 1X Murashige and Skoog (MSO) mineral salts, 0.8-1% by weight agar (e.g., BactoAgar™), 0-3% sucrose and vitamins. The agar medium can be formulated to have a pH suitable for rooting propagation material (e.g., about 5.7). A growing mix for rooting can include perlite or vermiculite and also fertilizer. The propagation medium can be a composition comprising an effective amount of at least one diapocarotenoid plant growth regulator of formula (I) (e.g., plant growth medium comprising about 1-25 µM anchorene or an anchorene precursor such as OH-Apo 12'). The propagation medium can be in a petri dish, plant culture vessel (e.g., Magenta™ box), culture tube, celled tray (e.g., plug flats), horizontal bag, or pot. When the roots are well-developed, the method can include transferring the plant to a larger container or to the field or furrow. Method of transferring propagation material bearing roots are well-known in the art.

Application of the at least one diapocarotenoid plant growth regulator to plant propagation material can increase the number of roots that emerge from the plant propagation material relative to untreated plant propagation material by at least 1-5, 4-10, 8-16, or 13-20 fold. In one embodiment, application of the at least one diapocarotenoid plant growth regulator or precursor thereof to the same type of plant propagation material results regeneration of the plant, whereas untreated plant propagation material is incapable of being regenerated using the same propagation techniques.

In one embodiment, a method of regulating plant growth is a method of enhancing resistance to abiotic stress conditions. Abiotic stress conditions include resistance to drought, cold and hot conditions, osmotic stress, waterlogging, elevated soil salinity, elevated exposure to minerals, ozone stress conditions, strong light conditions, limited availability of nitrogen nutrients, limited availability of phosphorus nutrients and/or shade avoidance. For example, a method of enhancing resistance to abiotic stress conditions can include applying an effective amount of at least one diapocarotenoid plant growth regulator of formula (I) (or a precursor, salt, solvate, stereoisomer, or polymorph thereof) to a seed, plant propagation material, plant, or plant growth medium at risk of causing one or more types of abiotic stress in a plant growing in the medium. In a specific embodiment, the seed, plant propagation material, plant or plant growth medium is directly treated with an effective amount of anchorene. Enhancing resistance to abiotic stress can be exhibited by an extension in the life of the treated plant. For example, application of the at least one diapocarotenoid plant growth regulator or precursor thereof can extend the life of the plant by at least about 1, 2, 3, 4, 5, 6, or 7 weeks, as compared to an untreated plant under conditions associated with abiotic stress. In one embodiment, the life of the plant can be extended at least 4 months as compared to an untreated plant under conditions associated with abiotic stress.

An effective amount of the at least one diapocarotenoid plant growth regulator or precursor thereof for enhancing resistance to abiotic stress conditions can be an amount that regulates root architecture for abiotic stress adaptation or resistance. Root architecture regulation can be assessed by measuring structural features such as root length (e.g., length of lateral roots), spread, and number, and characteristics such as elongation, growth angles from the main axis, lateral branching and longevity of all root classes as well as above-ground traits that reflect adaptation or resistance to abiotic stress. Changes in root architecture can be observed under conditions of uneven distribution and/or localized depletions of moisture or nutrients, for example.

In one embodiment, the method of regulating plant growth is a method of enhancing plant growth. A positive change in plant growth can be determined by qualitatively or quantitatively assessing one or more of the following properties: water use efficiency, nitrogen use, carbon assimilation, germination efficiency, rate of maturation, fertilizer input, plant size (e.g., root spread, shoot height, leaf area, plant height, shoot width, canopy width, and biomass), internode number and distance, root architecture including root topology, gravitropism, and distribution, seed size, fruit size, pod size, pod or ear number, seed number per pod or ear, seed mass, seed filling, and seed composition, for example. In some cases, assessments can be made at specific stages and with specific tissues.

An effective amount of the diapocarotenoid plant growth regulator or precursor thereof can be the amount sufficient to enhance growth such that upon harvesting the plant exhibits at least one of increased plant yield measured in terms of bushels/acre, increased root number, increased root length, increased root mass, increased root volume and increased leaf area, compared to untreated plants or plants harvested from untreated seed. The effective amount can be determined empirically. The yield of a treated plant can be increased by at least about 5%, 10%, 15%, 20%, 25%, 30%, 35%, 40%, 45%, 50%, 55%, 60%, 65%, 70%, 75%, 80%, 85%, or 90% as compared to an untreated plant growth under the same growing conditions. In one embodiment, the yield of the treated plant is increased from about 5% to 50% as compared to an untreated plant.

In one embodiment, the method of regulating plant growth is a method of increasing biomass comprising applying to a seed, plant propagation material, plant or plant growth medium, an effective amount of at least one diapocarotenoid of formula (I)(or a precursor, salt, solvate, stereoisomer, or polymorph thereof) to a seed, plant propagation material, plant, or plant growth medium. In a specific embodiment, the seed, plant propagation material, plant or plant growth medium is directly treated with an effective amount of anchorene, formulated or unformulated. In a specific embodiment, the seed, plant propagation material, plant or plant growth medium is directly treated with an effective amount of an anchorene precursor (e.g., OH-Apo12'), formulated or unformulated. For example, application of the at least one diapocarotenoid plant growth regulator or precursor thereof can increase the biomass of one or more plant tissues by about 5% to 90%, for example, 5%-25%, 10%-30%, 20%-40%, 30%-50%, 40%-50%, 50%-60%, 60%-70%, or 70%-90% dry weight or fresh weight as compared to a treated plant. As shown in the example described in the present disclosure, treatment of Arabidopsis seedlings with about 20 µM anchorene can increase the fresh weight of roots by about 55% and increase the fresh weight of shoots by about 33% and increase the number of lateral and anchor roots relative to treated controls.

The biomass can be measured as fresh weight and/or dry weight of the treated plants or one or more parts of the treated plant as described in the Examples. The method can include measuring biomass of a treated plant (e.g., plant grown from treated seed, or plant grown in treated medium) and comparing the biomass to the biomass of untreated plants or other appropriate control. Samples for measuring biomass can be obtained at one or more stages of plant development (e.g., at 8 days after germination (DAG), at 17 DAG, pre-fertilization, initial flowering, seed filling, and/or maturity). The plants can be divided into tissue components, such as roots, leaves, shoots, buds and flowers, and seed capsules for separate biomass determinations.

The methods described herein can be used to treat plants including vegetables and crops to regulate plant growth (e.g., to increase root growth). As used herein, "plants" refer in general to any agronomic or horticultural crops, ornamentals and turfgrasses, and includes tubers, roots, stems, leaves, flowers, and fruits. In the examples, one or more embodiments of the present disclosure are exemplified in an Arabidopsis model, which serves as a suitable model for other plants in general. Arabidopsis is also suitable for addressing detailed scientific questions concerning mechanisms for root development, growth enhancement and abiotic stress resistance (e.g. by using mutants with influence on the carotenoid biosynthesis pathway).

The methods according to the present invention can be applied to any plant, including plants belonging to the Brassicales, Magniolales, Illiciales, Laurales, Piperales Aristochiales, Nymphaeales, Ranunculales, Papeverales, Sarraceniaceae, Trochodendrales, Hamamelidales, Eucomiales, Leitneriales, Myricales, Fagales, Casuarinales, Caryophyllales, Batales, Polygonales, Plumbaginales, Dilleniales, Theales, Malvales, Urticales, Lecythidales, Violales, Salicales, Capparales, Ericales, Diapensales, Ebenales, Primulales, Rosales, Fabales, Podostemales, Haloragales, Myrtales, Cornales, Proteales, Santales, Rafflesiales, Celastrales, Euphorbiales, Rhamnales, Sapindales, Juglandales, Geraniales, Polygalales, Umbellales, Gentianales, Polemoniales, Lamiales, Plantaginales, Scrophulariales, Campanulales, Rubiales, Dipsacales, Asterales, Alismatales, Hydrocharitales, Najadales, Triuridales, Commelinales, Eriocaulales, Restionales, Poales, Juncales, Cyperales, Typhales, Bromeliales, Zingiberales, Arecales, Cyclanthales, Pandanales, Arales, Lilliales, and Orchidales orders. In addition, the present invention can be applied to plants such as the Pinales, Ginkgoales, Cycadales and Gnetales.

Embodiments of the present disclosure include treating plants that are important or interesting for agriculture, horticulture, biomass, bioconversion and/or forestry. Non-limiting examples include tobacco, oilseed rape, sugar beet, potatoes, tomatoes, cucumbers, peppers, beans, peas, citrus fruits, avocados, peaches, apples, pears, berries, plumbs, melons, eggplants, cotton, soybean, sunflowers, roses, poinsettia, petunia, guayule, cabbages, spinach, alfalfa, artichokes, sugarcane, mimosa, corn, wheat, rice, rye, barley, sorghum and grasses such as switch grass, giant reed, Bermuda grass, Johnson grasses or turf grass, millet, hemp, bananas, poplars, eucalyptus trees and conifers, for example. Plants grown for energy production include broadleaf plants like alfalfa, hemp, Jerusalem artichoke and grasses such as sorgum, switchgrass, and Johnson grass. Trees used for industrial wood production can be treated using the methods of the present disclosure including oak, chestnut, black locust, mulberry, Osage orange, sassafras, maple, ash, hickory, hackberry, beech, pine, buckeye, poplar, willow, catalpa, elm, walnut, mahogany, balsa, black ironwood, birch, eucalyptus, fir and alder trees.

Embodiments of the present disclosure include treating plants that are known to be difficult to propagate such as, for example, plants that are difficult to root from cuttings. Non-limiting examples include, for instance, alder, apple ash, Asian pear, Asian plum, basswood, beech, birch, black cherry, black walnut, black willow, butternut, carambola, cherry, chestnut, citrus rootstock, durian, grapefruit, guava, elm, hackberry, hard maple, hazelnut, hickory, Japanese red dwarf maple, jujube, larch, lemon, lemon verbena, longan, mango, nectarine, paw, peach, pear, pecan, persimmon, pines, rambutan, oak, sassafras, spruce, sweetgum, sycamore, yellow poplar, Persian walnut, walnut, and white sapote.

Embodiments of the present disclosure include treating plants of plant cultivars and plant hybrids which are commercially available or are in use. Plant cultivars are understood to mean plants which have new properties ("traits") and which have been obtained by conventional breeding, by mutagenesis or with the aid of recombinant DNA techniques. For example, methods of the present invention can be applied to plants or plant cultivars which are resistant to one or more abiotic stress factors to achieve further improvements in response to abiotic stress. Hybrid plants to be treated according to methods of the present disclosure include plants that express the characteristics of heterosis, or hybrid vigor, which generally results in higher yield, increased vigor, better health and better resistance toward biotic and abiotic stress factors and methods of treatment described herein can result in the hybrid exhibiting further improvements in vigor, yield, and abiotic stress resistance.

In one embodiment, a method of regulating plant growth is a method of reducing root growth by applying to a seed, plant, or target area, an effective amount of a diapocarotenoid plant growth regulator of formula (I) (or salt, solvate, stereoisomer or polymorph thereof). Invasive and noxious plants can become resistant to existing herbicidal compounds. Thus, a diapocarotenoid plant growth regulator of formula (I) (e.g., 8,15-diapocarotene-8,15-dial and/or 8,12'-diapocarotene-8,12'-dial) has utility for controlling unwanted plants by reducing root development. The diapocarotenoid plant growth regulator can be applied to directly or indirectly to a seed, plant, part of an unwanted plant, or to a target area susceptible to growth of unwanted plants. An effective amount can be an amount that is effective to reduce root growth to about 80% (e.g., about 83 or 85%.) relative to untreated plants. For example, application of the at least one diapocarotenoid plant growth regulator can reduce root growth by at least about 5%, 10%, 15%, 20%, 25%, 30%, 35%, 40%, 45%, 50%, 55%, 60%, 65%, 70%, 75%, 80%, 85%, or 90% as compared to an untreated plant under the same growing conditions.

A target area may be any area where unwanted plants are present, e.g. urban land, rangeland (e.g., land livestock or wildlife wander and graze on), forestland, roadside, brownfield (abandoned or underused industrial or commercial property), or physically disturbed land (e.g., resulting from fire, construction, climate, flooding, erosion, logging, mining, etc.), as well as portions of land under intensive agronomical or horticultural production, or land being prepared for intensive agronomical or horticultural production. In one embodiment, creating soil conditions that inhibit primary root development in seedlings by applying diapocarotenoid plant growth regulators (e.g., 8,15-diapocarotene-8,15-dial and/or 8,12'-diapocarotene-8,12'-dial) at a target area in need thereof can prevent the unwanted plant from growing to maturity and producing seed to sustain subsequent generation of plants.

A reduction in plant growth relative to untreated plants can be determined by assessing phytotoxicity symptoms including stunted seedlings, malformed new growth, stem calluses, and/or plant lean, stem or midrib discoloration or deformation, leaf injury such as deformations, stunting, or discoloration, root injury such as reduced root systems (e.g., bottle brush roots), deformation, pruning, and the effects of root damage including stunted plant growth, and apparent drought stress.

Embodiments of the present disclosure include methods of controlling the growth of invasive plant species. Examples of invasive plants include cheatgrass, dandelion, knapweeds (spotted, diffuse, Russian), bindweed, chickweed, ground ivy, Canada thistle, burdock, houndstongue, yellow star thistle, Himalayan bush clover (lespedeza), privet, Russian thistle, kochia, halogeton, Japanese knotweed, leafy spurge, St. John's-wort, toadflax (yellow and Dalmation), tansy, whitetop, hawkweed, cinquefoil, *Servicea lespedera*, and ox-eye daisy.

The following Examples are intended to illustrate the above invention and should not be construed as to narrow its scope. One skilled in the art will readily recognize that the inventors suggest many other ways in which the invention could be practiced. It should be understood that numerous variations and modifications may be made while remaining within the scope of the invention.

EXAMPLES

Carotenoid-derived metabolites regulate many developmental processes in plants, such as Arabidopsis, including as yet unidentified carotenoid-derived metabolite(s). The examples below detail screens performed on known and predicted carotenoid cleavage products. Anchorene, a predicted carotenoid-derived dialdehyde (diapocarotenoid) that triggers anchor root development. Anchor roots of the lease characterized type of root in Arabidopsis. Anchor roots form at the root-shoot junction, particularly upon damage to the root apical meristem. Using Arabidopsis reporter lines, mutants and chemical inhibitors, the studies below show that anchor roots originate from the pericycle cells and that the development of this root type is auxin-dependent and requires carotenoid biosynthesis. Transcriptome analysis and treatment of auxin-reporter lines indicate that anchorene triggers anchor root development by modulating auxin homeostasis. Exogenous application of anchorene restored anchor root development in carotenoid-deficient plants, indicating that this compound is that carotenoid-derived signal required for anchor root development. Chemical modifications of anchoring led to a loss of anchor root promoting activity, suggesting that this compound is highly specific. Furthermore, using LC-MS analysis, anchorene was confirmed as a natural, endogenous Arabidopsis metabolite. The result show carotenoid biosynthesis is required for ANR formation. Application of anchorene restored the ANR deficiency observed in carotenoid biosynthesis mutants and upon blocking carotenogenesis by chemical inhibitors. By characterizing auxin reporter lines, applying an auxin analog, and inhibiting auxin transport, the results demonstrate that ANR development is auxin-dependent and that anchorene modulates auxin homeostasis. Transcriptome analysis of anchorene-treated collets confirmed that anchorene regulates auxin-related genes in the opposite manner to an auxin transport inhibitor. This work reveals a new member of the family of carotenoid-derived regulatory metabolites and hormones.

MATERIALS AND METHODS

Chemicals

β-cyclocitral, β-ionone and D'orenone (β-Apo-13-caroteneone) (FIG. 1A) were purchased from Buchem (Netherlands). Diapo1, Diapo2, Diapo3, Diapo4, Diapo5, and Diapo6 (FIG. 1B) were synthesized by Buchem (Netherlands). Diapo3 was also synthesized together with D6-anchorene and anchorene derivatives according to the protocol of SCHEME 2. Apocarotenoids and diapocarotenoids were dissolved in acetone to make stock solutions (10 mM). For the screening experiments, each chemical was diluted in half strength Murashige and Skoog (MS) media (with 0.5% sucrose+1% agar, 0.5 g/L MES, pH 5.7) to reach indicated concentrations of 25 μM and 5 μM. A stock solution of 10 mM GR24 (Chiralix, Netherlands) was also made by diluting GR24 in acetone. Stock solutions of D15 (100 mM), Norflurazone (5 mM), and CPTA (50 mM) were made in dimethyl sulfoxide (DMSO). For experiments, these compounds were diluted in concentrations of 125 μM D15, 500 nM Norflurazone, or 100 μM CPTA, respectively. 1-Naphthaleneacetic acid (NAA) and N-1-Naphthylphthalamic Acid (NPA) were purchased from Sigma-Aldrich (Germany) and dissolved in water to make 1 mM stock solutions. For NAA and NPA treatments, media containing 0.1 μM NAA and 1 μM NPA were used. Unless otherwise noted, all commercially available compounds were used as provided without further purification.

Synthetic Protocol for Anchorene Derivatives

Unless otherwise noted, all commercially available compounds were used as provided without further purification. $CH_2Cl_2$ and THF used for synthesizing anchorene derivatives were purified by an MBraun solvent purification system (SPS). Solvents for chromatography were technical grade and freshly distilled prior to use. Analytical thin-layer chromatography (TLC) was performed on Merck silica gel aluminum plates with F-254 indicator, visualized by irradiation with UV light. Column chromatography was performed using silica gel (Macherey-Nagel, particle size 0.040-0.063 mm) Solvent mixtures are understood as volume/volume. 1H-NMR and 13C-NMR were recorded on a Varian AV400 or AV600 spectrometer. Data are reported in the following order: chemical shift (δ) in ppm and coupling constants (J) are in Hertz (Hz). IR spectra were recorded on a PerkinElmer Spectrum 100 spectrometer and are reported in terms of frequency of absorption ($cm^{-1}$). Mass spectra (EI-MS, 70 eV) were conducted on a Finnigan SSQ 7000 spectrometer.

The di-ethyl ester, di-alcohol, and di-acid derivatives of anchorene (FIG. 1C) were synthesized according to SCHEME 1 or SCHEME 2.

SCHEME 1. Synthetic route for anchorene and anchorene derivatives.

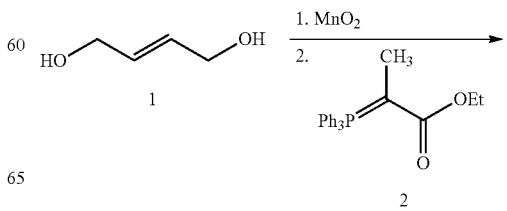

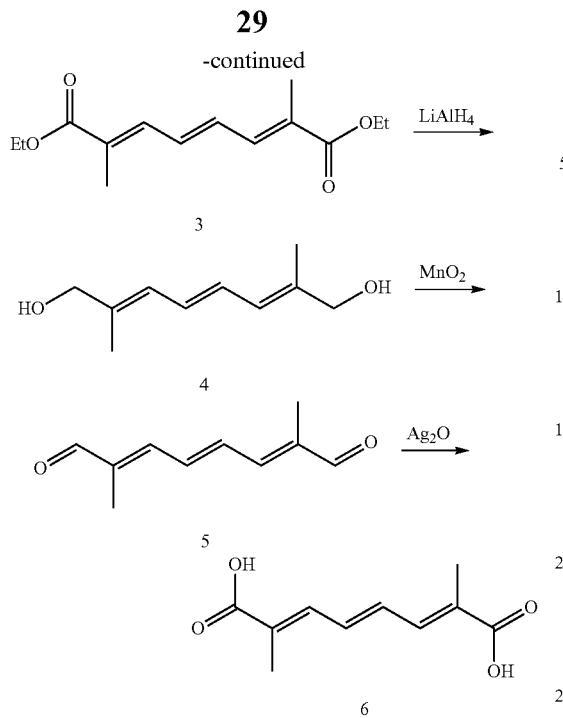

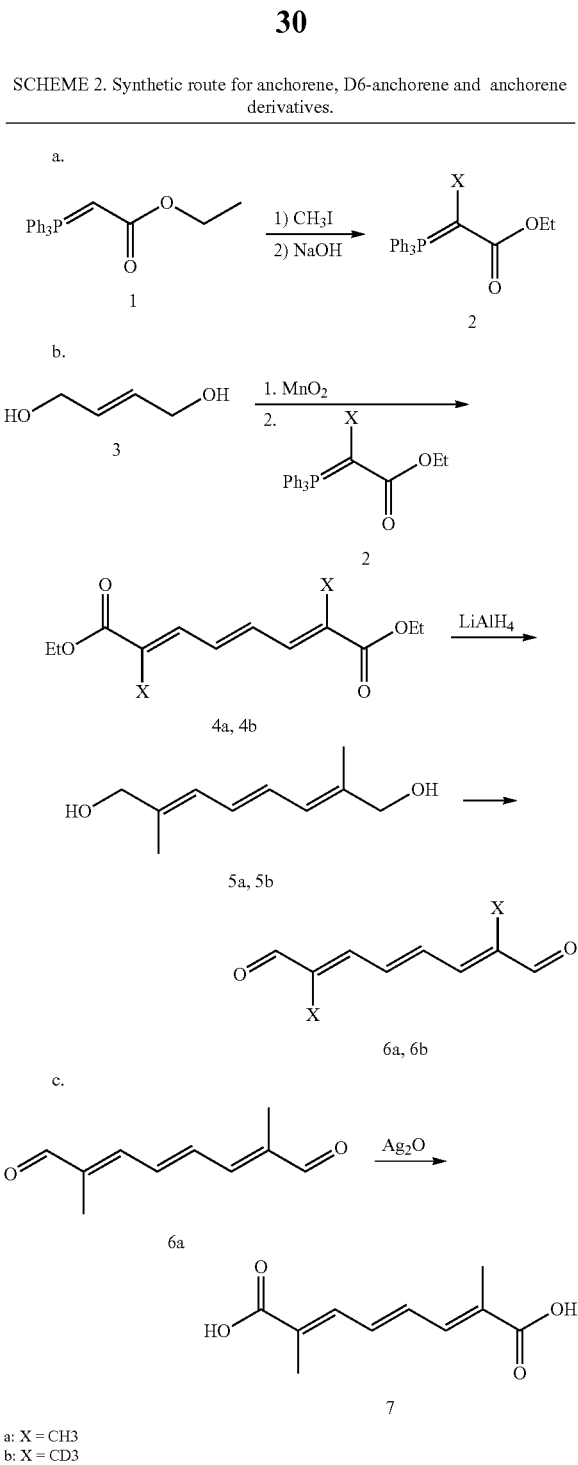

SCHEME 2. Synthetic route for anchorene, D6-anchorene and anchorene derivatives.

a: X = CH3
b: X = CD3

Synthesis of (2E,4E,6E)-diethyl-2,7-dimethylocta-2,4,6-trienedioate (3): but-2-ene-1,4-diol 1 (1 equiv) dissolved in $CH_2Cl_2$ (DCM) was added to a solution of $MnO_2$ (18 equiv.) in DCM at 0° C. Phosphorane 2 (2.4 equiv) dissolved in DCM was then added. The reaction mixture was stirred at room temperature until the TLC showed the fully consumption of the starting material. $MnO_2$ was removed by filtration over diatomaceous earth (CELITE) and the filtrate concentrated in vacuo. Purification by column chromatography (hexane: EtOAc 5:1) gave product 3 as a white crystalline solid.

3: 1H NMR (400 MHz, CDCl3): δ (ppm): 1.31; (t, J=7.2 Hz, 6H), 2.0; (d, J=7.2 Hz, 6H), 4.22; (q, J=7.2 Hz, 4H), 6.79; (dd, J=7.6 Hz/2.8 Hz, 2H), 7.28; (dd, J=8.0 Hz/1.6 Hz, 2H).

Synthesis of (2E,4E,6E)-2,7-dimethylocta-2,4,6-triene-1,8-diol(4): Product 3 (1 equiv) in dry THF was added to a suspension of $LiAlH_4$ (2.4 equiv) at 0° C. The reaction mixture was stirred at this temperature for 1 h. The reaction was quenched by slow addition of water and 20% NaOH solution. The organic phase was separated and the aqueous phase washed with EtOAc. The combined organic phase was dried over $MgSO_4$ and concentrated leading to the desired diol product 4.

4: 1H NMR (600 MHz, CDCl3): δ (ppm)=1.61; (s, 2H), 1.81; (s, 6H), 4.10; (s, 4H), 6.16; (d, J=7.8 Hz, 2H), 6.45; (dd, J=7.2 Hz/3.0 Hz, 2H).

Synthesis of (2E,4E,6E)-2,7-dimethylocta-2,4,6-trienedioic acid (6): A mixture of dial 5 (6 mmol, 1 equiv), $Ag_2O$ (9.1 mmol, 1.4 equiv), 3 mL NaOH (10% solution) and 20 mL $H_2O$ was refluxed for 24 h. The reaction mixture was diluted with 50 mL $H_2O$ and the solid was separated by filtration. The filtrate was acidified with diluted $HNO_3$. The resulting solid was filtered and recrystallized from ethanol to give product 6 as an off-white solid.

6: 1H NMR (600 MHz, DMSO-d6): δ (ppm)=1.92; (s,6H), 7.12-7.32; (m, 4H), 12.4; (bs, 2H).

Synthesis of (2E,4E,6E)-diethyl-2,7-dimethylocta-2,4,6-trienedioate (AR diethyl ester) (4a,4b): But-2-ene-1,4-diol 3 (1 equiv) dissolved in $CH_2Cl_2$ (DCM) was added to a solution of $MnO_2$ (18 equiv.) in DCM at 0° C. Phosphorane 2 (2.4 equiv) dissolved in DCM was then added. The reaction mixture was stirred at room temperature until the TLC showed the fully consumption of the starting material. $MnO_2$ was removed by filtration over diatomaceous earth (CELITE) and the filtrate concentrated in vacuo. Purification by column chromatography (hexane: EtOAc 5:1) gave product 4a,4b as a white crystalline solid.

4a: 1H NMR (400 MHz, CDCl3): δ (ppm): 1.31; (t, J=7.2 Hz, 6H), 2.0; (d, J=7.2 Hz, 6H), 4.22; (q, J=7.2 Hz, 4H), 6.79; (dd, J=7.6 Hz/2.8 Hz, 2H), 7.28; (dd, J=8.0 Hz/1.6 Hz, 2H). 4b: 1H NMR (600 MHz, CDCl3): δ (ppm): 1.32; (t, J=7.2 Hz, 6H), 4.23; (d, J=7.2 Hz, 4H), 6.79; (dd, J=7.8 Hz/3.0 Hz, 2H), 7.29; (dd, J=7.8 Hz/3.0 Hz, 2H). 13C NMR (150.9 MHz, CDCl3: δ (ppm) :14.3, 60.8; 130.1; 133.6; 137.2; 168.0; MS (EI) m/z (%): 258.2; [M+.] (100). IR (ATR): $\tilde{v}$=2114; 1694; 1615; 1475; 1368; 1284; 1225; 1101; 995 cm$^{-1}$.

Synthesis of (2E,4E,6E)-2,7-dimethylocta-2,4,6-triene-1, 8-diol (AR dialcohol) (5a): Product 4a (1 equiv) in dry THF was added to a suspension of LiAlH$_4$ (2.4 equiv) at 0° C. The reaction mixture was stirred at this temperature for 1 h. The reaction was quenched by slow addition of water and 20% NaOH solution. The organic phase was separated and the aqueous phase washed with EtOAc. The combined organic phase was dried over MgSO$_4$ and concentrated leading to the desired diol product.

5a: 1H NMR (600 MHz, CDCl3): δ (ppm) =1.61; (s, 2H), 1.81; (s, 6H), 4.10; (s, 4H), 6.16; (d, J=7.8 Hz, 2H), 6.45; (dd, J=7.2 Hz/3.0 Hz, 2H).

Synthesis of (2E,4E,6E)-2,7-dimethylocta-2,4,6-triene-dial (anchorene) (6a, 6b) (anchorene): To the suspension of LiAlH$_4$ (2.4 equiv) in dry THF at 0° C. was added the ester 4 (1 equiv) in dry THF. The reaction mixture was stirred at this temperature for 1 h. The reaction was quenched by slow addition of water and 20% NaOH solution. The organic phase was separated and the aqueous phase washed with EtOAc. The combined organic phase dried over MgSO4 and concentrated. The residue 5 was oxidized without further purification. To a cooled solution of the crude diol 5 in acetone was added MnO$_2$ (18 equiv). The reaction mixture was allowed to warm up to room temperature and stirred for 24 h. The solid was removed by filtration over a pad of CELITE and washed with CH$_2$C$_2$. The solvent was removed in vacuo and the residue was purified by column chromatography (SiO$_2$, hexane:EtOAc 5:1). The dialdehyde 6 was isolated as yellow solid.

6a: 1H NMR (600 MHz, CDCl3): δ (ppm)=1.93; (s, 6H), 6.96-7.02; (m, 2H), 7.07; (dd, J=7.8 Hz/3.0 Hz, 2H), 9.5; (s, 2H). 6b: 1H NMR (400 MHz, CDCl3): δ (ppm)=6.99; (dd, J=8.4 Hz/2.8 Hz,2H), 7.07; (dd, J=8.0 Hz/3.2 Hz, 2H), 9.55; (s, 2H). 13C NMR (100.5 MHz, CDCl3): δ (ppm) =134.4; 140.9; 146.0; 194.4; MS (EI) m/z (%)=170.1; [M+.] (100). IR (ATR): $\tilde{v}$=2078; 1718; 1662; 1369; 1270; 1171; 1032; 979 cm−1.

Synthesis of (2E,4E,6E)-2,7-dimethylocta-2,4,6-triene-dioic acid (7): A mixture of dial 6a (6 mmol, 1 equiv), Ag2O (9.1 mmol, 1.4 equiv), 3 mL NaOH (10% solution) and 20 mL H$_2$O was refluxed for 24h. The reaction mixture was diluted with 50 mL H$_2$O and the solid was separated by filtration. The filtrate was acidified with diluted HNO$_3$. The resulting solid was filtered and recrystallized from ethanol to give product 6 as an off-white solid.

7: 1H NMR (600 MHz, DMSO-d6): δ (ppm)=1.92; (s, 6H), 7.12-7.32; (m, 4H), 12.4; (bs, 2H).

Stability Analysis

Figure 2B:
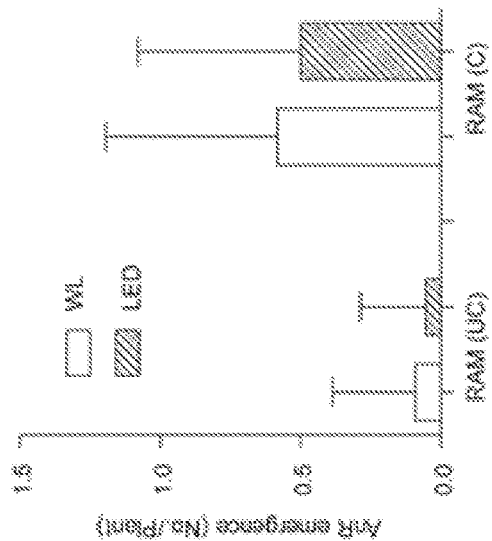
Figure 2C:
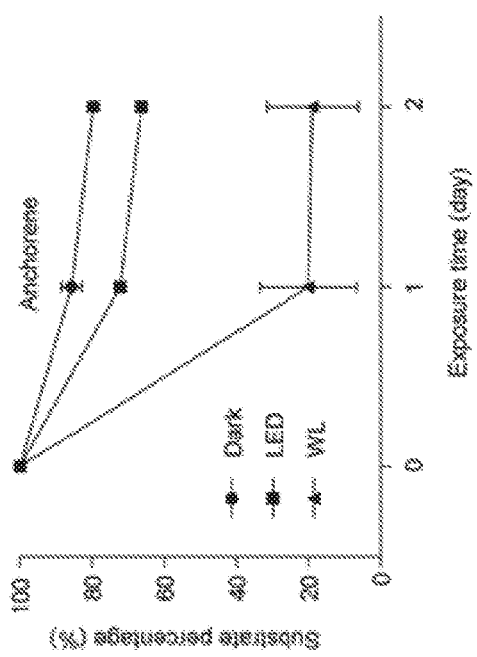
Figure 2D:
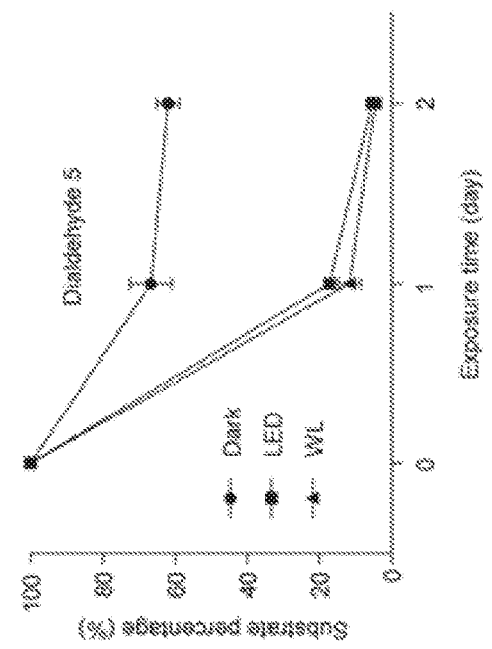

Anchorene (the diapocarotenoid of formula (IV)((FIG. 2A), "dialdehyde 2" (the diapocarotenoid of formula (III) (FIG. 2B) and "dialdehyde 5" (the diapocarotenoid of formula (VI) (FIG. 2C) (see also FIG. 1B for corresponding structures) were dissolved in half MSO (pH 5.7) to make a 1 µM final concentration. 200 µL of each compound were incubated in three different light conditions (darkness, LED white light (light intensity: 4000 LUX) [HYPERIKON® 16 W LED Light Bulb A21, 16 W (100 W Equivalent), CRI92, 1620 Lumens, 4000K (Daylight Glow)] and fluorescent white light (WL) (light intensity: 4500 LUX) (Philips F17T8/TL841 ALTO, 17 watt T8 fluorescent bulb)) for 1 day (24 h) and 2 days (48 h) at 22° C. The degradation was monitored by LC-MS/MS analysis (FIGS. 2A-C). No significant difference within groups anchor root (ANR) emergence was observed under WL condition and LED conditions (FIG. 2D).

D6-anchorene (20 pmol) was added to each solution before LC-MS/MS analysis, as an internal standard. Analysis of anchorene was performed by comparing retention time, MS/MS spectra, and accurate mass with the synthetic standard using a DIONEX™ ULTIMATE™ 3000 UHPLC system coupled with a Q-Exactive™ plus MS (ORBITRAP™ detector, Thermo Scientific) with an electrospray source. Chromatographic separation was carried out at 35° C. on a PHENOMENEX® (Torrance, Calif., USA) Gemini C18 (150×2.0 mm, 5 µm) column with the solvent system formic acid/acetonitrile/water (0.1/94.9/5, v/v/v; mobile phase A) and formic acid/acetonitrile/water (0.1/5/94.9, v/v/v; mobile phase B). The gradient used was 0-20 min, 25%-100% A; 20-25 min, 100% A; 25-26 min, 100%-25% A; 26-36 min, 25% A. The flow rate was 200 µL/min. The MS was operated in positive ionization mode. The conditions were as follows: Spray voltage 4.0 KV, Auxiliary gas heater temperature 310° C., Sheath gas flow rate 30 µL/min, Auxiliary gas flow rate 10 µL/min, and PRM (Capillary temperature 320° C., S-lens RF level 55, resolution 70,000, HCE 30 eV).

Plant Materials and Growth Conditions

Arabidopsis develops three types of post-embryonic roots, ANRs, LRs and adventitious roots. In this study, the development of ANRs, the least characterized root type was examined. ANRs originate from the collet, a specific region located at the junction between the primary root and hypocotyl. In Arabidopsis, the collet originates from embryonic tissue and not from the root meristem.

TABLE 1

Mutants and marker lines

| Allele name | Gene locus | Description |
|---|---|---|
| psy-1 (Salk_054288) | AT5g17230 | Knock out mutant |
| ispH-1 | AT4g34350 | Knock out mutant |
| lut1 | AT3G53130 | Knock out mutant |
| lut2 | AT5G57030 | Knock out mutant |
| ccd1-1 | AT3g63520 | Knock out mutant |
| ccd4-1 | AT4g19170 | Knock out mutant |
| ccd7 (max3-11) | AT2g44990 | Knock out mutant |
| ccd8 (max4-6) | AT4g32810 | Knock out mutant |
| nced2-3 (Salk_090937) | AT4g18350 | Knock out mutant |
| nced3 (N3KO-6620) | AT3g14440 | Knock out mutant |
| nced5 (N5KO-4250) | AT1g30100 | Knock out mutant |
| nced6 (WISC.DSLox471G6) | AT3g24220 | Knock out mutant |
| nced9 (Salk_051969) | AT1g78390 | Knock out mutant |
| aba1-6 (CS3772) | AT5g67030 | Knock out mutant |
| aba3-1 (CS157) | AT1g16540 | Knock out mutant |
| pin3-4 (SALK_038609) | AT1G70940 | Knock out mutant |
| arf7arf19 | AT5G20730 & AT1G19220 | Knock out mutant |
| pWOX5::GFP | — | WOX5 promoter marker line |
| pDR5::LUC | — | synthetic auxin marker line |
| pDR5Rev::GFP | AT3G11260 | synthetic auxin marker line |
| pPIN3::PIN3-GFP | AT1G70940 | PIN3 marker line |

For Arabidopsis, Col-0 was used as wild type, unless otherwise noted. Mutants psy, ispH1, lut1, lut2, ccdI, ccd4, ccd7, ccd8, nced2, nced3, nced5, nced6, nced9, aba1, aba3 are known in the art. The mutants pin3-4 were acquired from ABRC stock center and the arf7arf19 (CS24625) mutants were acquired from the European Arabidopsis Stock Centre. The pPIN3::PIN3-GFP, pDR5rev::GFP and pDR5::LUC mutants have been described previously. The pWOX5::GFP seeds have been described previously.

Sterilized Col-0 and mutants seeds were kept at 4° C. in darkness for 3 days to stimulate seed germination, and then sown on half strength MSO plates (with 0.5% sucrose +1% agar, 0.5g/L MES, pH 5.7) supplemented with the indicated chemicals as described below or in the Figures. Plates were vertically grown in PERCIVAL® growth chambers under long day (16 h light/8 h dark, 22° C., 60% relative humidity, light density: 4000 LUX) LED white light [HYPERIKON® 16 W LED Light Bulb A21, 16 W (100 W Equivalent), CRI92, 1620 Lumens, 4000K (Daylight Glow)] conditions. Light fluorescence rates were measured using a digital LUX meter (PEAKTECH® 5025).

For rice, sterilized Nipponbare seeds were kept at 30° C. in darkness for 1 day to stimulate germination and transferred to Petri dishes with half strength Murashige and Skoog (MS) media (with 0.5 g/L MES, pH 5.7) and autoclaved filter paper. Dishes were incubated in darkness for 2 days then exposed to light for 1 day in PERCIVAL® growth chamber (12 h light/12 h dark, 26° C., 55% humidity, 500 umol.m$^{-2}$.s$^{-1}$). Uniform, healthy rice seedlings were transferred to hydroponic culture (Hoagland) supplied with acetone (Mock) or 20 μM anchorene. Seedlings were grown in the same growth conditions for another 6 days, and Hoagland solutions (mock and 20 μM anchorene) were replaced every 2 days. Crown roots number, as well as shoot and root length and fresh weight were recorded to perform the phenotyping.

Root Phenotyping Assays

ANRs were counted in seedlings vertically grown on half strength MS (with 0.5% sucrose +1% agar, 0.5 g/L MES, pH 5.7) media 8 days post-stratification (dps) using a dissection microscope. To investigate ANR formation after root apical meristems (RAM) excision (ANR-RE), RAM of seedlings were excised using sterile scalpels at 5 dps and then grown for another 3 days prior to counting the number of emerged ANRs. RAM of seedlings were excised at 8 dps and then grown for another 3 days prior to counting the number of emerged LRs. For determining the effect of anchorene on lateral roots, the number of emerged lateral roots were counted using a dissection microscope at 8 dps. For primary root length measurements, seedlings were measured using the publicly available ImageJ software (downloaded from rsbweb.nih.gov/ij/) after taking digital photographs. For adventitious root assay, the number of emerged adventitious roots per plant were counted after 5 days of treatment on plates with or without anchorene.

For the quantification of ANR formation under OH-Apo10' and OH-Apo12' treatment conditions, the sterilized Arabidopsis seeds were exposed to light for 24 hours first, and then plated to 1/2 MS plates with indicated chemicals; the plates were kept under darkness (22° C.) for another two days and then exposed to long day light conditions for another 7 days to count the ANR emergence.

Confocal Microscopy

To examine ANR initiation and primordium, the ClearSee™ protocol was applied. Briefly, seedlings exposed to various treatments were fixed using 4% paraformaldehyde dissolved in phosphate buffered-saline (PBS) for 30 minutes. Fixed seedlings were washed twice with PBS and then immersed in ClearSee™ solution (10% w/v xylitol, 15% w/v sodium deoxycholate, and 25% w/v urea in water). After incubating the seedlings in ClearSee™ solution in the dark at room temperature for 2-3 days, laser scanning confocal microscopy (Zeiss LSM 510 microscope) was used to examine the roots. To examine primary roots, laser scanning confocal microscopy of live seedlings was performed using 10 μM propidium iodide (PI) as a cell wall indicator.

To examine pDR5Rev::GFP fluorescence at the collet region, live seedlings were directly used for laser scanning confocal microscopy (Zeiss LSM 510 microscope) examination.

For fluorescence intensity quantification of pDR5Rev::GFP and pPIN3::PIN3-GFP marker lines, ImageJ software (rsbweb.nih.gov/ij/) was used after taking confocal microscopy photos. All calculations are background subtracted.

Luciferase Assay

Luciferase activity was assayed as previously described. Briefly, 1 mL of 5 mM Potassium Luciferin (Gold Biotechnology®) dissolved in water was directly applied to pDR5:LUC seedlings grown vertically on treated half strength MS plates. The luciferin solution was allowed to dry for 5-10 minutes in the dark, at room temperature. Seedlings were then imaged using a Lumazone™ CA automated Chemiluminescence system. Seven minute exposure times were used.

LC-MS Qualitative And Quantitative Identification of Anchorene

About 30 mg (30-40 mg) of freeze-dried and ground Arabidopsis seedlings tissues were extracted using 1 mL of acetonitrile with anti-oxidant [0.1% butylated hydroxytoluene (BHT)] for 15 min in an ultrasonic bath (Branson® 5510EDTH, 25° C., 15 min), followed by centrifugation for 8 min at 13000 rpm at 4° C. The collected supernatant was dried using a concentrator (Labconco RapidVap® System). The extract was derivatized (SCHEME 3) with 50 μL of derivatization solution containing 5 mg/mL derivatization reagent ($N^2,N^2,N^4,N^4$-tetraethyl-6-hydrazineyl-1,3,5-triazine-2,4-diamine) (Chemspace) and 1% formic acid in methanol at 37° C. for 15 min. Then the sample solution was diluted to 150 μL with 1% formic acid in methanol and filtered by using 0.22 μm filter before LC-MS analysis.

SCHEME 3: Derivatization reaction for anchorene

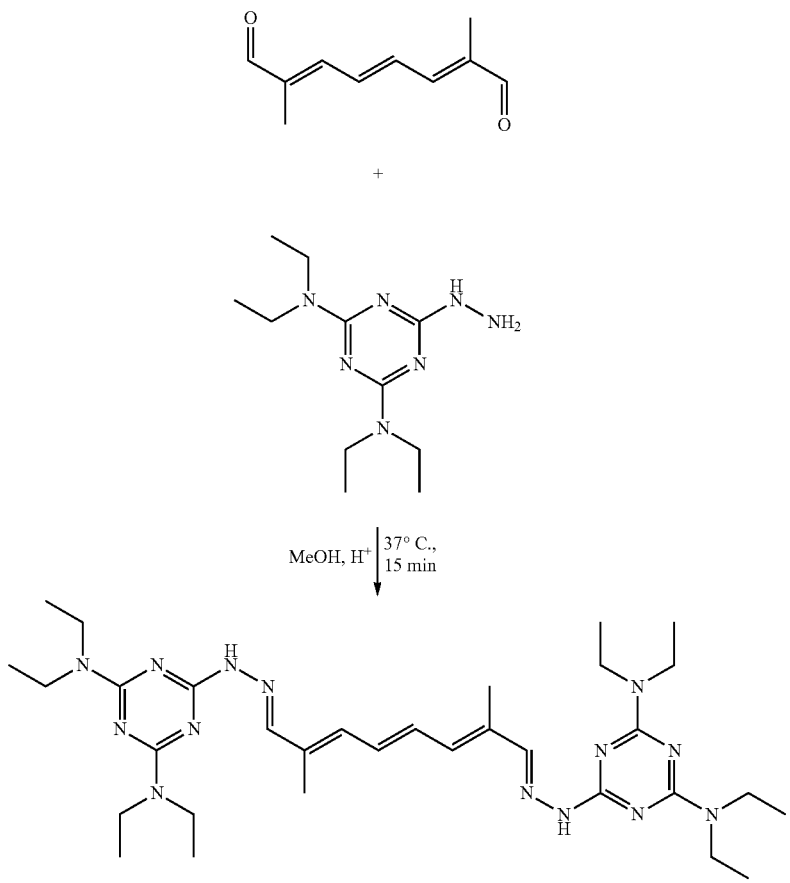

The qualitative analysis of derivative anchorene were performed on UHPLC-Q-Exactive™ Plus MS. Chromatographic separation was achieved on an Acquity UPLC® Ethylene Bridged Hybrid (BEH) C18 column (100×2.1 mm; 1.7 pm; Waters) using a mobile phase consisting of water: acetonitrile (95:5, v:v, (A), and pure acetonitrile (B), both containing 0.1% formic acid). A gradient was applied, starting with 40% acetonitrile and increasing to 50% acetonitrile over 15 min. A concentration of 50% acetonitrile was maintained for 10 min and then was increased to 100% acetonitrile over 4 min and then maintained for 5 min To equilibrate the column before the next run, the mobile phase was adjusted back to 40% acetonitrile in 1 min and this concentration was maintained for 5 min prior to the next sample injection. A flow rate of 0.2 mL/min and a column temperature of 35° C. were maintained throughout the run. The eluent of the column was introduced to the mass spectrometer using atmospheric-pressure chemical ionization in positive mode. The injection volume was 5 µL for LC. The conditions of the mass spectrometer were set as follows: resolution: 280,000; automatic gain control: 3×106; maximum injection time: 200 ms; sheath gas flow: 40 arbitrary units; auxiliary gas flow: 10 arbitrary units; spray voltage, 4.0 kV; capillary temperature: 300° C.; vaporizer temperature: 300° C.

The quantitative analysis of derivative anchorene were carried out on HPLC-Q-Trap MS/MS. Chromatographic separation was achieved on an Acquity UPLC CSH C18 column (50×2.1 mm; 1.7 µm; Waters) using a mobile phase consisting of water: acetonitrile (95:5, v:v, A) and pure acetonitrile (B), both containing 0.1% formic acid. A gradient was applied, starting with 10% B and increasing to 40% B over 5 min. Then 15% B was increased within 10 min followed by an increase of 45% B over 2 min. And then 100% B was maintained for 10 min. To equilibrate the column before the next run, the mobile phase was adjusted back to 10% B in 1 min and this concentration was maintained for 8 min prior to the next sample injection. A flow rate of 0.15 mL/min and a column temperature of 40° C. were maintained throughout the run. The eluent of the column was introduced to the mass spectrometer using turbo spray ion source in positive mode. The injection volume was 10 µL. The conditions of the mass spectrometer were set as following: curtain gas: 30; ion spray voltage: 5 kV; temperature: 400° C.; ion source gas 1: 30; ion source gas 2: 40; declustering potential, 55; entrance potential: 10; collision energy: 25; collision cell exit potential: 10. For derivative anchorene: Q1 mass (Da): 635.5, Q3 mass (Da): 239.2; for derivative D6-anchorene: Q1 mass (Da): 641.5, Q3 mass (Da): 239.2.

RNA-Seq Materials Preparation And Data Analysis

For anchorene and NPA treatment, Col-0 seedlings were vertically grown on half MSO (with 0.5% sucrose+1% agar, 0.5 g/L MES, pH 5.7) plates supplemented with 20 µM anchorene or 1 µM NPA for 5 days. RAM excision treatment was applied by excising the RAM from 4.5-day old Col-0 seedlings, and then tissue was collected 12 hours after excision (5 DAG). About 2 mm of tissue at the collet site (see FIG. 11I) was collected at 5 DAG for all chemicals and physical treatment. Tissue from approximately 50 seedlings were used for each sample. Total RNA was extracted by Direct-zolTM RNA MiniPrep Plus (200 Preps) w/Zymo-Spin™ (ZYMO research). 100 ng total RNA were used for RNA Hi-seq 4000 (ILLUMINA). Each treatment includes three independent replicates.

Prior to the analysis of RNA-Seq data, the adaptor sequences and low-quality ends of sequenced reads were trimmed using Trimmomatic v0.32 and quality-checked using FastQC v0.11 (www.bioinformatics.babraham.ac.uk/projects/fastqc). To quantify the expression level of genes, the remaining reads were pseudo-aligned to the publicly available TAIR10 A. thaliana transcriptome (release 34) using kallisto v0.43.0. The estimated read counts and calculated transcripts per million (TPM) were subsequently passed to sleuth v0.28.1 for differential expression analysis. Significantly differentially expressed genes were identified based on a cutoff of fold-change >1.5 and q-value <0.05. Gene ontology and KEGG pathway enrichment analyses were conducted using clusterProfiler and Pathview. RNA-Seq data can be accessed at NCBI via BioProject ID PRJNA489360.

Arabidopsis Ecotype Experiments

Silver sand (VRW) and soil (Asdcofert.com, "Argo Mix") were used for ANR phenotyping experiments. Col-0 seeds were kept in 4° C. for 3 days to insure uniform germination, and then sown in pots with sand or soil. The pots were kept under long-day photoperiod conditions (16 h light/8 h darkness, 22° C., 60% humidity) for 8 days. Then, forceps were used to gently take the seedlings from the sand or soil. Seedlings were then washed by water, prior to counting the ANRs under microscope.

Arabidopsis Ecotype Experiments

Prior to the anchor root (ANR) measurements, seeds from 10 ecotypes (Po-0, Is-0, Wu-0, Col-0, Cvi-0, Hi-0, Ove-0, Sav-0, Ler and Kin-0) were harvested from plants grown in long-day photoperiod conditions (16h light/8 h darkness, 22° C., 60% humidity). Seeds of all 10 ecotypes were surfaced sterilized and incubated in sterile water at 4° C. for 8 days, for uniform germination. Natural ANR emergence and ANRC was measured as described above (Anchor root assays) for each ecotype. 20 µM anchorene was used to test the responses of the Po-0 and Is-0 ecotypes to anchorene.

Nutrient Elements and Ph Value Analysis in Sand and Soil

For micronutrient elements analysis: Inductively coupled plasma atomic emission spectroscopy (ICP-OES) was used to measure elemental levels of iron, potassium, magnesium, manganese, phosphorus and zinc. Specifically, homogenized dry soil (50-100 mg) and sand (100-200 mg) samples were dissolved in the vessels with 8 mL nitric acid together with negative control (nitric acid and sample spike with the standard (6 mL nitric acid+2 ml standards mixture). Samples were digested using microwave digestion. After the digestion, ddH$_2$O was added for a final volume of 25 mL Samples were centrifugated and the supernatant was collected for ICP-OES analysis.

For the carbon, hydrogen, nitrogen, and sulfur elemental analysis, 5-20 mg homogenized dry soil and sand samples were analyzed by CHNS. Sulfanilamide was used as a standard.

For pH measurements, 15 mL soil or sand were soaked in 30 mL of pH 7 ddH$_2$O. The samples were vortexed and incubated in root temperature overnight. 15 µL supernatant from each sample was used to measure pH values by a standard pH meter.

Hoagland and Nutrient Deficient Growing Conditions

Col-0 seedlings were grown in vertical Hoagland medium (with 0.5% sucrose +1% agar, 0.5 g/L MES, pH 5.7) plates for 10 or 12 dps. For phosphorus deficient medium, the KH2PO4 was substituted with equal content of KC1 in the Hoagland solution; for nitrogen deficient medium, the NH$_4$NO$_3$ was omitted from the Hoagland solution.

Anchorene Treated Biomass Assay

Col-0 seedlings were grown in vertical half MS (with 0.5% sucrose +1% agar, 0.5 g/L MES, pH 5.7) plates with or without anchorene application (20 µM) for one week. Well-growing mock seedlings (without anchorene treatment) and anchorene treated seedlings with two emerged anchor roots were selected, transferred to new half MS media plates, and grown vertically for another 10 days. For each plate, 12 seedlings were transferred (4 plates were transferred in total for mock or anchorene treated conditions, respectively). After 10 days, roots and shoots were separately collected as one technical replicate from one plate. Four technical replicates for each treatment were quantified in each experiment and three independent experiments were conducted.

Carotenoids Extraction and Quantification

About 10 mg of freeze-dried and ground Arabidopsis seedlings with or without anchorene treatment were extracted using 2 mL of acetone with anti-oxidant (0.1% BHT) for 20 min in an ultrasonic bath (Branson 5510EDTH, 25° C.), followed by centrifugation for 8 min at 13000 rpm at 4° C. The collected supernatant was diluted 10 times in acetone for Spectrophotometer analysis. The quantification of total carotenoids by absorption spectrum was referred to previous described protocol. Specifically, absorption wavelength at 661.6 nm, 644.8 nm and 470 nm were measured. The total carotenoids was calculated according to the formula: $C_a = 11.24 A_{661.6} - 2.04 A_{644.8}$; $Cb = 20.13 A_{644.8} - 4.19 A_{661.6}$; total carotenoids $(\mu g/ml) = (1000 A_{470} - 1.90 C_a - 63.14 C_b)/214$.

Significance

Unknown carotenoid-derived compounds are predicted to regulate different aspects of plant development. The following examples characterize the development of anchor roots, the least characterized root type in Arabidopsis, and show that this process depends on auxin and requires a carotenoid-derived metabolite. A presumed carotenoid-derivative, anchorene, as the likely, specific signal involved in anchor root formation was identified. The examples further show that anchorene is a natural metabolite that occurs in Arabidopsis. Based on the analysis of auxin reporter lines and transcriptome data, these results provide evidence that anchorene triggers the growth of anchor roots by modulating auxin homeostasis. Taken together, this work identifies a novel carotenoid-derived growth regulator with a specific developmental function.

EXAMPLE 1

Apocarotenoid Regulation of ANR Development

Figure 3A:
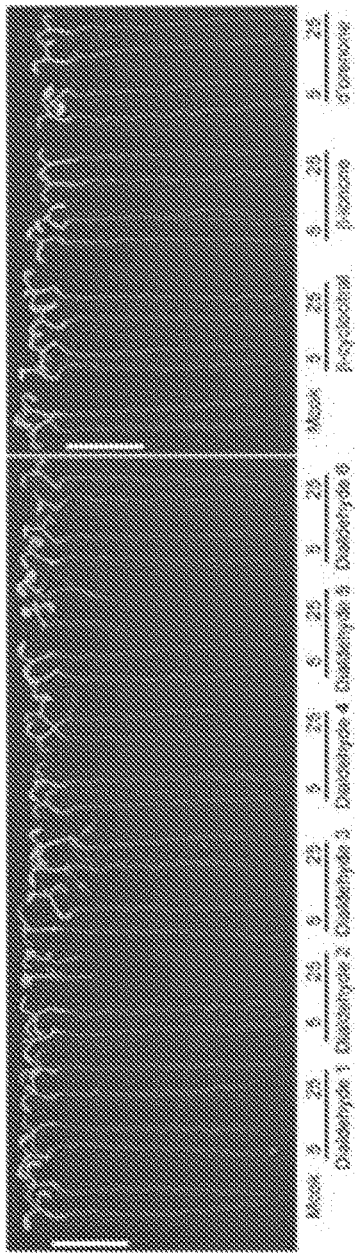

Six previously identified or predicted diapocarotenoids with chain lengths ranging from $C_9$ to $C_{15}$ (Diapo1-6) (FIG. 1B) and 3 apocarotenoids (FIG. 1C) were selected to identify new carotenoid-derived signals involved in root development). These compounds were selected because they are available and stable at ambient conditions. Diapo1 ($C_9$) is the expected product formed upon cleavage of all-trans-β-apo-10' carotenal. Diapo2 ($C_{10}$) results from cleaving the C7, C8 and C15, C15' double bonds in different carotenoids and is produced by cyanobacterial retinal-forming enzymes from Cm-apocarotenoids. Diapo3 ($C_{10}$) is a structural isomer of Diapo2 and a predicted cleavage product that can be formed by cutting the C11, C12 and C11', C12' bonds in almost all plant carotenoids (FIGS. 1A, 1B and 17). Diapo4 ($C_{12}$) results from cleaving the C7, C8 and C13', C14' bonds in many carotenoids, and is formed by the CCD1 from apo-10'-lycopenal. Diapo5 ($C_{15}$) results from cleaving the C7, C8 and C11', C12' bonds in many apocarotenoids and is formed by CCD1 from apo-10'-lycopenal. Diapo6 ($C_{14}$) is a common CCD1 product formed by cleaving the C9, C10 and C9', C10' bonds in many carotenoids. The effect of these compounds on Arabidopsis root growth was evaluated by treating seedlings with either 5 or 25 μM of each compound. The length of primary roots 7 days post-stratification (dps) was determined. As shown in FIGS. 3A-B, significant effects were not observed with any of the compounds at lower concentrations. At 25 μM, Diapo2 and Diapo5 caused a severe reduction in primary root growth (approximately 80%). Diapo1, Diapo3 and Diapo4 showed only weak inhibition of primary root growth. The most striking effect of Diapo3 was the promotion of ANR formation. Based on this activity, Diapo3 was named "anchorene".

Figure 3C:
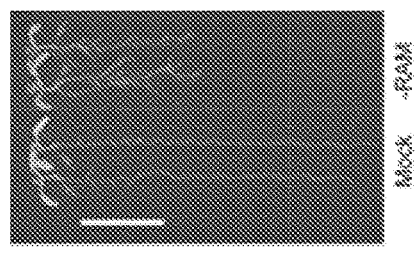
Figure 3B:
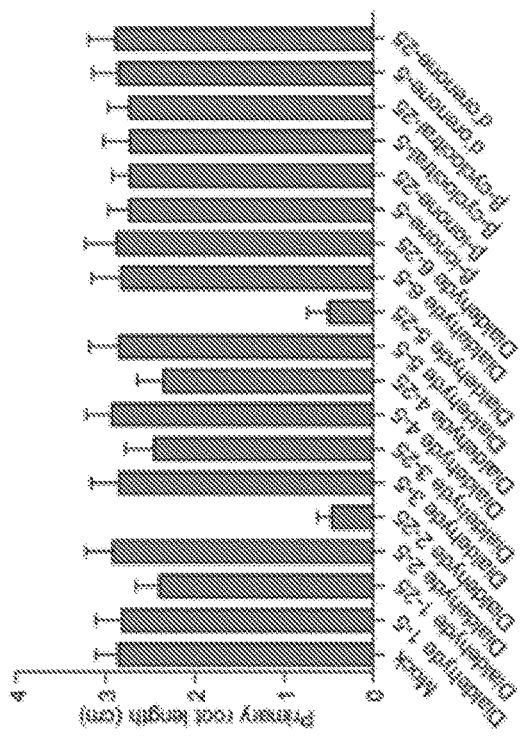
Figure 3F:
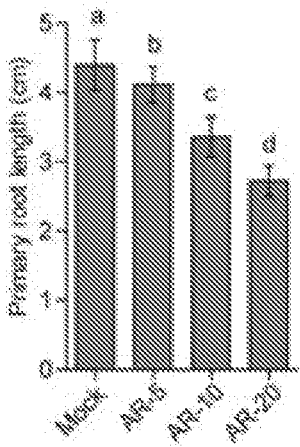
Figure 3G:
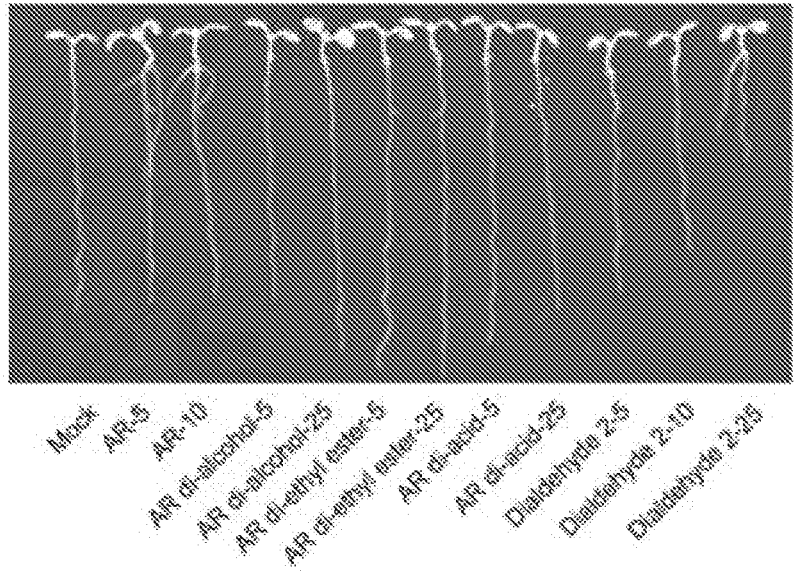
Figure 3H:
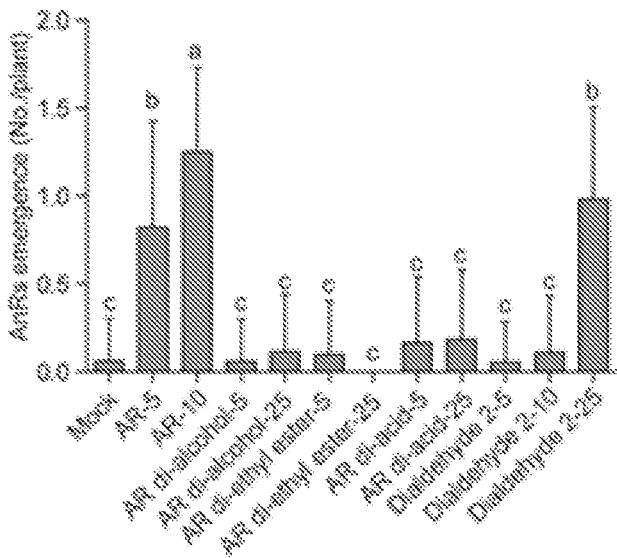

Excision of the root apical meristems (RAM) triggers ANR formation (FIGS. 3C-D). Different concentrations of anchorene were applied to roots with or without RAM excision to exclude the possibility that the induction of ANR formation upon anchorene treatment is a result of anchorene's weak inhibitory effect on primary root growth (FIG. 3F). About 9% of control Col-0 seedlings developed ANRs under normal conditions, while approximately 50% formed ANRs upon RAM excision (FIGS. 4B-C). The effect of 5 μM anchorene was comparable to that of RAM excision, triggering the formation of ANRs in 55% of the seedlings (FIGS. 4B-C). Higher anchorene concentrations (10 and 20 μM) enhanced this ratio to 97% and 100%, respectively (FIGS. 4B-C). There was also an increase in the number of seedlings that developed two ANRs from 0% in the untreated control to approximately 80% upon application of 20 μM anchorene (FIGS. 4B-C). Using a wide range of concentrations, a dose-response curve was established in the presence and absence of RAM excision. The effect of anchorene was dose dependent in both cases (FIG. 3J). Taken together, these results show that anchorene promotes ANR formation regardless of RAM excision (FIGS. 4B-C), which demonstrates that the effect of this compound on ANRs is distinct from its inhibition of primary root growth. In addition, RAM excision promoted lateral root (LR) emergence, while anchorene application did not affect LR emergence or length (FIGS. 3E-F). Thus, the promotion of ANRs is not caused by inhibiting primary root growth.

To test the specificity of anchorene in triggering ANR formation, the effect of structurally similar compounds on this process were evaluated. The application of Diapo2, a structural isomer of anchorene with a different position of one of the two methyl groups (FIG. 1B), led to a modest increase in ANR formation only at 25 μM (FIGS. 3G-H). However, this concentration is much higher than the active concentration of anchorene and caused obvious reduction of primary root growth. Hence, the stimulatory effect of Diapo2 on ANR formation may be a result of Diapo2's severe inhibition of primary root growth (FIGS. 3A-B and 3F-G). Modification of anchorene's structure by reducing the aldehyde groups to alcohols or converting the aldehydes into acids or acid-ethyl esters resulted in a loss of activity in promoting ANR formation (FIGS. 3G-H). The stereoisomer of anchorene was also shown to be inactive, suggesting that this process requires specific structural features found only in anchorene, among the compounds tested. Taken together, these results show anchorene is a specific inducer of ANR formation.

To understand how anchorene exerts its activity, ANR development was imaged, using stereo and confocal microscopy. ANRs arise in the collet region, which is characterized by the presence of dense root hairs (FIGS. 4D-E). Arabidopsis seedlings form one or two ANRs opposite each other, minoring the positions of the cotyledons (FIGS. 4D-4E). In contrast, LRs emerge in much higher numbers at alternating positions. ANRs themselves can also develop secondary ANRs or LRs (FIG. 4D). Both ANRs and LRs originate from the pericycle. However, the collet pericycle forms only one, or two ANRs located opposite each other, while the primary root pericycle continuously develops alternating LRs. The cellular pattern of ANR primordia in the collet indicates that they originate, similar to LRs, from the xylem pole pericycle. Analysis of GFP signals in a pWOX5::GFP marker line, which is induced upon formation of LR primordia, confirmed the pericycle origin of ANR primordia (FIG. 4F).

Figure 5A:
Figure 5B:
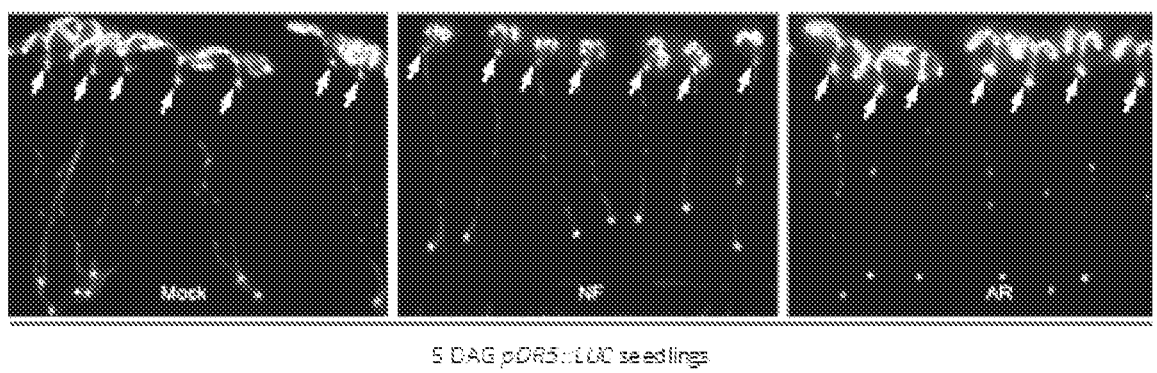
Figure 5C:
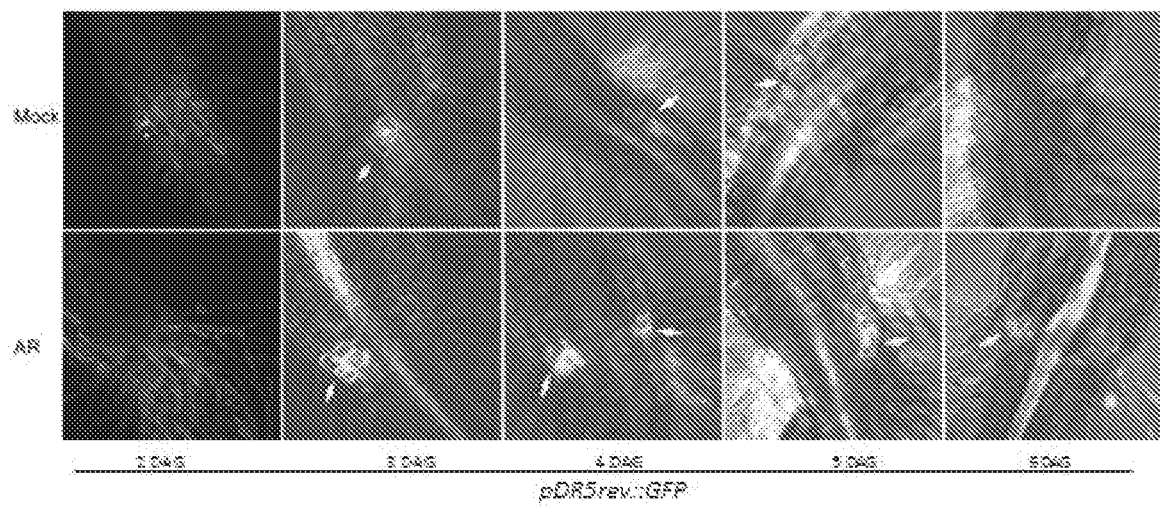

A pDR5::LUC line, which marks LR prebranch sites, was used to track ANR development. A clear LUC signal in the collet as early as 3 dps was observed (FIG. 5A), which indicates that this line also marks the site of ANR primordia. Consistent with the promoting effect of anchorene on ANR formation, the application of this compound intensified the LUC signal in the collet (FIG. 5B). Similarly, anchorene application to pDR5rev::GFP seedlings (20 μM) led to a strong GFP signal at the same site (FIG. 5C). ANR primordia initiation was observed as early as 3 dps, in anchorene treated pDR5::LUC and 158 pDR5rev::GFP seedling (FIGS. 5A-C). At 6 dps, fully emerged ANRs were observed in anchorene treated pDR5rev::GFP seedlings (FIG. 5C). These results show that the application of anchorene increased the auxin levels both in ANR primordia and the underlying endodermis region and suggests that anchorene triggers ANR formation by modulating auxin transport and content. Consistent with these results, transcriptome analysis (detailed below) showed that anchorene application and removal of RAM lead to the induction of many auxin biosynthesis genes.

EXAMPLE 2

Normal ANR Formation Requires a Carotenoid-derived Metabolite

Figure 6A:
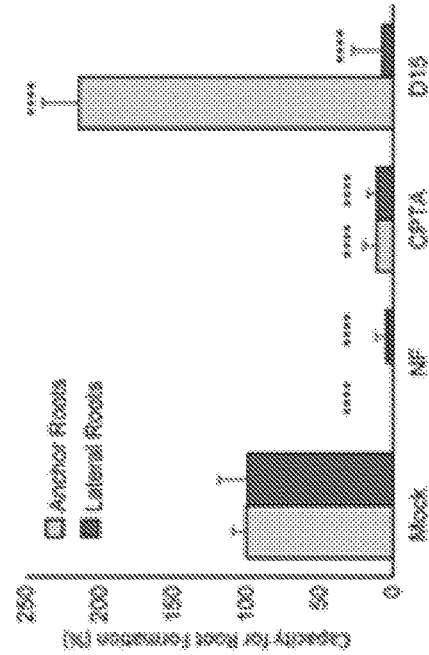

ANR formation under carotenoid-deficient conditions was monitored to determine the role of endogenous carotenoids in ANR development. Arabidopsis seedlings grown on media frequently do not form emerged ANRs, which impeded the characterization of factors affecting ANR formation. Therefore, ANR formation was monitored after RAM excision (ANR-RE) to stimulate ANR development. ANR measurements were used as an indicator of ANR formation capacity under different conditions. Inhibition of carotenoid biosynthesis largely reduces ANR-RE, indicating that a carotenoid-derived signal is essential for ANR development (FIGS. 6B-E). Norflurazon (NF) and 2-(4-chlorophenylthio)-triethylamine hydrochloride (CPTA), which block phytoene desaturation and lycopene cyclization, respectively were tested (FIG. 6A). The effect of D15, an inhibitor of CCDs was also investigated. Application of D15 to Arabidopsis seedlings is known to lead to an increase in carotenoid levels. These three compounds have been shown to reduce LR initiation suggesting that a CCD product is required for LR development. Increased ANR-RE in D15 treated seedlings was observed (FIGS. 6B-C), which suggests that two different carotenoid-derived signals are required for lateral root initiation and ANR development. To test this hypothesis, the ability of anchorene to restore LR capacity in D15-treated seedlings was investigated. Anchorene had no significant effect on LR formation after D15 treatment. Furthermore, it inhibits LR capacity in untreated seedlings (FIG. 6G), corroborating evidence that anchorene is not the carotenoid-derived signal required for LR capacity. The positive effect of D15 on ANR-RE may be caused by increased carotenoid levels or by its inhibitory effect on primary root growth.

Figure 6B:
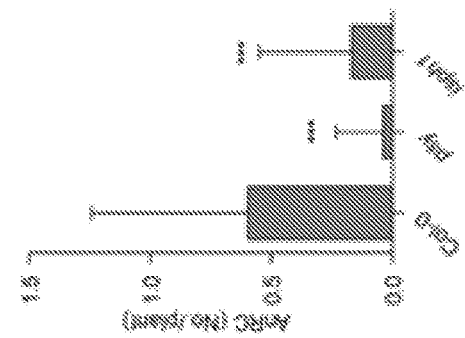
Figure 6C:
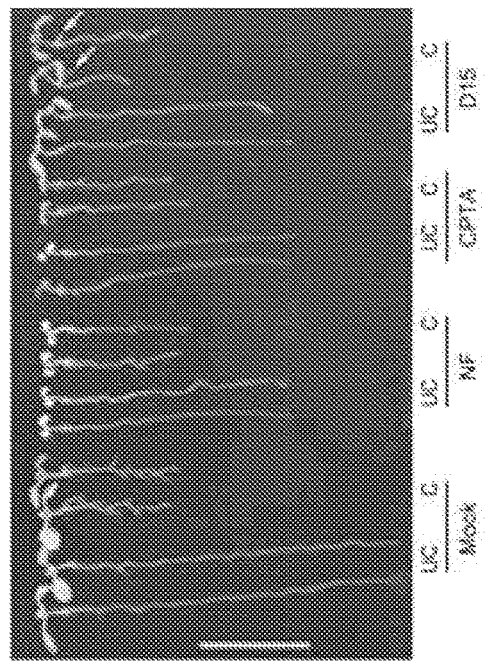
Figure 6D:
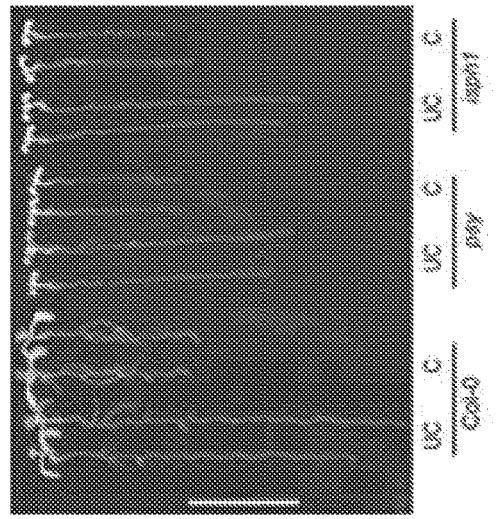
Figure 6E:
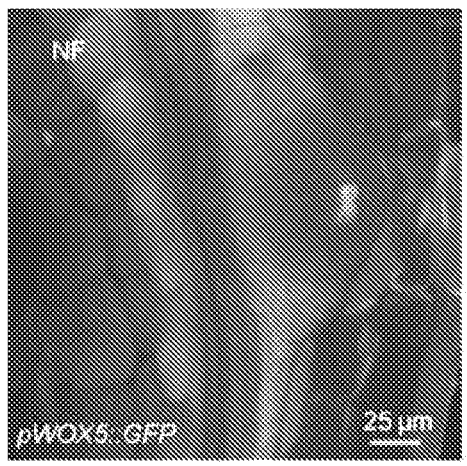

Both NF and CPTA strongly reduced ANR-RE, while D15 promoted ANR formation (FIGS. 6B-C). This suggests that the carotenoid pathway is necessary for proper ANR development, but that the apocarotenoid required for LR development is different from that required for ANR formation. The positive effect of D15 on ANR-RE may be a result of increased carotenoid levels observed upon application of this carotenoid cleavage inhibitor. The carotenoid deficient mutants, ispH1 and psy, which are disrupted in plastid isoprenoid and phytoene biosynthesis, respectively were examined (FIG. 6A). Both mutants displayed greatly reduced ANR-RE, compared with wild-type seedlings (FIGS. 6D-E). These data demonstrate that a likely carotenoid-derived metabolite is required for ANR formation.

Figure 8A:
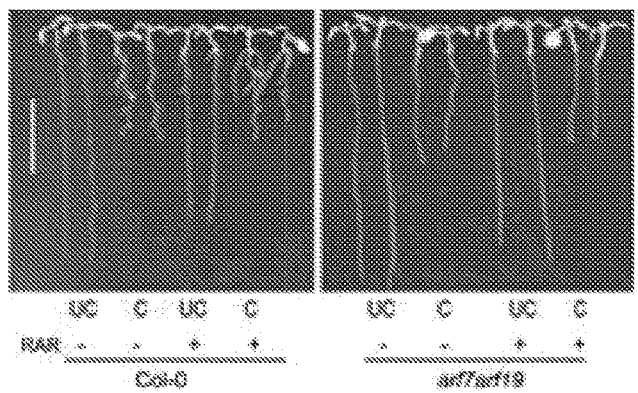
Figure 8B:
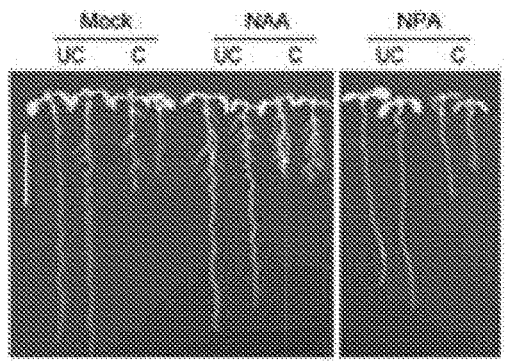

CPTA inhibits the synthesis of both α- and β-carotene, which mark the two branches of plant carotenoid biosynthesis (FIG. 6A). To narrow down the source of the ANR formation signal, ANR-RE in lut1 and lut2 were assessed respectively (FIG. 6A). lut1 and lut2 are deficient in a-carotene and lutein formation. The ANR-RE of both mutants were indistinguishable from that of wild-type (FIG. 7A), suggesting that the α-branch is not the primary source for the ANR signal. Next, ANR formation in SL- and ABA-deficient mutants was examined SL and ABA are two plant hormones derived from the β-carotene branch (FIG. 6A). The SL deficient ccd8/max4 and max1 mutant showed increased ANR-RE (FIG. 7B and F), and application of the synthetic SL analog, GR24, inhibited ANR formation (FIG. 7D), indicating that SLs are negative regulators of this process, although no significant ANR-RE change was observed in ccd7/max3 seedlings. An ANR-RE reduction in individual Arabidopsis ccd or nced mutants was not detected (FIG. 7B), suggesting either that anchorene is redundantly produced by more than one member of the Arabidopsis CCD family or that it is formed by a different mechanism, including non-enzymatic cleavage. ANR-RE of the ABA deficient mutants, aba1 and aba3, was similar to that of wild-type. Moreover, exogenous application of ABA did not impact this trait (FIG. 7C and 7E), suggesting that ABA is likely not involved in ANR development. The involvement of the carotenoid cleavage dioxygenases NCED2, NCED3, NCED5, NCED6 and NCED9, and of CCD1 and CCD4 in ANR development was examined by determining ANR-RE in the corresponding mutants (see TABLE 1). As shown in FIG. 8B, none of these mutants showed a significant change, indicating that the corresponding enzymes are unnecessary for ANR-RE or work redundantly in this regard.

Figure 6F:
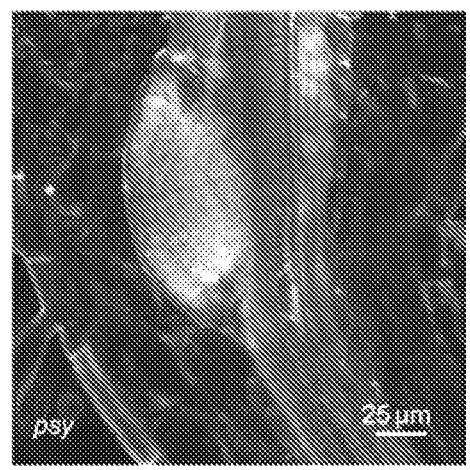
Figure 6H:
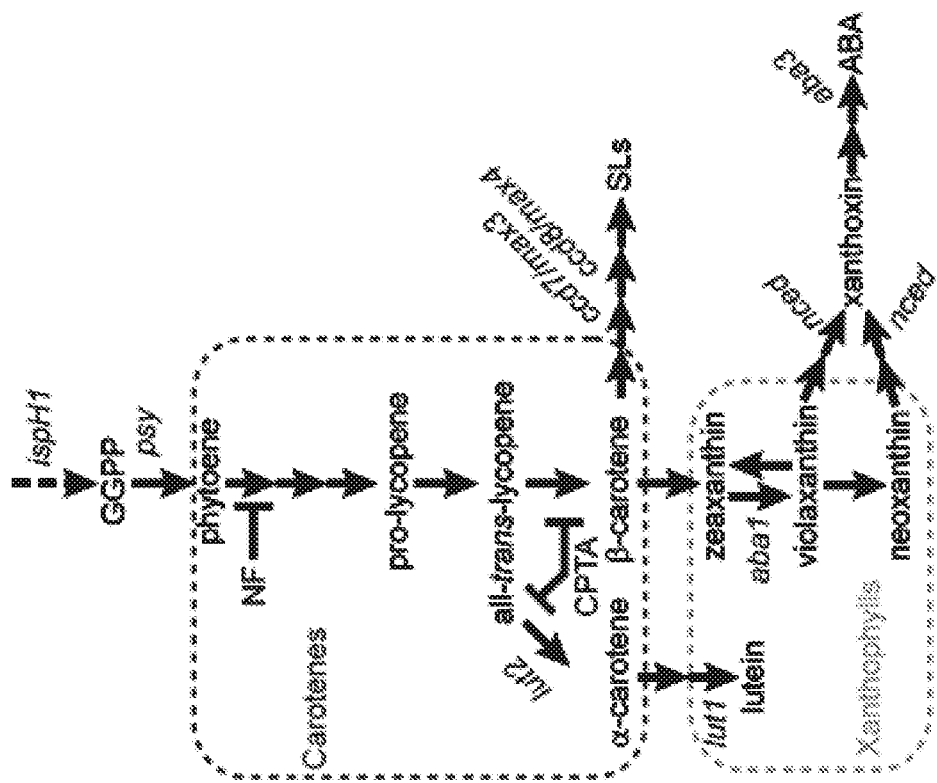
Figure 6G:
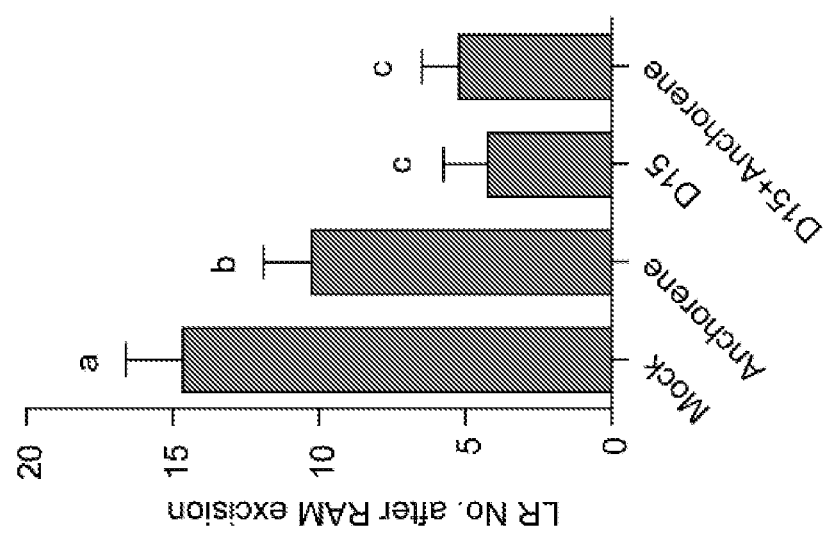

To determine the stage of ANR development that requires the apocarotenoid signal, the effect of NF on the pDR5:: LUC marker line was examined. A clear LUC signal was detected in the collet upon NF treatment, suggesting that carotenoids are not needed for ANR initiation (see FIGS. 5A-B). This assumption is further supported by the presence of ANR primordia in both NF treated pWOX5::GFP seedlings and the carotenoid deficient mutant psy (FIGS. 6F and H).

EXAMPLE 3

ANR Formation Rescue under Carotenoid Deficient Conditions

The ability of anchorene to rescue ANR-RE reduction caused by inhibiting carotenoid biosynthesis was tested to determine if anchorene is the carotenoid-derived metabolite required for ANR formation. Simultaneous treatment with anchorene (20 µM) blocked inhibition of ANR-RE caused by NF or CPTA in seedlings (FIGS. 9A-B). This observation is consistent with anchorene being the carotenoid-derived metabolite required for ANR formation. Anchorene treatment restored wild-type ANR-RE in the psy mutant (FIGS. 9C-D). These results indicate that anchorene is sufficient to promote ANR formation under carotenoid-deficient conditions. These results also exclude the possibility that the reduction in ANR-RE observed in mutant seedlings is an indirect consequence of albinism.

The effect of NF alone and in combination with anchorene in pDR5rev::GFP seedlings was examined. No significant reduction in GFP signal after NF application was observed, indicating that NF does not inhibit the initiation of ANR primordia. However, the combined NF/anchorene treatment clearly enhanced the GFP signal (FIGS. 5D-E), suggesting that anchorene stimulated growth of ANR primordia post-initiation, which is consistent with the results showing that carotenoids are not necessary for ANR initiation.

Figures 9E, 9F:
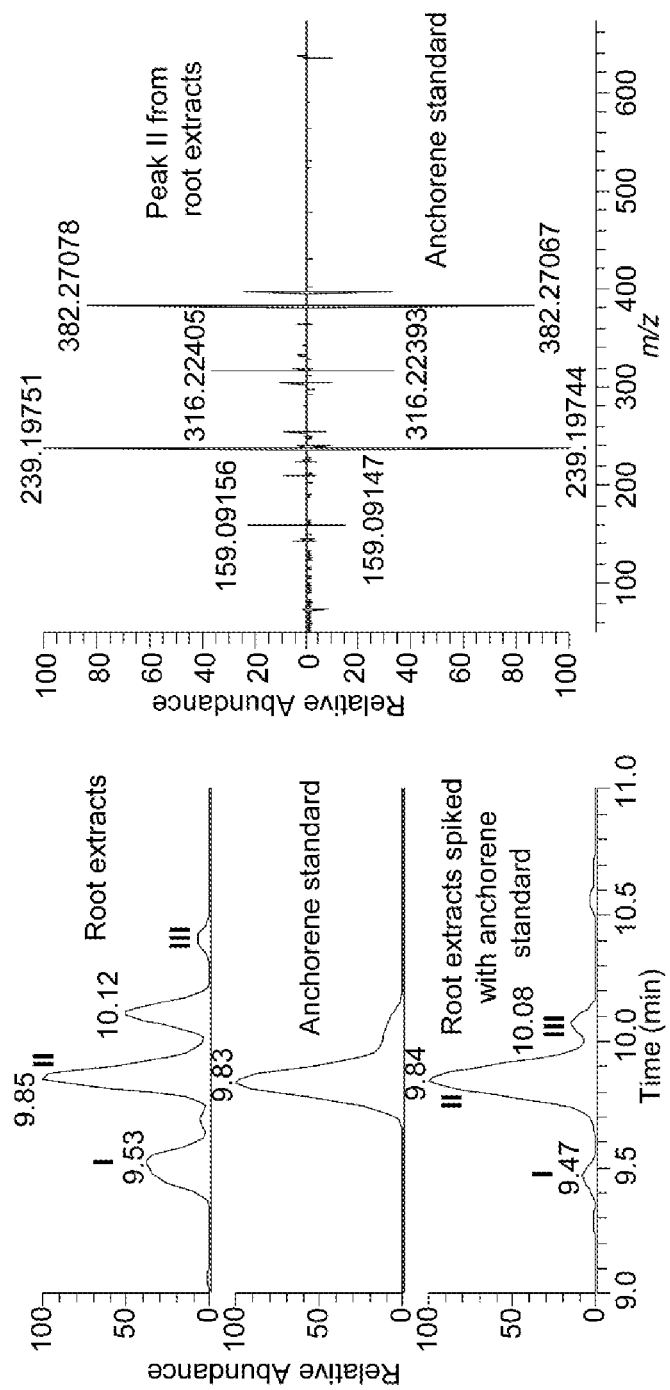

To determine if anchorene is a natural plant metabolite, an extraction and derivatization protocol for carotenoid-derived diapocarotenoid was developed and seedling extracts were analyzed by Liquid Chromatography-Mass Spectrometry (LC-MS). As shown in FIGS. 9E-F, endogenous anchorene was identified from Arabidopsis leaves based on its accurate mass and confirmed by the precise match of the chromatographic retention time and product ion spectra with the authentic anchorene standard. The chromatographic peak of the exogenous anchorene standard spiked into leaf extracts overlapped with that of the presumed endogenous anchorene, further confirming the identification of anchorene. In addition, two potential anchorene isomers were examined based on their accurate mass and product ion spectra (FIG. 9E-F and FIGS. 10A-C). Anchorene content in shoot tissues was about 4-fold higher than in root tissues (0.08±0.003 versus 0.02±0.001 pmol/mg dry weight) (FIG. 10C). Two potential anchorene isomers identified by their accurate mass and product ion spectra were also observed (FIGS. 9F and 10B). Interestingly, the relative amounts of the three peaks differ between root and shoot samples, with the anchorene peak being the most pronounced peak in root samples (FIG. 10A). This pattern is consistent with anchorene's role in root development. Moreover, we quantified the anchorene content after NF treatment to confirm its carotenoid origin. Consistently, the anchorene content of the whole seedlings decreases after 24 hours NF treatment, and greatly decreases in NF continuous treated seedlings (FIGS. 24A-B).

Anchorene could be produced from the cleavage of C11-C12 and C11'-C12' double bonds of most carotenoids. Arabidopsis seedlings were fed with OH-APO10' and OH-APO12' (FIG. 21A), and the anchorene content was then measured to confirm the carotenoid origin of anchorene and to test a possible precursor. Interestingly, OH-APO12' fed Arabidopsis seedlings contained much more anchorene compared to control and OH-APO10' feed seedlings (FIG. 21B). Furthermore, OH-APO12' but not OH-APO10' treated Arabidopsis seedlings formed more anchor routes compared to mock (FIG. 21C). This suggests that OH-APO12' is likely acting as the direct precursor to produce anchorene (FIG. 21D). Several CCDs from plants, fungi, and cyanobacteria produce apocarotenoids, either by repeated cleavage of carotenoid substrates or by specifically targeting apocarotenoids. Enzymatic studies on Arabidopsis CCDs do not support the formation of anchorene by a single CCD. Indeed, none of the Arabidopsis CCDs are capable of performing cleavage at both of the C11-C12 and C11'-C12' double bonds in vitro, but interestingly FIG. 21A-C show that OH-APO12' is likely a specific precursor of anchorene in Arabidopsis by feeding experiments. It was previously shown that OH-APO12' could be produced by a maize NCED enzyme, VP 14, by the cleavage of zeaxanthin, however individual Arabidopsis ccd or nced mutants did not show ANR-RE reduction (FIG. 7F).

EXAMPLE 4

Auxin Distribution and ANR Development

Anchorene's promotion of the signal in the DR5 marker line suggested the involvement of auxin in ANR development and suggests that auxin content and distribution are both important for ANR-RE. ARF7 and ARF19 are auxin responsive transcription factors which are indispensable regulators of LR initiation. The role of these transcription factors in ANR initiation was examined. The results show ARF7 and ARF19 are indispensable for ANR initiation (FIGS. 11A-B). As shown in FIGS. 8A, 11A and 12A, the arf7arf19 double mutant did not form any ANR upon anchorene application (20 µM) or after RAM excision.

Moreover, confocal microscopy revealed that the arf7arf19 double mutant lacks ANR primordia (FIGS. 11B), suggesting that ARF7 and ARF19 are crucial for ANR initiation. Next, the effect of the auxin analog 1-Naphthaleneacetic acid (NAA) and the auxin transport inhibitor N-1-Naphthylphthalamic Acid (NPA) on ANR development were examined. As shown in FIGS. 11C and 12B), NAA greatly increased ANR-RE, while NPA treatment completely blocked ANR-RE. These results suggest that auxin signaling is required for ANR initiation and that auxin transport is essential for ANR formation.

Figure 8C:
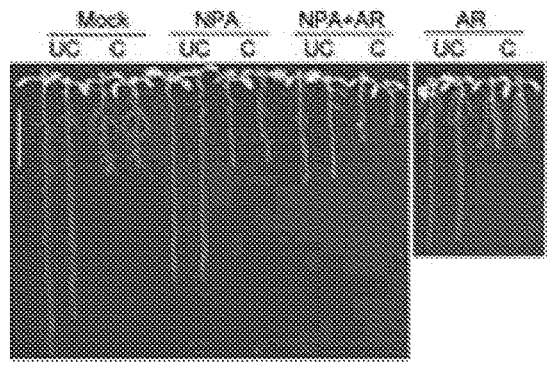
Figure 8D:
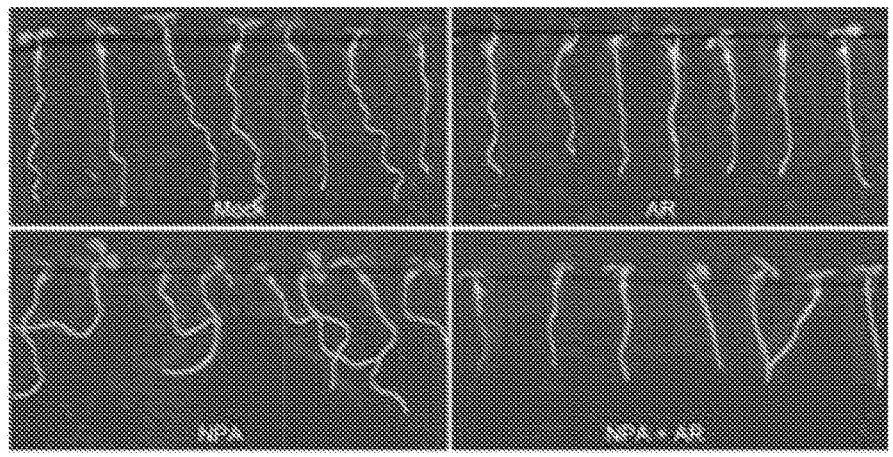
Figure 8E:
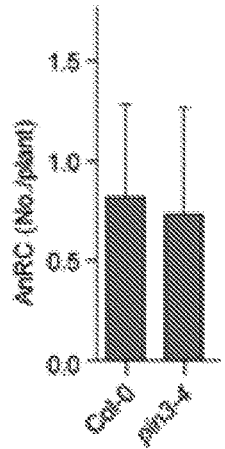
Figure 11F:
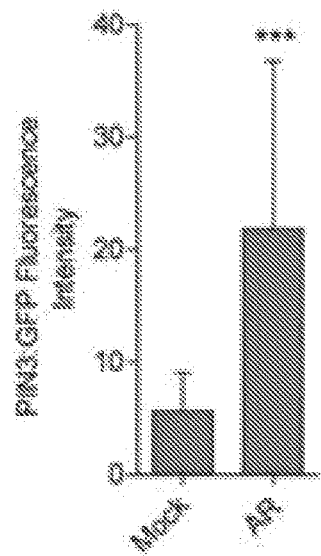
Figure 11G:
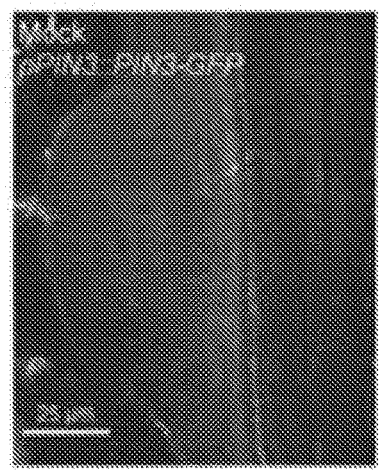
Figure 11H:
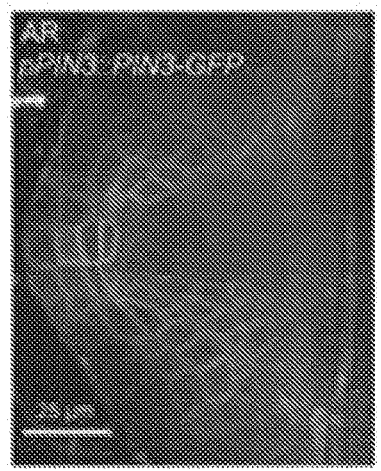
Figure 11I:
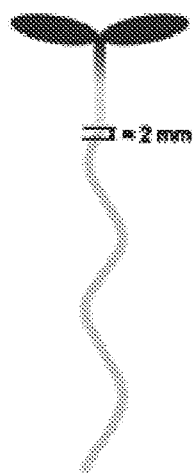

To determine if the effect of anchorene on ANR development is caused by changes in auxin distribution, the activity of anchorene in the presence of NPA was evaluated. As shown in FIGS. 11D and 8C, anchorene application (20 µM) partially compensated for the negative impact of NPA on ANR-RE. Furthermore, NPA treatment resulted in a loss of gravitropism, caused by disruption of auxin transport. Vertical grown 5 DAG seedlings on half MSO with indicated treatments were analyzed. The orientation of root growth was measured and then was assigned to one of twelve 30° sectors. Surprisingly, application of anchorene largely restored gravitropism in NPA treated seedlings (FIGS. 11E and 8D). The auxin efflux carrier PIN3 plays an important role in LR initiation and emergence. Therefore, the effect of anchorene on PIN3 using the pPIN3::PIN3-GFP marker line was examined. As shown in FIGS. 11F-H, PIN3 levels were significantly increased by anchorene treatment. However, pin3 did not show altered ANR-RE (FIG. 8E), which may be due to the redundancy of PINs in regulating auxin transport.

EXAMPLE 5

Anchorene-induced Changes to Collet Transcriptome

Figure 13A:
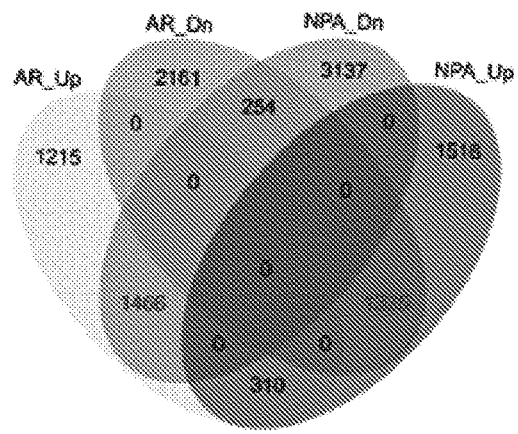
Figure 13B:
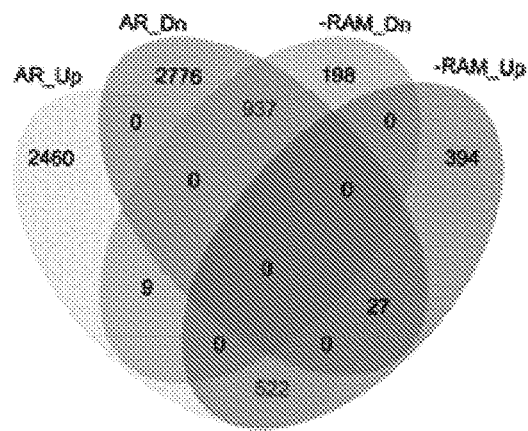
Figure 13C:
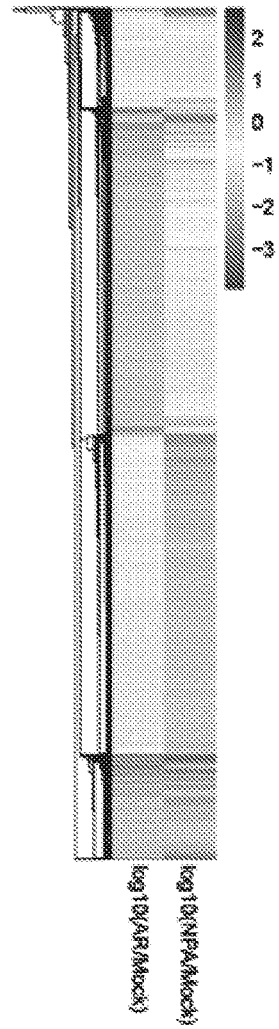
Figure 13D:
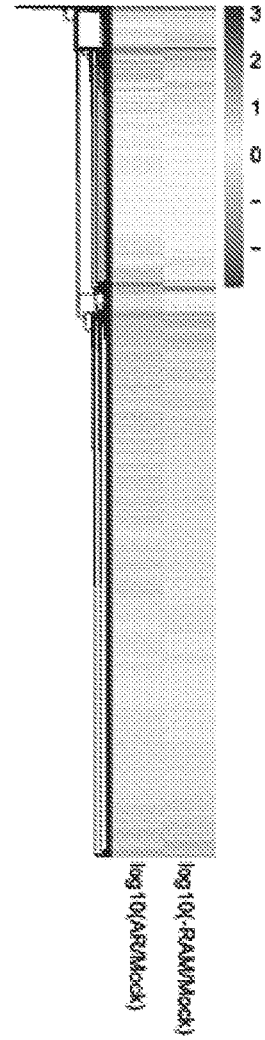
Figure 13E:
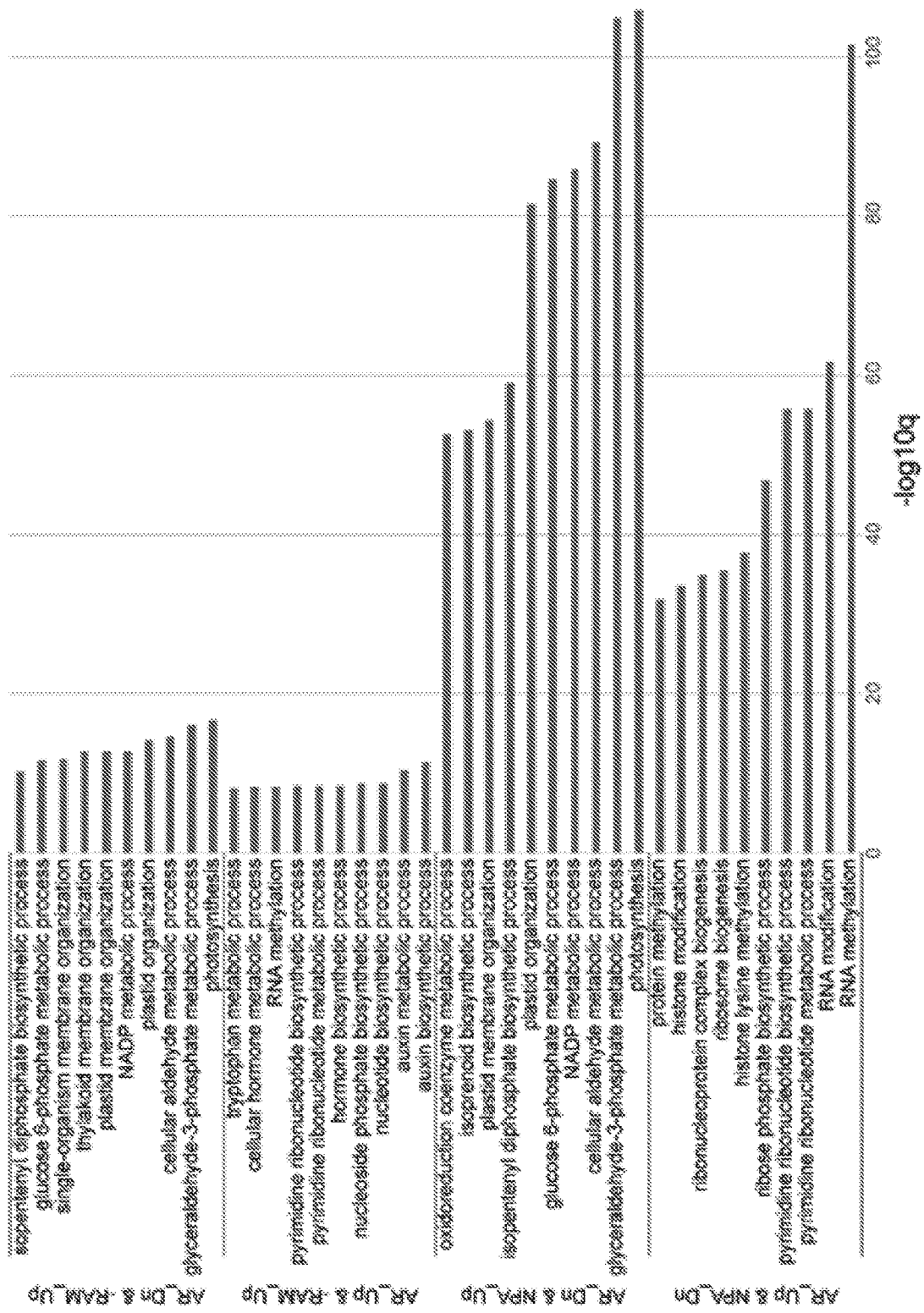

To further examine the effect of anchorene on ANR formation, RNA sequencing (RNA-Seq) was performed on collets isolated from seedlings after treatment with anchorene, NPA, or RAM excision. NPA and anchorene affected the expression level of 3355 overlapping genes and exerted the opposite effect on 2791 (83%) of them (FIGS. 13A and 13C). This is consistent with the opposite effects of NPA and anchorene on ANR development. In contrast, RAM excision and anchorene treatment led to a similar response in the expression level of 1459 genes and to opposite effects in only 36 genes (FIGS. 13B and 13D), which is consistent with their common role in triggering ANR development. Biological Processes (BP) GO term analysis showed that many genes overlapping between anchorene treatment and RAM excision are related to auxin metabolism (FIGS. 13E and 23A-B), indicating that modulation of this process is also important for regulating ANR development. Taken as a whole, transcriptome analysis showed that anchorene application and removal of RAM lead to the induction of many auxin biosynthesis genes. This result is consistent with the results obtained using auxin responsive marker lines, which suggested that anchorene triggers ANR formation by modulating auxin transport and content (e.g., see FIGS. 5A-C).

EXAMPLE 6

Biological Function of ANRs

Differences in soil structure affecting ANR development were explored to determine the biological role of ANRs by comparing ANR formation in seedlings grown in organic and sandy soil. Seedlings were grown in half MSO agar plates with or without 20 µM anchorene for 7 days, the well grown seedlings in plates without anchorene treatment, and seedlings with two ANRs in anchorene treated plates were selected and transferred to new half MSO agar plates and grown for another 10 days. About 63% (63±17.5%) of seedlings grown in sand formed ANRs at 8 DAG, compared to only 4% (4±3.5%) in organic soil (FIGS. 14A-B and 15A-B). This suggests that the local environment is an important factor for ANR development.

The pH value, nutrient and aliment composition of the sand soil (Silver sand) and organic soil (Argo Mix) were analyzed and showed quite different compositions as described in Tables 2 and 3.

TABLE 2

Nutrient element composition in Argo Mix and Silver sand

| Element | Argo Mix | Silver sand |
|---|---|---|
| | mg/Kg | |
| Fe | 780.53 ± 2.19 | 1890.26 ± 6.28 |
| K | 4001.53 ± 82.19 | 758.83 ± 24.47 |
| Mg | 11139.33 ± 138.88 | 214.63 ± 6.89 |
| Mn | 51.81 ± 0.62 | 15.13 ± 1.30 |
| P | 1468.06 ± 25.08 | 25.57 ± 2.98 |
| Zn | 58.20 ± 1.75 | 17.77 ± 0.42 |
| | g/Kg | |
| C | 439.93 ± 8.22 | 3.56 ± 0.34 |
| N | 10.69± | ND |
| S | ND | ND |
| H | 53.07 ± 0.58 | 0.33 ± 0.01 |

"ND" indicates non-detected

TABLE 3 pH value of Argo soil and Silver sand

| | Argo soil | Silver sand |
|---|---|---|
| pH value | 6.37 ± 0.03 | 7.05 ± 0.03 |

Phosphorus and nitrogen are very important nutrient elements that regulate root development. Therefore anchor root formation under phosphorus or nitrogen deficient conditions were examined. Interestingly, nitrogen deficient but not phosphorus deficient conditions showed elevated anchor root formation compared to mock condition. (FIGS. 22A and B) The anchorene content was quantified under nitrogen deficient and mock conditions (FIG. 22C). Consistently, anchorene content was higher under nitrogen deficient conditions than that of mock, which indicates that anchorene content is regulated by nitrogen status.

Finally, the effect of anchorene treatment on plant growth was investigated. For this purpose, root and shoot biomass were measured in 17-day-old seedlings treated with this compound. Seedlings pre-treated with anchorene for 1 week displayed more ANRs and lateral growth of roots, with significantly increased root (55% more on average) and shoot (33% more on average) fresh biomass, compared to that of control (FIGS. 14C and 12A-B). These results indicate that anchorene facilitates plant growth.

Root systems are important not only for anchoring the plant in soil but also for absorbing water and nutrients. The results show that soil type can affect ANR formation, with seedlings grown in sand producing more ANRs than those grown in soil with high organic matter. Sand usually has fewer nutrients as compared to other soils, thus more ANR formation in sand could therefore increase the ability of seedlings to acquire nutrients. Increased root and shoot biomass indicate a potential for application in agriculture or horticulture.

EXAMPLE 7

Anchorene Promotion of Adventitious Root Formation

Anchorene significantly increases the number of adventitious roots in Arabidopsis seedlings (FIGS. 18A-B). 4-day-old dark grown Arabidopsis seedlings were transferred to plates with 5, 10, or 20 µM anchorene, or without. After 5 additional days of growth, the number of adventitious roots was determined for each seedling.

EXAMPLE 8

Biological Functions of Anchorene in Monocots

Arabidopsis is a dicot model plant. To test the effect of anchorene on monocot plant and crops, the biological functions of anchorene was evaluated on two important crops, rice and maize, under hydroponic conditions. Excitingly, a clear effect of anchorene on rice primary root and crown root growth (FIGS. 19B-E). A clear effect on shoot growth was not observed during this period, which might indicate anchorene specifically regulates root architecture. Similar effect was also examined in maize (FIGS. 20B-C). The growth of primary root and lateral roots was greatly promoted after applying anchorene in maize. These results demonstrate a conservative effect of anchorene on promoting root development in different species, including Arabidopsis, rice and maize. Root growth promoting not only could better anchor the plant, but also increase the volume of the plant root which will facilitate the water and nutrient absorption for the plant.

Discussion

Arabidopsis forms three types of post-embryonic roots, ANRs, LRs and adventitious roots. Here, the study of development of ANRs, the least characterized of these root types, demonstrated that ANR formation is triggered by a carotenoid-derived signal. Moreover, these studies showed that anchorene is the signal that regulates ANR development. Anchorene is the first reported diapocarotenoid with a specific regulatory function. Due to their instability and reactivity, diapocarotenoids have attracted little attention, and have mainly been studied as precursors of pigments such as crocetin. Hence, the identification of anchorene is expected to facilitate the discovery of further diapocarotenoid-based plant regulatory compounds and unravel new functions of carotenoid-derived metabolites.

Figure 3I:
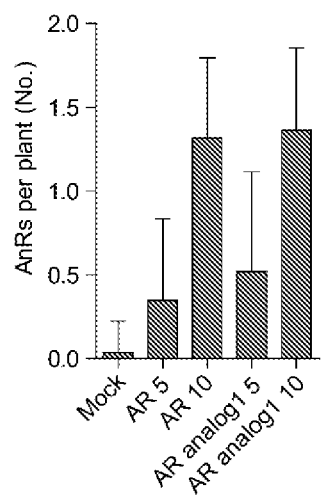
Figure 3J:
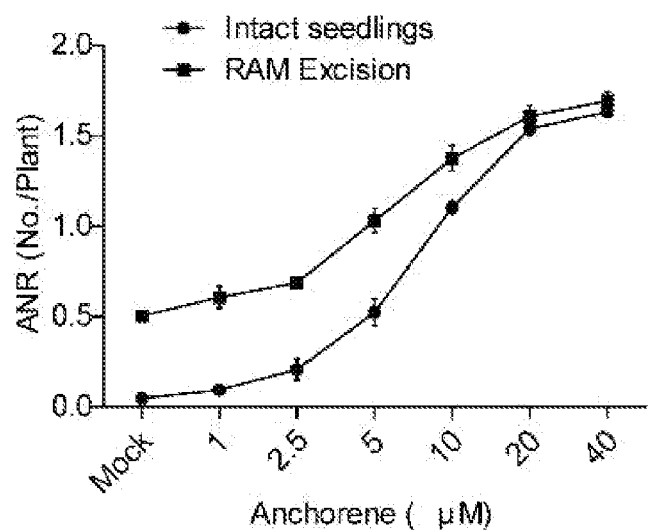

Anchorene is a specific inducer of ANR formation, as shown by the inactivity of its isomer and derivatives, i.e. the corresponding dialcohol, diacid and diethyl ester (FIG. 3G-I). Unlike LRs, ANRs originate from the collet, which emerges from embryonic tissue. Therefore, ANR development is fundamentally different from that of LRs, which initiate near the root meristem. Although both ANRs and LRs originate from the pericycle, the collet pericycle forms only one or two ANRs located opposite each other, while the primary root pericycle continuously develops alternating LRs.

Anchorene is a synthetic compound that could arise in planta from carotenoid cleavage. This work demonstrates that ANR development requires a carotenoid-derived signal (FIG. 6H) and that anchorene exerts the function of this signal in carotenoid-deficient seedlings (FIG. 9A-D). Further, we show that anchorene is a natural Arabidopsis metabolite and its formation could be inhibited by NF treatment (FIGS. 9E and 24A-B). The question of how anchorene is produced from carotenoids remains elusive. Theoretically, anchorene can arise by cleaving C11-C12 and C11'-C12' double bonds in all carotenoids starting from -carotene in the carotenoid biosynthesis pathway (FIG. 17). In contrast to ABA and SL, which derive from specific 9-cis-carotenoids, anchorene can be formed from every trans- or cis-carotenoid with a continuously conjugated, trans-configured central moiety (C11 to C11'; see FIG. S2).

Several CCDs from plants, fungi and cyanobacteria produce diapocarotenoids, either by repeated cleavage of carotenoid substrates or by specifically targeting apocarotenoids. However, enzymatic studies on Arabidopsis CCDs do not support the formation of anchorene by a single CCD. Indeed, none of the Arabidopsis CCDs are capable of performing cleavage at both of the C11-C12 and C11'-C12' double bonds in vitro, but interestingly, the results above showed that OH-APO12' is likely a specific precursor of anchorene in Arabidopsis by feeding experiments (FIGS. 21A-D). It was previously shown that OH-APO12' could be produced by a maize NCED enzyme, VP14, by the cleavage of zeaxanthin, however individual Arabidopsis ccd or nced mutants did not show ANR-RE reduction (FIGS. 7B and F). Arabidopsis has five NCEDs, which make it difficult to knock out all of these NCEDs to test their involvement in anchorene production, so redundant production of anchorene by more than one CCD or CCD combination that exerts the required cleavage activity in planta cannot be excluded. Carotenoids are also cleaved non-enzymatically, catalyzed by ROS. To determine whether anchorene can be produced non-enzymatically, the studies above tested whether it was formed as oxidation product of synthetic β-carotene in an organic solution in vitro. LC-MS analysis identified an anchorene pattern similar to that observed in shoot samples (FIG. 25), indicating that anchorene may also be produced non-enzymatically in planta. A number of apocarotenoid signaling molecules have been shown to be produced non-enzymatically in vitro, both in plants and animals. This may indicate that the specificity of anchorene activity is regulated mainly by a receptor, rather than biosynthetically.

These studies revealed a central role of auxin in ANR development. The auxin responsive transcription factors ARF7 and ARF19, which are key regulators of LR initiation, are also indispensable for ANR initiation (FIG. 11A-B). Moreover, the auxin analog NAA strongly increases ANR-RE while the auxin transport inhibitor NPA impedes the formation of ANRs (FIG. 11C), suggesting that auxin content and distribution are both important for ANR-RE. The use of auxin-responsive marker lines showed that the application of anchorene increased the levels of auxin reporters both in ANR primordia and the surrounding tissue (FIG. 5), suggesting that anchorene triggers ANR formation by modulating auxin transport and levels. Consistent with these results, transcriptome analysis showed that anchorene application and removal of RAM lead to the induction of many auxin biosynthesis genes (FIGS. 13 and 23). Future work will shed light on anchorene's mode of action. However, it can be speculated that anchorene may act via post-translational modification of regulatory modulate proteins by building conjugates with lysine and/or cysteine residues, as proposed for other carotenoid cleavage products.

Root systems are important not only for anchoring plants in soil but also for absorbing water and nutrients. An increase in ANR number was observed upon using nutrient-poor sandy soil (FIG. 14C-D). A growth-promoting effect of anchorene was characterized (FIG. 14E). Moreover, anchorene and anchor root formation under nitrogen deficient conditions were compared to those of normal growing seedlings. These results indicated that that ANRs may improve nutrient uptake and pointing to potential for applications in agriculture or horticulture. The carotenoid cleavage product anchorene is a commercially available compound used as building block for the manufacturing of different carotenoids on an industrial scale showed In conclusion, Arabidopsis root development is predicted to be regulated by yet unidentified carotenoid-derived metabolite(s). In the Examples above, known and putative carotenoid cleavage products were screened and anchorene, a predicted carotenoid-derived dialdehyde (diapocarotenoid) that triggers anchor root development, was identified. Anchor roots are the least characterized type of root in Arabidopsis. They form at the root-shoot junction, particularly upon damage to the root apical meristem. Using Arabidopsis reporter lines, mutants and chemical inhibitors, the results above show that anchor roots originate from pericycle cells and that the development of this root type is auxin-dependent and requires carotenoid biosynthesis. Transcriptome analysis and treatment of auxin-reporter lines indicate that anchorene triggers anchor root development by modulating auxin homeostasis. Exogenous application of anchorene restored anchor root development in carotenoid-deficient plants, indicating that this compound is the carotenoid-derived signal required for anchor root development. Chemical modifications of anchorene led to a loss of anchor root promoting activity, suggesting that this compound is highly specific. Furthermore, LC-MS analysis demonstrated that anchorene is a natural, endogenous Arabidopsis metabolite. Taken together, these results reveal a new member of the family of carotenoid-derived regulatory metabolites and hormones.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

The scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. A method of regulating plant growth comprising applying to a seed, plant propagation material, or plant, in need of growth regulation, an effective amount at least one diapocarotenoid plant growth regulator represented by formula (I):

R-A-R  (I)

or a precursor, salt, solvate, stereoisomer, or polymorph thereof, wherein R is a monovalent carbonyl moiety selected from the group consisting of aldehydes, ethers, diethers, carboxylic acids, and ester carboxylates and A is a bivalent polyene represented by bivalent moiety —$(CR_a{=}CR_b)_x$— wherein x is the number of double bonds in bivalent polyene A, and $R_a$ and $R_b$ are, independently, hydrogen, a hydrocarbon, or an alkoxy group, wherein applying does not encompass endogenous production of one or more of the plant growth regulators.

2. The method of claim 1, wherein applying to the seed, plant propagation material or plant comprises treating a plant growth medium in contact with the seed, plant propagation material or plant with the at least one diapocarotenoid plant growth regulator, or a precursor, salt, solvate, stereoisomer, or polymorph thereof.

3. The method of claim 2, wherein the plant growth medium is selected from the group consisting of water, peat moss-based growing mix, a greenhouse growing mix, inert support loaded with nutrient solutions, and agar medium formulated for promoting root development.

4. The method of claim 1, wherein the seed, plant propagation material or plant is in need of increased root development.

5. The method of claim 4, wherein the seed, plant propagation material, or plant is a difficult-to-propagate plant or from a difficult-to-propagate plant.

6. The method of claim 1, wherein the at least one diapocarotenoid plant growth regulator is applied to the plant within 3-8 days after germination.

7. The method of claim 1, wherein the seed, plant propagation material or plant is in need of increased resistance to abiotic stress.

8. The method of claim 1, wherein the at least one diapocarotenoid plant growth regulator is selected from the group consisting of 12,12'-diapocarotene-12,12'-dial, 1,1,8,8-tetramethoxy-2,7-dimethyl-2,4,6-octatriene, and a combination thereof, and regulating plant growth comprises one or more of promoting root development, increasing nutrient uptake, enhancing resistance to abiotic stress factors, invigorating plant growth, increasing plant yield, and increasing plant biomass.

9. The method of claim 1, wherein the at least one diapocarotenoid plant growth regulator is selected from the group consisting of 8,15-diapocarotene-8,15-dial, 8,12'-diapocarotene-8,12'-dial, and a combination thereof, and regulating plant growth comprises inhibiting root growth.

10. The method of claim 9, wherein applying further comprises treating land at risk for being colonized by an unwanted plant with the at least one diapocarotenoid plant growth regulator.

* * * * *